(12) United States Patent  (10) Patent No.: US 8,618,778 B2
Gray et al.  (45) Date of Patent: Dec. 31, 2013

(54) CIRCUIT AND METHOD FOR COUPLING ELECTRICAL ENERGY TO A RESONATED INDUCTIVE LOAD

(75) Inventors: Ashley James Gray, Wellington (NZ); Neville Roy Samuel Illsley, Nelson (NZ)

(73) Assignee: Restech Limited, Nelson (NZ)

( * ) Notice: Subject to any disclaimer, the term of this patent is extended or adjusted under 35 U.S.C. 154(b) by 376 days.

(21) Appl. No.: 13/122,375

(22) PCT Filed: Sep. 30, 2009

(86) PCT No.: PCT/NZ2009/000205
§ 371 (c)(1),
(2), (4) Date: Jun. 17, 2011

(87) PCT Pub. No.: WO2010/039046
PCT Pub. Date: Apr. 8, 2010

(65) Prior Publication Data
US 2011/0242868 A1    Oct. 6, 2011

Related U.S. Application Data

(60) Provisional application No. 61/194,834, filed on Oct. 1, 2008.

(51) Int. Cl.
*G05F 1/00* (2006.01)
(52) U.S. Cl.
USPC ........... 323/222; 323/220; 323/223; 363/131; 363/132
(58) Field of Classification Search
USPC ........................ 323/220–223; 363/131, 132
See application file for complete search history.

(56) References Cited

U.S. PATENT DOCUMENTS

| | | | |
|---|---|---|---|
| 3,551,751 A * | 12/1970 | Twellsiek | 361/153 |
| 4,533,986 A | 8/1985 | Jones | |
| 5,371,439 A | 12/1994 | Griffin | |
| 5,408,403 A | 4/1995 | Nerone et al. | |
| 5,448,137 A | 9/1995 | Bobel | |
| 5,463,284 A | 10/1995 | Mattas | |
| 5,479,172 A | 12/1995 | Smith et al. | |
| 5,488,269 A | 1/1996 | El-Hamamsy et al. | |
| 5,631,523 A | 5/1997 | Rothenbuhler et al. | |

(Continued)

FOREIGN PATENT DOCUMENTS

WO     WO-8701882 A1    3/1987
WO     WO-0041150 A1    7/2000

*Primary Examiner* — Adolf Berhane
*Assistant Examiner* — Yemane Mehari
(74) *Attorney, Agent, or Firm* — Birch, Stewart, Kolasch & Birch, LLP

(57) ABSTRACT

A switching circuit (Q11, Q12, D11, D12, D13, L11, L12) is repetitively configured to charge an energy transfer capacitance (C11) from an electrical supply (V11) and then inject a discrete pulse of energy into a resonated load circuit by discharging the capacitance. The load circuit is formed by a resonating capacitance (C12) and an inductive load device (T11, R11), eg motor, or induction heating or power transfer device. Energy circulates in the load circuit at or near to its natural resonant frequency. There is no injection of energy into the load circuit while energy for charging the transfer capacitance is being delivered from the supply to the switching circuit. During injection, the two capacitances and the inductive load device may be connected together in parallel or in series, or the transfer capacitance may be connected in series with the inductive load device but not the resonating capacitor.

22 Claims, 19 Drawing Sheets

(56) References Cited

U.S. PATENT DOCUMENTS

| | | |
|---|---|---|
| 5,686,798 A | 11/1997 | Mattas |
| 5,712,536 A | 1/1998 | Haas et al. |
| 5,912,812 A | 6/1999 | Moriarty, Jr. |
| 6,458,164 B1 | 10/2002 | Weiss |
| 6,583,999 B1 * | 6/2003 | Spindler et al. ............. 363/98 |
| 6,670,779 B2 | 12/2003 | Shen |
| 6,909,319 B2 * | 6/2005 | Wang et al. ............. 327/536 |

* cited by examiner

CIRCUIT AND METHOD FOR COUPLING ELECTRICAL ENERGY TO A RESONATED INDUCTIVE LOAD

This application is the national stage of International Application number PCT/NZ2009/000205 filed Sep. 30, 2009, which claims priority under 35 USC §119(e) of U.S. Provisional Application No. 61/194,834 filed Oct. 1, 2008.

FIELD OF INVENTION

The present invention relates to electrical circuits for powering inductive loads. More particularly, the present invention relates to a circuit for coupling a supply of electrical energy to an inductive load device that is resonated with a capacitance. Examples of specific applications of the present invention include driving low to medium frequency induction heating and inductive power transfer devices, or alternating current motors running in resonant mode, for example induction or synchronous reluctance.

BACKGROUND

Resonant circuits are used in many electrical devices where it is desired to inductively transfer energy across an air gap, for example in induction heaters or cooktops, induction heat treatment, induction furnaces and inductive power transfer devices such as those used for charging batteries or other energy storage devices in electric vehicles, cell phones, portable computers, or other rechargeable appliances. Resonant circuits are also used in other devices including lighting circuits, transformers and motors.

This use of what is termed a "loaded resonant circuit" is characterised by a circuit having a resonant build-up of energy in an inductive component of the circuit and the transfer of a portion of this energy across space by magnetic flux, which is inductively coupled or linked into an inductive component of a load circuit. High energy transfer efficiencies can be achieved in well designed systems because only a small fraction of the resonant energy is being consumed relative to the large reactive energy oscillating in the resonant circuit. However, the circuit energy transfer efficiencies decrease as the distance between the inductively coupled or linked inductive components increases.

Conventional induction heating drive circuits include a number of inverter configurations, the most common being quasi-resonant, half bridge, and full bridge inverter drives. These are characterised by the direct inputting of energy into the load circuit over half of every half cycle or during every second half cycle. These standard inverter topologies are typically used in other inductive power transfer devices as well.

SUMMARY OF INVENTION

The present invention comprises a coupling circuit for coupling a source of electrical energy to an inductive load circuit that is resonated with a capacitance. The coupling circuit transfers energy from the source of electrical energy to the resonated load circuit by repeatedly configuring a switching circuit, firstly to charge an energy transfer capacitance from the source of electrical energy, and then secondly to inject electrical energy into the resonated load circuit by at least partly or fully discharging the charged energy transfer capacitance into the resonated load circuit.

It is an object of the present invention to provide a circuit by which energy from a source of electrical energy can be controlled and transferred efficiently to an inductive load device, or to provide a method of operating a circuit by which energy from a source of electrical energy can be controlled and transferred efficiently to an inductive load device, or to provide the public with a useful choice.

In broad terms in a first aspect the invention comprises a coupling circuit for coupling a supply of electrical energy to an inductive load device, wherein the coupling circuit comprises a switching circuit, an energy transfer capacitance and a resonating capacitance;

the resonating capacitance and the inductive load device together form a resonated load circuit;

the resonated load circuit has a natural resonant frequency;

the switching circuit is configurable in a charging configuration by which the energy transfer capacitance is charged from the supply of electrical energy;

the switching circuit is configurable in an injecting configuration by which the energy transfer capacitance is at least partly discharged into the resonated load circuit, thereby injecting a discrete pulse of energy into the resonated load circuit;

the switching circuit is repetitively configurable in the charging configuration followed by the injecting configuration, to transfer energy from the supply of electrical energy to the inductive load device, the energy transferred to the inductive load device circulating in the resonated load circuit at an oscillation frequency;

the oscillation frequency is near or equal to the natural resonant frequency; and there is no injection of energy from the energy transfer capacitance into the resonated load circuit while energy for charging the energy transfer capacitance is being delivered from the supply to the switching circuit.

The oscillation frequency may be within ±20%, ±10%, ±5%, or ±2.5%, of the natural resonant frequency.

Energy may be transferred from the supply of electrical energy to the inductive load device by repetitively configuring the switching circuit at a predetermined switching frequency which is equal to, or an integral sub-multiple of, the oscillation frequency.

Optionally, the energy transfer capacitance is not discharged into the resonated load circuit when the switching circuit is in the charging configuration.

Optionally, the energy transfer capacitance is not charged from the supply when the switching circuit is in the injecting configuration.

The resonating capacitance and the inductive load device may be continuously connected together in parallel, and the energy transfer capacitance may be effectively connected in parallel across the resonating capacitance and the inductive load device when the switching circuit is configured in the injecting configuration.

The energy transfer capacitor, the resonating capacitance and the inductive load device may be effectively connected in a series circuit when the switching circuit is configured in the injecting configuration.

The energy transfer capacitance and the inductive load device may be effectively connected in a series circuit excluding the resonating capacitance when the switching circuit is configured in the injecting configuration.

Optionally, the injecting configuration is a first injecting configuration by which the energy transfer capacitance is discharged to inject a current in a first direction into the resonated load circuit;

the switching circuit is configurable in a second injecting configuration by which the energy transfer capacitance is discharged to inject a current in a second direction into the resonated load circuit, the second direction being opposite the first direction; and the switching circuit is repetitively configurable in the charging configuration followed by the first injecting configuration followed by the charging configuration followed by the second injecting configuration to transfer energy from the supply of electrical energy to the inductive load device.

Optionally, the energy transfer capacitance is a first energy transfer capacitance, and the coupling circuit also comprises a second energy transfer capacitance;

the charging configuration is a first charging configuration, and the switching circuit is configurable in a second charging configuration by which the second energy transfer capacitance is charged from the supply of electrical energy;

the injecting configuration is a first injecting configuration, and the switching circuit is configurable in a second injecting configuration by which the second energy transfer capacitance is at least partly discharged into the resonated load circuit, thereby injecting a discrete pulse of energy into the resonated load circuit;

the switching circuit is repetitively configurable in the first charging configuration, the second injecting configuration, the second charging configuration, and the first injecting configuration, to transfer energy from the supply of electrical energy to the inductive load device; and there is no injection of energy from the second energy transfer capacitance into the resonated load circuit while energy for charging the second energy transfer capacitance is being delivered from the supply to the switching circuit.

In this option the switching circuit may be repetitively configured successively in the first charging configuration, the second injecting configuration, the second charging configuration, and the first injecting configuration. Alternatively, in this option, the switching circuit may be configured simultaneously in the first charging configuration and the second injecting configuration, and the switching circuit may be configured simultaneously in the second charging configuration and the first injecting configuration.

In broad terms in a second aspect the invention comprises a method of operating a coupling circuit to couple a supply of electrical energy to an inductive load device;

the coupling circuit comprising a switching circuit, an energy transfer capacitance and a resonating capacitance;

the resonating capacitance and the inductive load device together forming a resonated load circuit; and the resonated load circuit having a natural resonant frequency;

the method comprising the steps of 1. configuring the switching circuit in a charging configuration in which the energy transfer capacitance is connected to the supply of electrical energy;

2. charging the energy transfer capacitance from the supply of electrical energy;

3. configuring the switching circuit in an injecting configuration in which the energy transfer capacitance is connected to the resonated load circuit;

4. at least partly discharging the energy transfer capacitance into the resonated load circuit, thereby injecting a discrete pulse of energy into the resonated load circuit; and 5. repetitively performing Steps 1, 2, 3 and 4, to transfer energy from the supply of electrical energy to the inductive load device;

wherein the energy transferred to the inductive load device circulates in the resonated load circuit at an oscillation frequency;

the oscillation frequency is near or equal to the natural resonant frequency; and there is no injection of energy from the energy transfer capacitance into the resonated load circuit while energy for charging the energy transfer capacitance is being delivered from the supply to the switching circuit.

The oscillation frequency may be within ±20%, ±10%, ±5%, or ±2.5%, of the natural resonant frequency.

In Step 5 the switching circuit may be repetitively configured at a predetermined switching frequency which is equal to, or an integral sub-multiple of, the oscillation frequency.

Optionally, the energy transfer capacitance is not discharged into the resonated load circuit while performing Steps 1 and 2.

Optionally, the energy transfer capacitance is not charged from the supply while performing Steps 3 and 4.

The energy transfer capacitance, the resonating capacitance and the inductive load device may be effectively connected together in parallel while performing Steps 3 and 4.

The energy transfer capacitance, the resonating capacitance and the inductive load device may be effectively connected together in a series circuit while performing Steps 3 and 4.

The energy transfer capacitance and the inductive load device may be effectively connected together in a series circuit excluding the resonating capacitance while performing Steps 3 and 4.

Optionally, the injecting configuration of Step 3 is a first injecting configuration, and the discharging of the energy transfer capacitance in Step 4 is performed by injecting a current in a first direction into the resonated load circuit; and the method further comprises the additional steps of:

6. configuring the switching circuit in a second injecting configuration in which the energy transfer capacitance is connected to the resonated load circuit; and 7. at least partly discharging the energy transfer capacitance into the resonated load circuit by injecting a current in a second direction into the resonated load circuit, the second direction being opposite the first direction, thereby injecting a discrete pulse of energy into the resonated load circuit; and 8. performing Steps 1, 2, 6 and 7 following each repetition of Steps 1, 2, 3 and 4 in Step 5, to transfer energy from the supply of electrical energy to the inductive load device.

In broad terms in a third aspect the invention comprises a method of operating a coupling circuit to couple a supply of electrical energy to an inductive load device, wherein:

the coupling circuit comprises a switching circuit, a first energy transfer capacitance, a second energy transfer capacitance, and a resonating capacitance;

the resonating capacitance and the inductive load device together form a resonated load circuit having a natural resonant frequency; and the method comprises the steps of:

A. configuring the switching circuit in a first injecting configuration in which the first energy transfer capacitance is connected to the resonated load circuit;

B. at least partly discharging the first energy transfer capacitance into the resonated load circuit, thereby injecting a discrete pulse of energy into the resonated load circuit;
C. configuring the switching circuit in a first charging configuration in which the first energy transfer capacitance is connected to the supply of electrical energy;
D. charging the first transfer capacitance from the supply of electrical energy;
E. configuring the switching circuit in a second injecting configuration in which the second energy transfer capacitance is connected to the resonated load circuit;
F. at least partly discharging the second energy transfer capacitance into the resonated load circuit, thereby injecting a discrete pulse of energy into the resonated load circuit;
G. configuring the switching circuit in a second charging configuration in which the second energy transfer capacitance is connected to the supply of electrical energy;
H. charging the second energy transfer capacitance from the supply of electrical energy;
I. repetitively performing Steps A to H inclusive, to transfer energy from the supply of electrical energy to the inductive load device;

and wherein:
the energy transferred to the inductive load device circulates in the resonated load circuit at an oscillation frequency which is near or equal to the natural resonant frequency; and
there is no injection of energy from the first energy transfer capacitance into the resonated load circuit while energy for charging the first energy transfer capacitance is being delivered from the supply to the switching circuit, and no injection of energy from the second energy transfer capacitance into the resonated load circuit while energy for charging the second energy transfer capacitance is being delivered from the supply to the switching circuit.

DEFINITIONS OF TERMS USED IN THIS SPECIFICATION

The term "comprising" as used in this specification means "consisting at least in part of". That is to say, when interpreting statements in this specification which include "comprising", the features prefaced by this term in each statement all need to be present but other features can also be present. Related terms, such as "comprise", "comprises", and "comprised", are to be interpreted in a similar manner.

As used herein the term "and/or" means "and" or "or", or both.

As used herein "(s)" following a noun means the plural and/or singular forms of the noun.

The term 'inductor' as used in this specification means a passive component that is incorporated in a circuit primarily for its property of inductance.

The term 'inductive load device' as used in this specification is to be understood as including any device having inductance but which is incorporated in a circuit primarily for establishing a magnetic field to perform a work function, for example by a motoring, transforming or inducing action, or by a magnetic attraction or repulsion. Inductive load devices include, but are not limited to, inductive power transfer coils, transformers, electromagnetic motors, linear actuator coils, electromagnets, solenoid coils and induction coils, the latter including coils, windings and the like used for induction heating.

References herein to a current induced in an inductive device during growth or collapse of a magnetic field can be understood as referring to a current that is driven by a voltage induced in the inductive device by the growth or collapse of the magnetic field through the winding inductance of the device.

BRIEF DESCRIPTION OF DRAWINGS

The invention will be further described by way of example only and without intending to be limiting with reference to the following drawings, wherein.

Figure 1A:
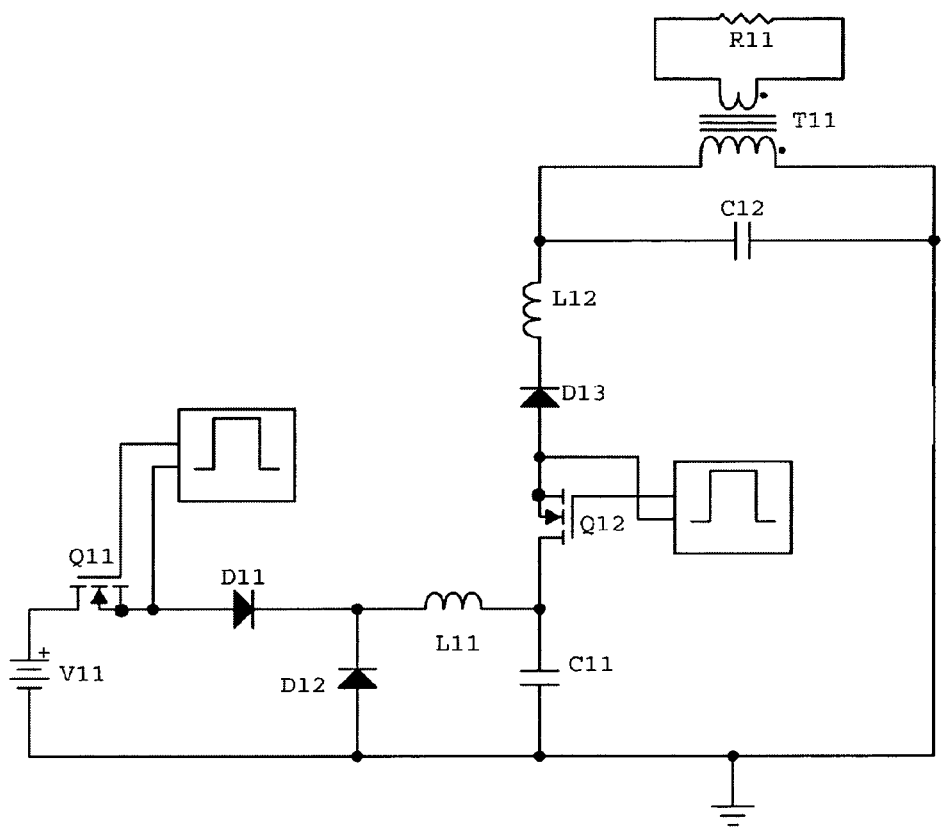
FIG. 1A shows a circuit illustrating a first embodiment of the invention for injecting unidirectional current pulses into a resonated load circuit provided by an inductive device and a resonating capacitor connected in parallel.

Where components of one circuit embodiment correspond in function to those of another circuit embodiment, the corresponding components shown in the figures are labelled correspondingly as x1, x2, x3, etc, where x is the number of the embodiment and the figure. For example, each circuit embodiment includes an energy transfer capacitor and a resonating capacitor. The energy transfer capacitors are labelled C11 in FIG. 1A, C21 in FIG. 2A, C31 in FIG. 3A, etc, and the resonating capacitors are labelled C12 in FIG. 1A, C22 in FIG. 2A, C32 in FIG. 3A, etc.

It should also be noted that in the accompanying figures the connection between wires is shown with a dot. Wires that cross but have no dot are not connected.

GENERAL DESCRIPTION OF SPECIFIC EMBODIMENTS

Each described embodiment of the invention, as seen in the accompanying figures, comprises a coupling circuit which couples a supply of electrical energy to an inductive load device. The inductive load device in the specific embodiments is an induction heating coil and is represented in the figures accompanying this specification as the primary winding of a transformer. However the inductive load device could be an induction motor rotor, or a transformer or other inductive power transfer device, for example.

A loosely coupled secondary winding of the transformer is connected to a low resistance circuit to represent the eddy current circuits in the work piece enclosed by the induction heating coil. Eddy currents are induced in the work piece eddy current circuits.

A resonating capacitor is connected to the primary winding of the transformer. The resonating capacitor, the transformer primary winding and the loosely coupled resistive load (representing an eddy current or other load circuit) of the secondary winding together form a resonated load circuit. Energy is transferred from the supply to the inductive load device of the resonated load circuit via an energy transfer capacitor or capacitors. References in this specification to an energy transfer capacitor are to be understood as including an energy transfer capacitance that is provided by a plurality of capacitors.

The coupling circuit includes a controlled switching circuit. The energy transfer capacitor is periodically charged, by controlled switching through a suitable pulse shaping, resonant, or buck inductor, from a supply such as a direct current (DC) source or a filtered alternating current (AC) mains supply, for example a 110 volt or 240 volt mains supply. Other means to charge the transfer capacitor can be used without changing the scope of the invention. Energy stored on the energy transfer capacitor is periodically injected, also by controlled switching, into the resonated load circuit.

The switching circuit is configured in a charging configuration in which the supply of electrical energy is connected to the energy transfer capacitor to charge the energy transfer capacitor by directing a charge current to flow from the supply of electrical energy into the energy transfer capacitor. The amount of charge on the energy transfer capacitor can be controlled by the circuit topology and/or by the methods employed in the switching circuit.

The switching circuit is then configured in a discharging configuration. In this configuration, the energy transfer capacitor is connected to the resonated load circuit to partially or fully discharge the energy transfer capacitor by directing a discharge current to flow from the energy transfer capacitor into the resonated load circuit. This injects a discrete pulse of current, and energy, into the resonated load circuit.

The switching circuit is repetitively configured in the charging configuration followed by the discharging configuration to transfer energy from the supply of electrical energy to the energy transfer capacitor, and from the energy transfer capacitor to the inductive load device. The timing and the amplitude of the energy injection into the inductive load device is controlled by the switching circuit.

The energy transfer capacitor is preferably effectively disconnected from the supply or power source during each energy injection period, and is recharged from the supply or power source between injection periods. The input power may be provided via an off-line mains supply with power control achieved via a buck converter, pulse shaping or resonant inductor, or various configurations of buck-boost converters.

Using this invention, energy is transferred from the supply to the load circuit with high transfer efficiencies because discrete and controlled quantities of energy are injected into the resonated load circuit for precise time intervals and at favourable points in the resonant cycle.

Energy is preferably injected at an optimal point in the oscillation cycle of the resonated load circuit when the voltage across the resonated load circuit is low. This is achieved automatically by advancing or retarding the timing of each energy injection pulse relative to the natural resonant frequency cycle of the resonated load circuit so that the energy injection has the least amount of circuit potential to overcome. This improves the efficiency of energy injection into the circuit.

The timing of the injection point in each cycle is also dependent on the voltage on the energy transfer capacitor. The voltage to which the energy transfer capacitor is charged is used, either alone or in conjunction with a shift in the injection frequency, to affect control over the timing of the injection point in the resonant cycle.

The invention can provide the following features.

Simple circuits using few components

Full wave resonant mode operation

Sinusoidal work coil current waveforms

Work coil operation at or near natural resonant frequency without complex timing circuits Charging of energy transfer capacitor alternately with energy injection into resonated load circuit High efficiencies achieved with high work coil quality factor (Q)

High efficiencies achieved with solenoidal work coils and high coupling efficiencies Improved operating efficiencies over standard half bridge or quasi resonant induction heating circuits Injection by single polarity, i.e. unidirectional, pulses (e.g. once per cycle) or by alternating polarity, i.e. bidirectional, pulses (e.g. twice per cycle)

Injection in series with, or in parallel across, the resonated load circuit

Injection at or near zero crossings of the resonated load circuit voltage waveform for high efficiency energy transfer Injection from a suitably-sized energy transfer capacitor, preferably sized just large enough to inject a current pulse of sufficient size to meet the energy decrement of the resonated circuit and thereby maintain a required work coil current with minimal input power.

Injection periods from short duration up to one quarter period, for wide power control range Load circuit power control by one or more of:
  selecting the capacitance value of the energy transfer capacitance
  varying the injection voltage (i.e. the voltage on the charged energy transfer capacitance)
  varying the duration of the discrete injection pulses
  varying the injection frequency (e.g. varied up or down from the natural resonant frequency of the resonated load circuit)
  varying the number of injections of energy per cycle or per unit time Operating Frequencies The switching circuits according to the invention described in this specification are repetitively switched to configure the circuits in a charging configuration (to transfer energy from a supply of electrical energy to an energy transfer capacitor) and in a discharging and injection configuration (to discharge the energy transfer capacitor, and thereby inject energy, into a resonated load circuit).

Each circuit operates with various periodic currents and voltages having fundamental frequencies. These frequencies include a charging frequency, an injection frequency, an oscillation frequency and a resonant frequency. References to these frequencies in this specification are to be understood as defined by the following definitions, unless the context clearly requires alternative meanings.

The charging frequency is the fundamental frequency of a periodic charging current that is delivered from a supply to charge the energy storage capacitor.

The injection frequency is the fundamental frequency of a periodic discharge and injection current that is derived by controlled discharge of the energy transfer capacitor for injection into the resonated load circuit.

The oscillation frequency is the fundamental frequency of the periodic current and voltage oscillating in the resonated load circuit on excitation by the periodic injection of current. As explained further below, the instantaneous oscillation frequency over part of an oscillation cycle is not necessarily equal to the average oscillation frequency averaged over one or more complete oscillation cycles.

The resonant frequency is the natural resonant frequency of the resonated load circuit.

Figure 2A:
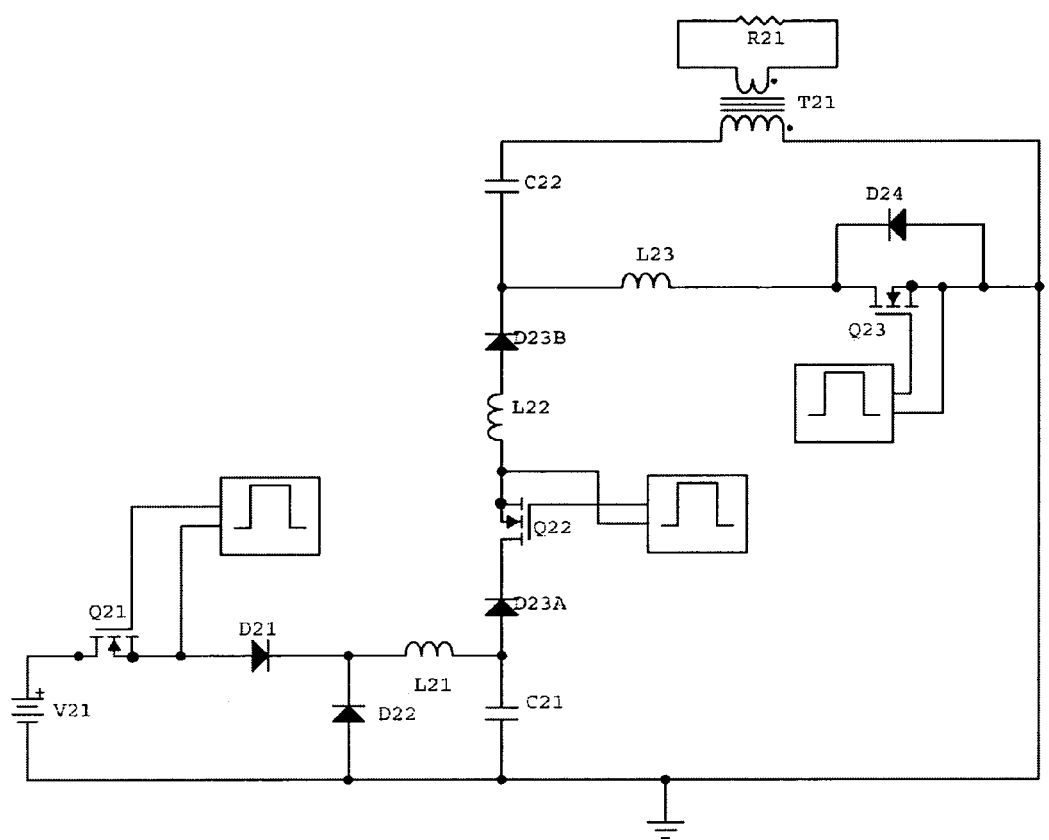
FIG. 2A shows a circuit illustrating a second embodiment of the invention for injecting unidirectional current pulses into a resonated load circuit provided by an inductive device and a resonating capacitor connected in series.
Figure 3A:
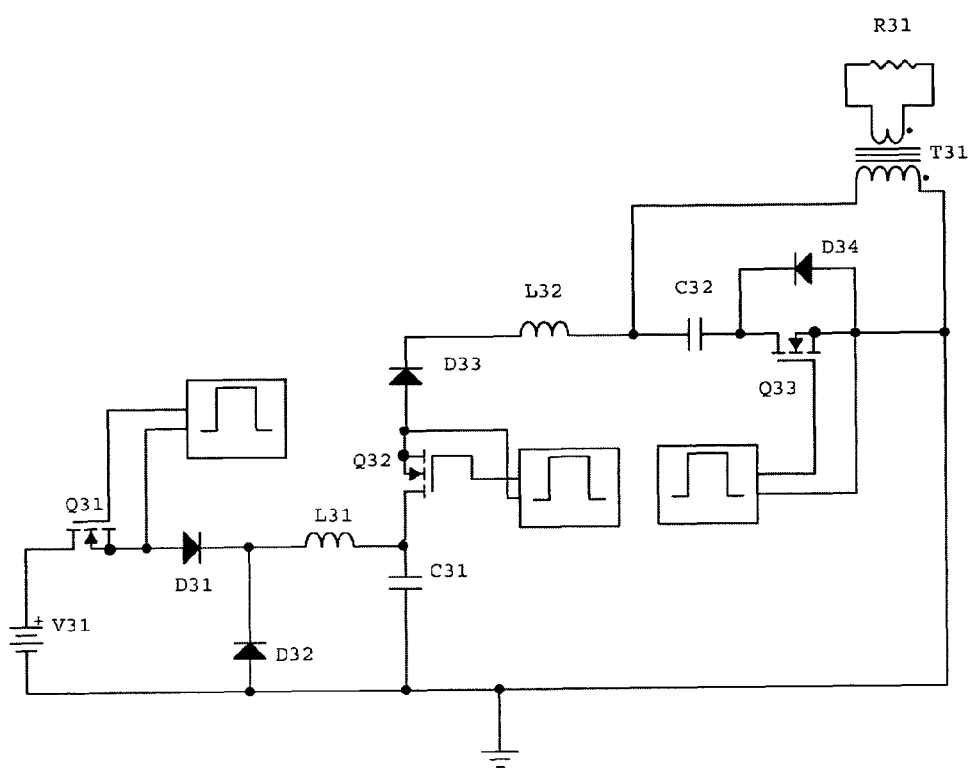
FIG. 3A shows a circuit illustrating a third embodiment of the invention for injecting unidirectional current pulses into an inductive device of a resonated load circuit provided by the inductive device and a resonating capacitor.

In the embodiments shown in FIGS. 1A, 2A and 3A, the energy transfer capacitor is alternately charged with a current pulse delivered from the supply and then discharged by a current pulse that is injected into the resonated load circuit. In these circuits energy injection into the resonated load circuit is by a series of unidirectional current pulses having the same polarity. The pulse repetition frequency of the injection current pulses is equal to the pulse repetition frequency of the current pulses charging the energy transfer capacitor.

In the embodiments shown in FIGS. 4A, 5A, 6A and 7A, the energy transfer capacitor is alternately charged with a pulse delivered from the supply and then discharged by a pulse injected into the resonated load circuit. In these circuits energy injection is by a series of bidirectional current pulses having alternating polarity. The injection frequency is equal to half the charging frequency, with the energy transfer capacitor being recharged twice for every bidirectional injection cycle. The switching converters charging the energy transfer capacitor can be run at even higher frequencies; so that the energy transfer capacitor is charged with multiple current pulses before it is discharged to inject energy into the resonated load circuit. In this case, the injection frequency is a sub-multiple (e.g. a third, fourth, fifth, etc) of the charging frequency.

The resonant frequency is governed by the capacitance and inductance of the resonated load circuit. Energy is injected into the resonated load circuit as a series of discrete pulses which excite electrical oscillations in the load circuit. Between consecutive injection pulses, the resonated load circuit oscillates freely at an instantaneous oscillation frequency that is equal to the resonant frequency of the resonated load circuit. But the average oscillation frequency, when averaged over one or more complete oscillation cycles, is governed by the injection frequency, i.e. the repetition frequency of the energy injection pulses.

The timing of each injection pulse relative to the periodicity of the natural resonance oscillations between injection pulses affects the timing of the following oscillation. For example, if the injection pulses are advanced or retarded relative to the periodicity of the natural resonance oscillations between injection pulses, the average oscillation frequency will be respectively offset above or below the resonant frequency of the resonated load circuit. Each injection into the load circuit effectively resets the resonant oscillations between injection periods and "locks" the average frequency of the oscillations in the load circuit to the injection frequency.

The resonant gain, and quality factor Q of the resonated load circuit, is not affected by the injection of energy in the manner described in this patent. In practice only a small fraction of the relatively large reactive energy oscillating in the resonant circuit is consumed in the load. For example, in an induction cook-top there can be 8 kVAR in the resonant circuit and only 1-2 kW transferred across space into the cooking pot at 90% coupling efficiency.

Although the invention functions well if the oscillation frequency is close to the natural resonant frequency, circuit operation may be unstable and/or the injection and/or overall circuit efficiency may be reduced. Circuit operation can be stabilised by selecting the injection frequency so that the average oscillation frequency is offset above or below the resonant frequency. The size of the offset controls the point in the oscillation cycle at which energy is injected into the load circuit.

For example, the injection frequency may be lowered to decrease the oscillation frequency to about 2% to 5% below the natural resonant frequency. This offset places the injection point before the zero-crossing of the second quadrant (i.e. on the falling but still positive quarter cycle) of the sinusoidal voltage across the resonated load circuit. With injection at this point, injection efficiency is high because the voltage on the discharging energy transfer capacitor and the voltage on the resonated load circuit fall in consort with one another. Injection at or below the zero-crossing point can still achieve very efficient results but may result in unstable operation and/or cause destructive voltage oscillations.

Alternatively, the injection frequency may be raised to increase the oscillation frequency above the natural resonant frequency. This offset shifts the injection point into the first quadrant (i.e. on the positive and rising quarter cycle) of the sinusoidal voltage across the resonated load circuit. In general, this up-shifting of the oscillation frequency is not as efficient as the down-shifting option described in the previous paragraph because the injection from the falling voltage on the discharging energy transfer capacitor is against a rising voltage on the load circuit. However, the circuit can still function in this mode.

In the specific embodiments shown in FIGS. 1A, 2A and 3A, the injection frequency is equal to the average oscillation frequency, with the switching circuit providing one injection pulse for every full oscillation cycle in the resonated load circuit.

Optionally, the injection frequency may be made equal to an integer multiple of the average oscillation frequency. The switching circuits shown in FIGS. 4A, 5A, 6A and 7A are examples of this case. In these circuits, two pulses (of opposite polarity) are injected for each full oscillation cycle in the resonated load circuit.

In another option, the average oscillation frequency is equal to an integer multiple of the injection frequency. In this case, the switching circuit provides one injection pulse for every two or more complete oscillation cycles in the resonated load circuit. This omission of injection pulses for some oscillation cycles can be useful as a power control technique to reduce the energy transferred to the load circuit.

One or more injection pulses may be injected over one or more oscillation cycles in the resonated load circuit, followed by one or more oscillation cycles with no injection. The omission of energy injection on some oscillation cycles may be used to control the amount of energy delivered to the inductive load device.

In carrying out the invention, the injection frequency can be set and then the resonating capacitance can be "tuned" to optimise the quality factor, or Q, and the overall efficiency of the resonating circuit: the object being to maintain the resonant oscillations of the resonated load circuit with the minimum of energy input. The input energy should be kept just sufficient to meet the circuit decrement.

The voltage or periodicity of the energy injection may be controlled automatically by a microprocessor or other programmable logic control device to maintain optimum "tune" of the resonating capacitor. For example, circuit operating characteristics may be monitored and the resonating capacitance adjusted to maintain overall circuit efficiency under different load conditions Circuit Efficiencies Efficiencies of circuits in accordance with the present invention are high compared to traditional induction heating inverter designs, such as the quasi-resonant, half bridge and full bridge inverter drives which are characterised by having the input energy fed into the circuit for half, or one quarter of, the period of the circuit operation every half, or second half, cycle.

High efficiencies are achieved by isolating the supply from the energy transfer capacitor when the energy transfer capacitor is being discharged into the resonated load circuit. In particular, high efficiencies can be achieved when there is no injection of energy from the energy transfer capacitance into the resonated load circuit while energy for charging the energy transfer capacitance is being delivered from the supply to the switching circuit.

In some embodiments recharging current may still be flowing into the energy transfer capacitor while the injection control transistor is turned 'on', or while injection current pulses are being injected into the resonated load circuit. For example, the embodiment of FIG. 2A uses a buck converter topology to connect the supply V21 to the energy transfer capacitor C21. In this embodiment, current from a flywheel inductor L21 may still be flowing into the energy transfer capacitor C21 while the injection control transistor Q22 is turned 'on', and while injection current pulses are being injected into the resonated load circuit.

Efficiency gains are derived from only having to meet the 'decrement' of the resonated load circuit, i.e. the energy lost per cycle, and by the efficient control of the amount of energy required to offset this decrement by injection via the energy transfer capacitor. In comparison, conventional half or full bridge drive circuits are "over driven" with current and minimal injection of the input energy is not achieved.

In the present invention, the injection frequency is advantageously set to provide an oscillation frequency below the natural resonant frequency. Also, the energy transfer capacitor is advantageously sized to hold enough energy to meet the circuit decrement, but also small enough to allow the drop in voltage on the energy transfer capacitor during the injection period to match, or be similar to, the fall in voltage near a zero crossing of the voltage across the resonated load circuit. The falling voltage on the optimally sized energy transfer capacitor as it discharges during injection is more efficient than the use of a more constant voltage available from a relatively larger sized reservoir capacitor as used in conventional inverters.

The present invention requires less energy than that typically required to supply the resonant work coil circuit. For example, by using the present invention to power a work coil, the same root mean square (rms) current in the work coil can be achieved with a typical saving of 15% to 30% of the input power. In one example, 1800 W is required to achieve a current of 22 A rms in a flat spiral wound 90 µH 0.1 ohm loaded work coil in a commercially-available induction cook top with a quoted coupling efficiency to the load of 90%. Using the present invention, a current of 22 A rms is achieved in the same work coil with a power input of approximately 1550 W.

However, if the work coil is configured with a higher Q factor by using heavier Litz wire and is made solenoidal in shape rather than pancake-shaped, then a current of 22 A can be achieved in the loaded work coil at the same 90% coupling efficiency and with an input power of only 900 W using a bidirectional energy injection technique according to the current invention. This is a very efficient method for driving resonant circuits, and particularly induction heating systems or inductive power transfer devices.

The coupling circuit of FIG. 6 as described further below and a typical prior art four transistor full bridge inverter circuit were simulated on a circuit simulation software programme and compared to provide an indication of efficiency gains obtainable by use of the current invention. In the typical prior art full bridge inverter, a 104 µH induction heating work coil was combined with a 0.605 µF resonating capacitor and driven at 20 kHz by four switching transistors in a full wave bridge inverter circuit. This circuit drew 1.055 kW from the supply to produce a current of 62 amperes in the work coil. By way of comparison, when the identical 104 µH induction heating work coil was connected in place of transformer T61 and resonated with a 0.605 µF capacitor C62 in the circuit of FIG. 6A driven at 20 kHz, this circuit drew only 759 watts from the supply to drive 62 amperes through the work coil. This represents a 28% reduction of the power input required by the prior art circuit to achieve the same work coil current and is typical of the results seen in the practical application of the present invention in induction heating applications.

Power Control

The power delivered to the resonated load circuit or work coil by circuits according to the present invention can be easily controlled by controlling or altering the quantity of energy stored in the energy transfer capacitor. This can be done by selecting a suitably-sized energy transfer capacitor, and/or by controlling the voltage to which the energy transfer capacitor is charged before injection of energy into the resonated load circuit. This voltage control may be achieved by using pulse width modulation of the energy supply recharging the energy transfer capacitor. The injection frequency or the timing or duration of the injection period can also be varied to control or limit the energy fed to the resonated load circuit. The number current pulses injected per resonant load cycle, or the repetition frequency of the injected current pulses, can also be controlled to vary the amount of energy fed to the resonated load circuit.

For higher power requirements each injection period can be extended to a full quarter cycle and by this extension, and with control of the injection method, injection point and injection frequency, the current waveform in the work coil can be broadened to a "double humped" pulse that carries substantial energy, thereby providing a high power operating mode. This injection method still maintains high efficiencies and provides a large degree of induction heating power control at high power.

Energy Injection Across Parallel Load Circuit

Energy injection into the resonated load circuit may be either by series or parallel injection. Parallel injection is generally easier to implement because it does not require the closed loop of the resonated load circuit to be opened to allow injection, as does series injection.

Figure 4A:
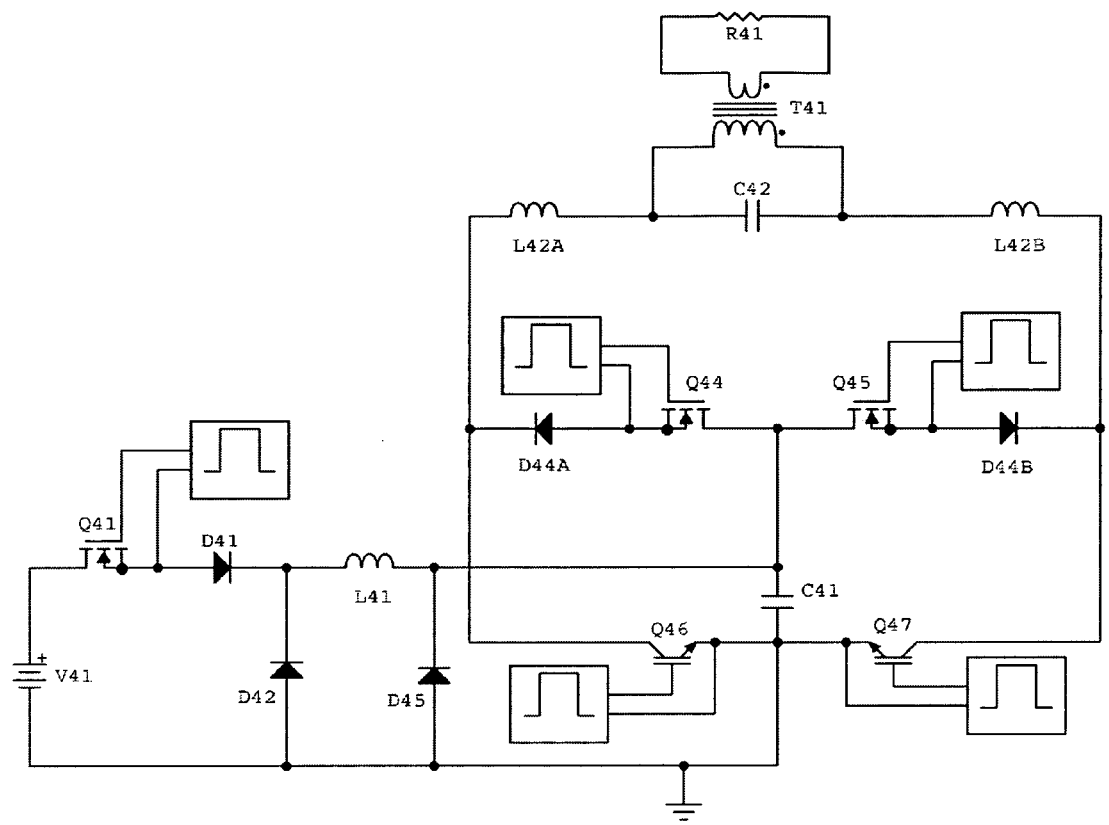
FIG. 4A shows a circuit illustrating a fourth embodiment of the invention for injecting bidirectional current pulses into a resonated load circuit provided by an inductive device and a resonating capacitor connected in parallel.
Figure 5A:
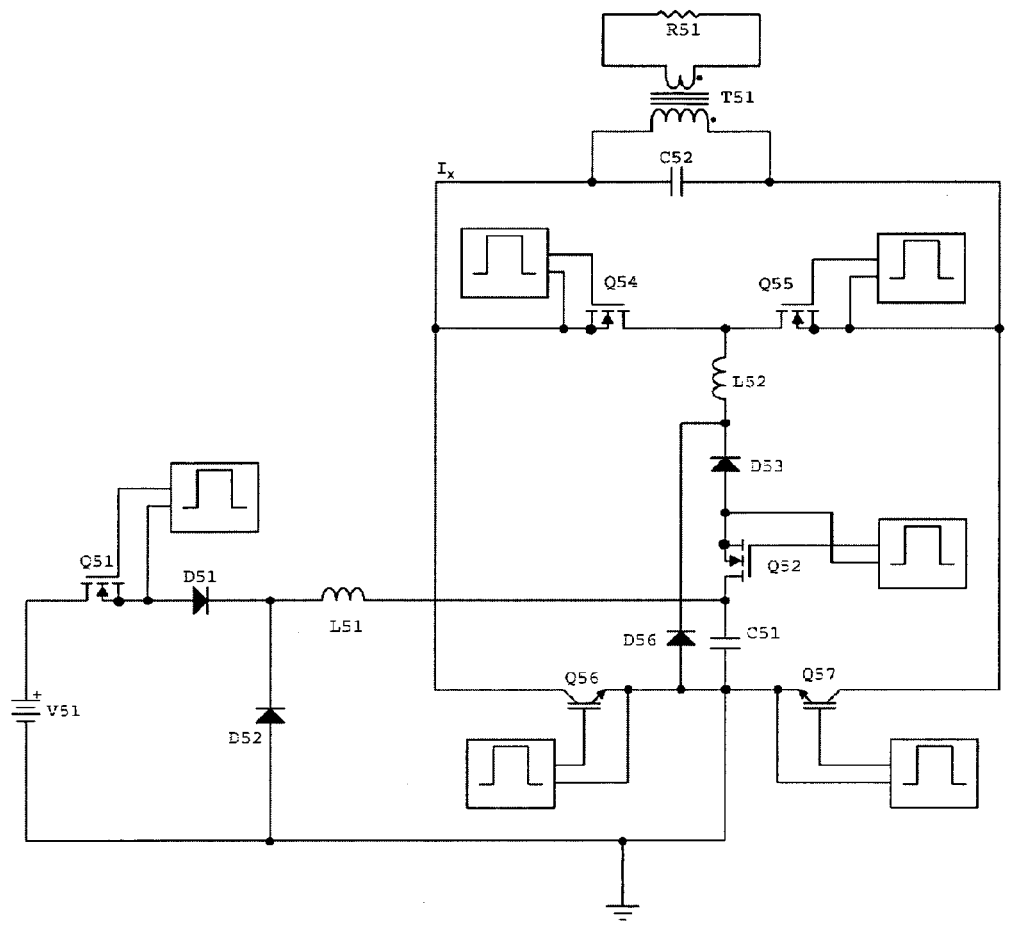
FIG. 5A shows a circuit illustrating a fifth embodiment of the invention for injecting bidirectional current pulses into a resonated load circuit provided by an inductive device and a resonating capacitor connected in parallel.

In the embodiments shown in FIGS. 1A, 4A and 5A, the resonating capacitor and the inductive load device remain continually connected in parallel and the switching circuit is arranged, when in the energy injecting configuration, to connect the energy transfer capacitor effectively in parallel across the parallel-connected combination of the resonating capacitor and the inductive load device. One advantage of parallel injection is the avoidance of high active switching devices in the parallel connected load circuits where circulating resonant currents are typically much higher than in the injection circuit. Switching devices must have much higher speed and current ratings if used inside the resonant load circuit loop where circulating currents are very much higher than in the injecting circuit.

When the discharge current from the energy transfer capacitor is injected into a parallel-connected load circuit, such as those of FIGS. 1A, 4A and 5A, the injection efficiency can be lowered by the relatively high currents that are caused to flow into the capacitive leg of the resonated load circuit, particularly at low operating frequencies, e.g. 50 to 500 Hz. Embodiments 3A and 7A are designed to overcome this situation as described below.

Energy Injection into Series Load Circuit

Figure 6A:
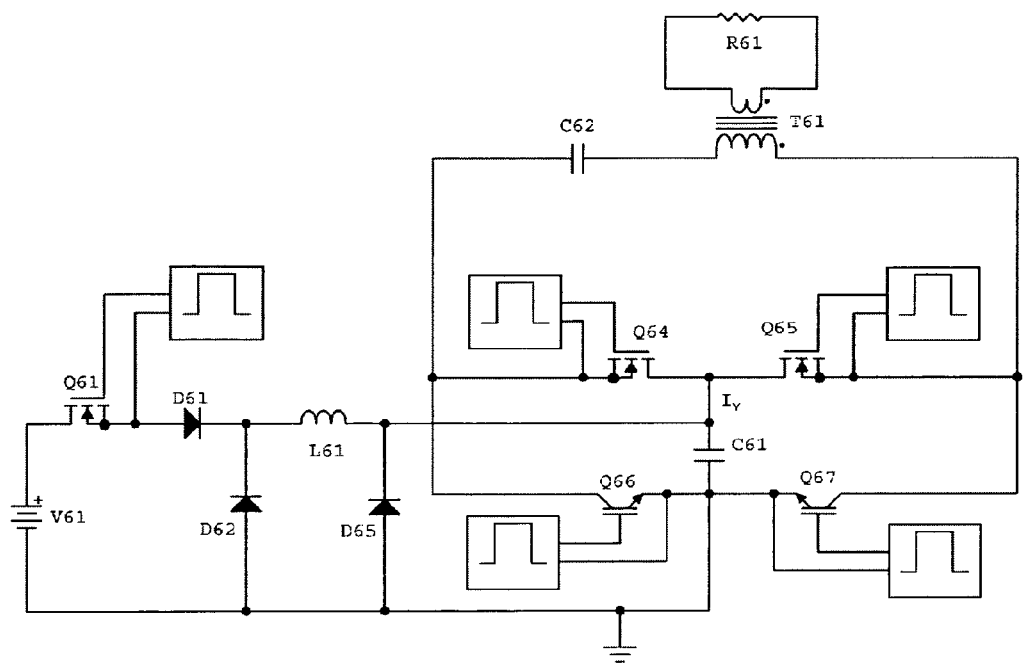
FIG. 6A shows a circuit illustrating a sixth embodiment of the invention for injecting bidirectional current pulses into a resonated load circuit provided by an inductive device and a resonating capacitor connected in series.
Figure 8A:
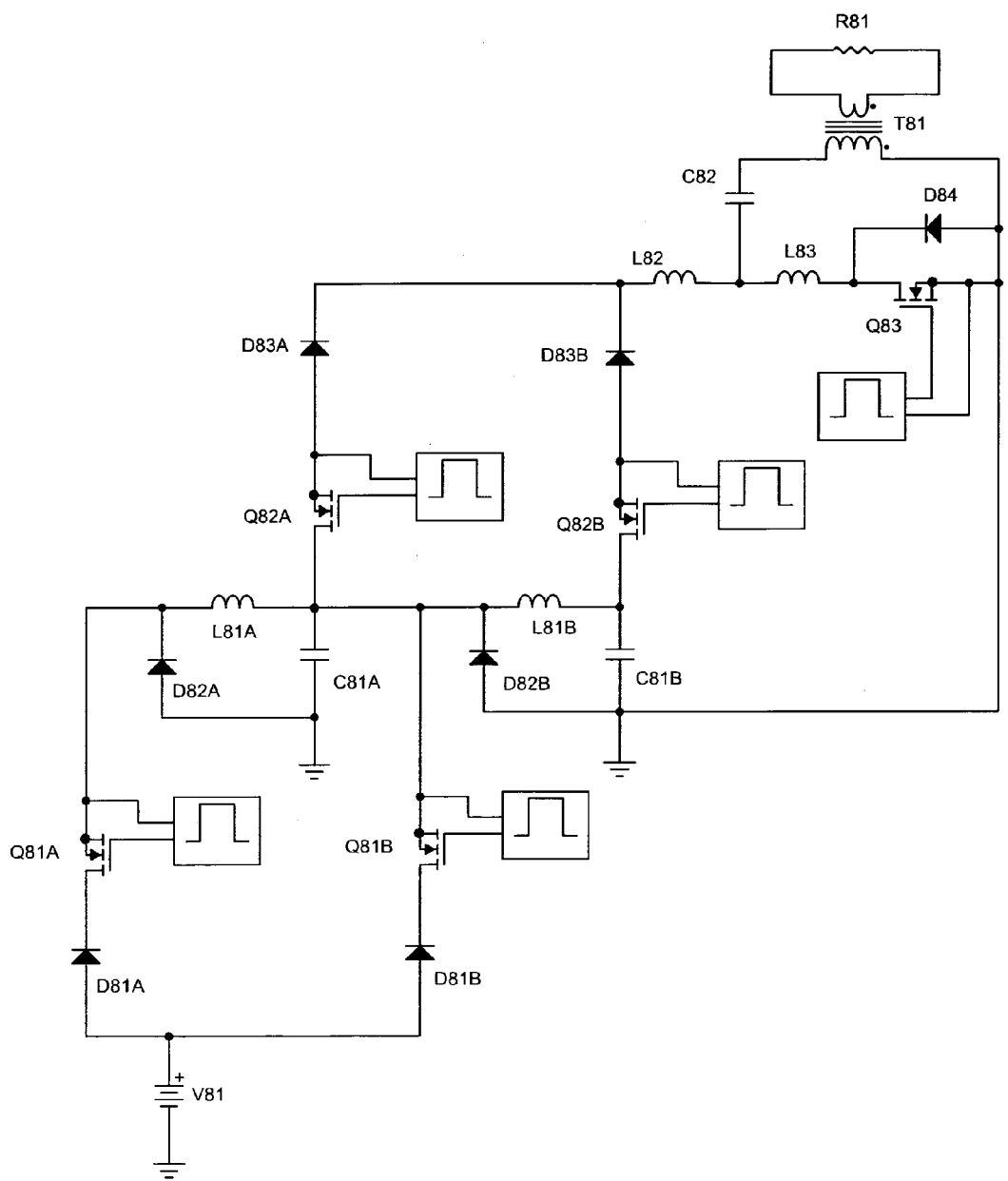
FIG. 8A shows a circuit illustrating an eighth embodiment of the invention for injecting unidirectional current pulses into a resonated load circuit provided by an inductive device and a resonating capacitor connected in series.

In the embodiments shown in FIGS. 2A, 6A and 8A, the switching circuit is arranged, when in the energy injecting configuration, to open the resonated load circuit and effectively connect the energy transfer capacitor, the resonating capacitor and the inductive load device in a series circuit. This series injection method can provide high efficiencies because the injection is through both the capacitor and the inductive load device of the resonated load circuit. The injection currents are able to be accurately controlled and positioned in the most efficient point in the resonant cycle. However, the series injection method requires more accuracy and control of the switch timing so as to avoid spikes and short circuit paths which can arise due to crossovers, or overlaps, between timing of the injection and the opening of the resonant circuit.

Energy Injection into Inductive Load Device

Figure 7A:
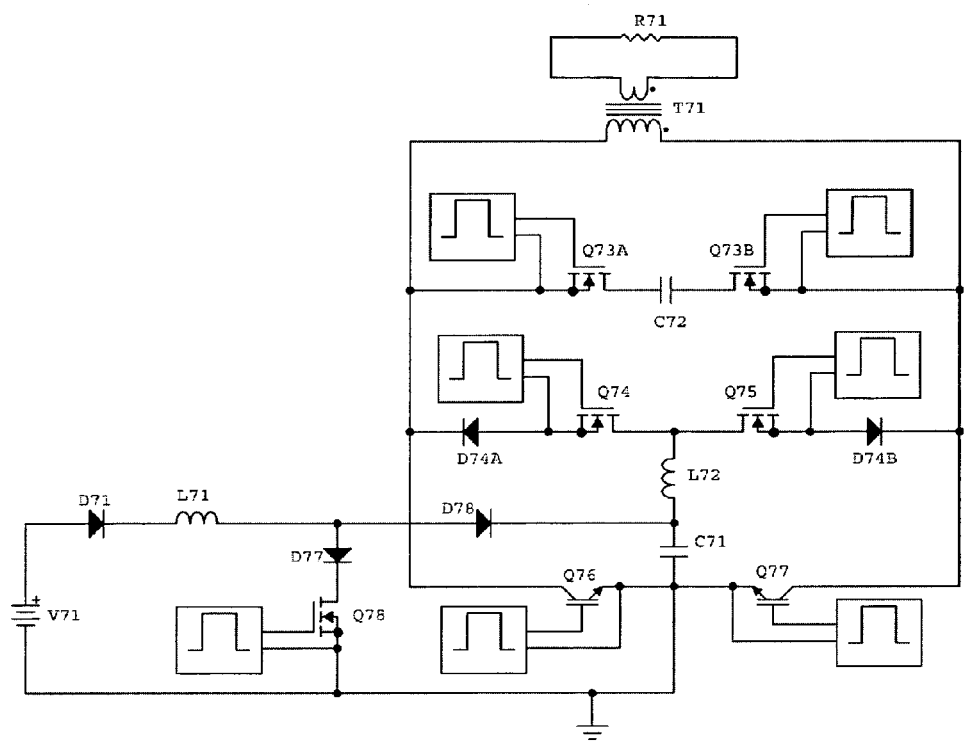
FIG. 7A shows a circuit illustrating a seventh embodiment of the invention for injecting bidirectional current pulses into an inductive device of a resonated load circuit provided by the inductive device and a resonating capacitor.

In the embodiments shown in FIGS. 3A and 7A, the switching circuit is arranged, when in the discharging configuration, to open the resonated load circuit and effectively connect the energy transfer capacitor and the winding of the inductive load device in a series circuit without the resonating capacitor. As noted above, injection of current pulses into the resonated load circuit by the parallel method causes the resonating capacitor in the load circuit to absorb unnecessarily large injection currents from the energy transfer capacitor. This lowers the overall circuit efficiency. By having a "blocking" switch behind the resonating capacitor, for example as in FIGS. 3A and 7A, the injection current is forced to flow through the inductive component of the load circuit, thereby limiting the amplitude of the injection current pulses. This serves to increase the injection efficiency because the injected current 'lifts' the circulating current through the inductive component only, directly replenishing the per cycle current decrement.

Injection Polarities

In the embodiments shown in FIGS. 1A, 2A, 3A and 8A, the switching circuit is arranged to inject energy from the energy transfer capacitor, or capacitors in the case of FIG. 8A, into the resonated load circuit as a sequence of unidirectional current pulses, i.e. as a sequence of pulses all having the same polarity.

In the embodiments shown in FIGS. 4A, 5A, 6A and 7A, the switching circuit is arranged to inject energy from the energy transfer capacitor into the resonated load circuit as a sequence of bidirectional current pulses, i.e. as a sequence of pulses of alternating polarity.

Injection Control Inductors

The connection of the energy transfer capacitor to the resonated load circuit is made through a series inductor $L12$, $L22$, $L32$, $L52$, $L72$ and $L82$ in the embodiments shown in FIGS. 1A, 2A, 3A, 5A, 7A and 8A, and though a pair of series inductors $L42A$ and $L42B$ in the embodiment shown in FIG. 4A. These series injection control inductors are used to control the current pulse injected into the resonated load circuits. The series injection control inductors reduce the initial discharge current transient from the energy transfer capacitor which would otherwise occur, for example in the embodiments shown in FIGS. 1A, 4A and 5A when the energy transfer capacitor is connected directly in parallel across the resonating capacitor.

These injection control inductors can also stop the resonated load circuit from feeding energy back into the injection circuitry, especially in circuits using energy injection across parallel load circuits operating at low frequencies. The inclusion of series injection control inductors in the circuits is optional and may depend on a number of factors such as operating frequency, size of energy transfer capacitor, and voltage to which the energy transfer capacitor is charged. Direct injection from the transfer capacitor, without any injection control inductor, can result in higher injection efficiencies in some circuit configurations.

Injection Resonances

The injection circuit component values are selected to reduce, and preferably avoid, parasitic oscillatory switching transients during energy injection into the resonated load circuit, but allow the load circuit to oscillate at or near its natural resonance between injections. For example, the values of the inductive and capacitive components in the injection circuit loop are selected so that the circuit stores the required energy at a suitable voltage, and also so that the natural resonant frequency of the injection circuit loop is not equal to the instantaneous or average frequency of the oscillations in the load circuit. This selection of component values suppresses parasitic or transient injection resonances which could otherwise make circuit operation unstable.

Supplies

The supplies of electrical energy $V11$, $V21$, $V31$, etc, are each shown in the figures as a DC source. However, the circuits described herein may be supplied from any suitable supply, for example, a rectified 50 Hz or 60 Hz AC mains supply or a switch-mode supply, preferably via one or more filter inductors and filter or reservoir capacitors. Preferably, the supply has a large reservoir capacitor placed across the DC output of the supply near the drive circuit for supplying pulse currents.

Suitable supplies may include a transformer with a step-up, step-down, or 1:1 winding ratio, and a full wave bridge rectifier providing DC from the off-line AC.

Alternatively, the output from a direct-coupled off-line supply may be rectified by a full wave bridge rectifier to provide DC from the off-line AC.

The circuits of the present invention may be supplied by batteries, optionally fed through suitable inductor/capacitor filter circuits, and/or DC-DC converters for stepping up or stepping down the battery voltage to obtain the voltage for the drive circuit.

Switch Couplers

The switching devices used in the present invention are preferably metal oxide semiconductor field effect transistors (MOSFETs) or insulated gate bipolar transistors (IGBTs). The gates of the FET switches shown in the embodiments of the current invention may be driven from a pulse generator through an optically isolated opto-coupler, for example HCPL-3120 from Hewlett Packard. The opto-coupler may be powered from a 15 volt supply derived from an electrically isolated DC to DC converter. One suitable converter is NME1215S from C&D Technologies which provides 2 kV isolation and supplies 1 watt at 15 volts output for a 12 volt input.

The 12 volt supply for the electrically isolated converter may be derived from an AC or DC supply. TRECO supplies one suitable converter that converts 50 Hz 240 volts AC to 12 volts DC for supplying the electrically isolated converter.

Supply Converters

Energy from the respective supplies V11-V81, is delivered to the energy transfer capacitors C11-C71, C81A and C81B, through a supply switching circuit primarily comprising a supply switching transistor Q11-Q71, Q81A and Q81B.

The supply switching circuit is configured as a buck converter in the circuits shown in FIGS. 1A to 6A and 8A, and as a boost converter in the circuit shown in FIG. 7A. The choice of supply converter type and its control system depends in part on whether the supply voltage is higher or lower than the voltage to which the energy transfer capacitor is to be charged. The supply switching transistors control the charging of the energy transfer capacitors, with the charging current pulses delivered from the supply V11-V81, being controlled or shaped by the series inductor L11-L71, L81A or L81B. The value of the inductor L11-L71, L81A and L81B is chosen to optimise the shape of the current pulse and the level of power transferred to the energy transfer capacitor in the time available.

Switch Controller

The switching devices, for example the MOSFETs and IGBTs, of the controlled switching circuits shown in the accompanying figures are controlled by any suitable controller (shown only schematically as individual gate drivers for each switching device). For example, the controller may be a discrete logic controller, a microprocessor, micro-controller or other suitable digital logic or programmable logic device that can provide the switching devices with control pulses or signals of the required amplitude and timing. In some applications it is envisaged that the control signals provided to the switching devices by the controller will be responsive to one or more operating conditions associated with the inductive load device. For example, where the inductive load device is an induction heating coil, the timing of the control signals provided to the switches may be responsive to the temperature of the object being heated or the load on the circuit. Alternatively the current circulating in the resonated load device may be sensed for providing information to a control device that controls the switching times of the switching devices.

Controlled Switches

The switching devices of the controlled switching circuits may be any switch suitable for the currents and voltages encountered, and having suitable switch characteristics such as switching speed, low 'on' or closed resistance, and high 'off' or open resistance.

For induction heating applications, insulated gate bipolar transistors (IGBTs) International Rectifier IRGBH50F, or IRGPC40U, IRGPC50F or IRGPC50U, or Motorola MGY40N60, or Philips Semiconductors ECG3322, and metal oxide semiconductor field effect transistors (MOSFETs) International Rectifier IRFPG50, IRFK4HC50, IRFK4HE50, IRFK4JE50, IRFK4J450, IRFK4HE450, IRFK6J350 or IRFK6H350, have been found suitable for the semiconductor switching devices shown in the circuits of the accompanying figures.

The switches are coupled to the controller by any suitable means. However, the controller, the type of switches, and the coupling between controller and switches do not form part of the present invention. In some specific embodiments, FET or IGBT switches are coupled to the switch controller by isolated drivers for example HCPL-3120 gate drive optocoupler from Hewlett Packard, with gate drives powered by isolated converter supplies, for example 1215S from C & D Technologies. This isolated coupling arrangement insures that any failure of the controlled switches in the capacitor charging or energy injection circuits does not damage the switch controller References herein to transistors or switches being switched 'off' or made 'non-conductive' are to be understood as referring to a transistor or switch presenting a relatively non-conductive state in a primary path, for example between source and drain, through the transistor or switch for current flowing in one direction but not excluding a conductive state through the primary path for current flowing in an opposite direction. For example, a MOSFET may be switched 'off' to substantially prevent current flowing through the MOSFET in one direction, but still provide a conductive path for current flowing through the MOSFET in the opposite direction. This reverse conductive path is typically provided by an inherent semi-conductive diode that results from fabrication processes used to manufacture some MOSFETs. It is also to be noted that MOSFETs shown in the accompanying figures do not show inherent body diodes as discrete components. A discrete supplementary diode (for example diode D34 in FIG. 3A) may be connected in parallel across a primary path of a transistor switch to augment the current carrying capacity provided by the inherent body diode.

Diodes

Some of the switching devices of the invention are semiconductor diodes which inherently provide a conductive or closed state (i.e. a relatively low resistance path) to currents flowing in one direction but provide a non-conductive or open state (i.e. a relatively high resistance path) to currents flowing in an opposite direction. The diodes may be used alone or in conjunction with controlled switching devices. In the latter case, diodes can be used in parallel or in series with the controlled switch, depending on the switching required.

Where discrete semiconductor diodes are used, Intersil 1200V, ultra fast diodes RHRG30120 (30 A) and RHRG75120 (75 A) have been found to be suitable.

The semiconductor diodes require a small forward bias voltage to make the diodes conductive. This requirement has generally been ignored in the following description to simplify the explanation of circuit operation.

Capacitors

Each described embodiment of the invention comprises at least two capacitances.

At least one capacitance temporarily stores energy derived from a supply of energy prior to subsequent transfer of the energy to a resonated load circuit. These capacitances can be provided by one or more discrete capacitors and are, for convenience, generally referred to in this specification by the term "energy transfer capacitor".

Another capacitance is connected to the inductive load device to resonate with the inductive load device and form a resonated load circuit. This capacitance can be provided by one or more discrete capacitors and is, for convenience, generally referred to in this specification by the term "resonating capacitor".

The terms "energy transfer capacitor" and "resonating capacitor" are used in this specification to help distinguish the function of these capacitors from one another and from other capacitors (not shown in the figures), for example power supply reservoir or filter capacitors, which may be used in some variations of the described embodiments.

The energy transfer capacitors and resonating capacitors described in the following embodiments are preferably low loss capacitors having low equivalent series resistances and inductances. Suitable capacitors are metallised polypropylene pulse capacitors, or metallised polypropylene foil-film capacitors for applications where the capacitors must withstand high voltages and currents at high switching speeds and frequencies.

Preferred energy transfer capacitors are metallized polyester or polypropylene film pulse capacitors from Cornel Dubilier Electronics, Evox Rifa or EPCOS.

Preferred resonating capacitors are polypropylene film foil series wound capacitors such as Type PC/HV/S/WF capacitors from LCR Capacitors (EU) Ltd, or Type 942 C polypropylene film, metal foil and metallized polypropylene dielectric hybrid capacitors from Cornell Dubilier Electronics.

In each case, multiple capacitors can be connected in parallel to achieve the desired capacitance value, to substantially reduce the equivalent series resistance (ESR), and to provide adequate current capacity. For example, parallel combinations of fourteen 0.047 µF capacitors, or seven 0.1 µF capacitors have been used to provide the resonating capacitor in some of the circuits described below.

A suitable value of the energy transfer capacitor can be determined by simulating the circuit in a suitable circuit simulation software package and determining the capacitor value for maximum efficiency.

For high power applications, where a large amount of energy needs to be fed into the resonating circuit, two energy transfer capacitors can be used alternately, or more than two energy transfer capacitors can be used successively.

In one alternating two-capacitor arrangement, a first energy transfer capacitor is discharged to inject a current pulse into the resonant load circuit. The first energy transfer capacitor is then recharged from the supply. A second energy transfer capacitor is then discharged to inject a second current pulse into the resonant load circuit, and finally the second energy transfer capacitor is then recharged from the supply. The cycle is then repeated. The two charge and two discharge phases occur sequentially without overlap.

In another alternating two-capacitor arrangement, a first energy transfer capacitor is discharged to inject a current pulse into the resonant load circuit while a second capacitor is being recharged from the supply. The second energy transfer capacitor is then discharged to inject a second current pulse into the resonant load circuit while the first energy transfer capacitor is being recharged from the supply. Each charge phase overlaps a discharge phase.

Unless clamped, e.g. by a diode, the voltage on the energy transfer capacitor can drop below zero if the capacitor value is too small. This situation will decrease efficiency and demand relatively high energy levels from the supply to recharge the energy transfer capacitor. The voltage on the energy transfer capacitor can be clamped, for example by a diode, to prevent it going below zero, e.g. by diode D45 or D65 in the embodiments shown in FIGS. 5A and 6A.

The resonating capacitance may be provided by a single capacitor or may be provided by multiple capacitors combined in parallel and/or in series to achieve desired current and voltage ratings. The value of the resonating capacitance can be controlled, for example by switching capacitors in and out of circuit under control of a microprocessor or other programmable logic control device, to maintain the resonating load circuit in the appropriate state of 'tune', i.e. within a predetermined best operating range.

The resonating capacitance may be provided at one location in the circuit as is shown by capacitor C12-C82 in the figures. Alternatively the resonating capacitance may be split and provided as two capacitors at discrete locations on either side of the inductive load device. For example, resonating capacitors C22 and C62 in FIGS. 2A and 6A may be substituted by capacitors connected in series at each end of the primary winding of the respective transformer winding T21 or T61.

Inductive Load Device

The inductive load device in the specific embodiments described below is a work coil of an induction heating system but could be another inductive power device, for example an A.C. induction or synchronous reluctance motor with windings run in resonance mode, or the primary winding of coupled inductors, or the primary winding of an inductive power transfer or transformer device.

For circuit simulation purposes, the inductive load device is an induction heating work coil, which is represented in the figures accompanying this specification as the primary winding of a loosely coupled transformer. In the circuit embodiments described below, the transformer coupling is typically 50%. The secondary winding of the transformer and a low resistance load connected to the secondary winding represent the eddy current circuits in the work piece that is enclosed by the induction heating coil and in which induced eddy currents flow. A resonating capacitance, provided by a single capacitor or by multiple capacitors, is connected to the primary winding of the transformer. The resonating capacitance, the transformer primary winding, and the resistive load on the loosely coupled secondary winding together form a resonated load-circuit.

Detailed Description of Specific Embodiments

First Embodiment

Figure 1B:
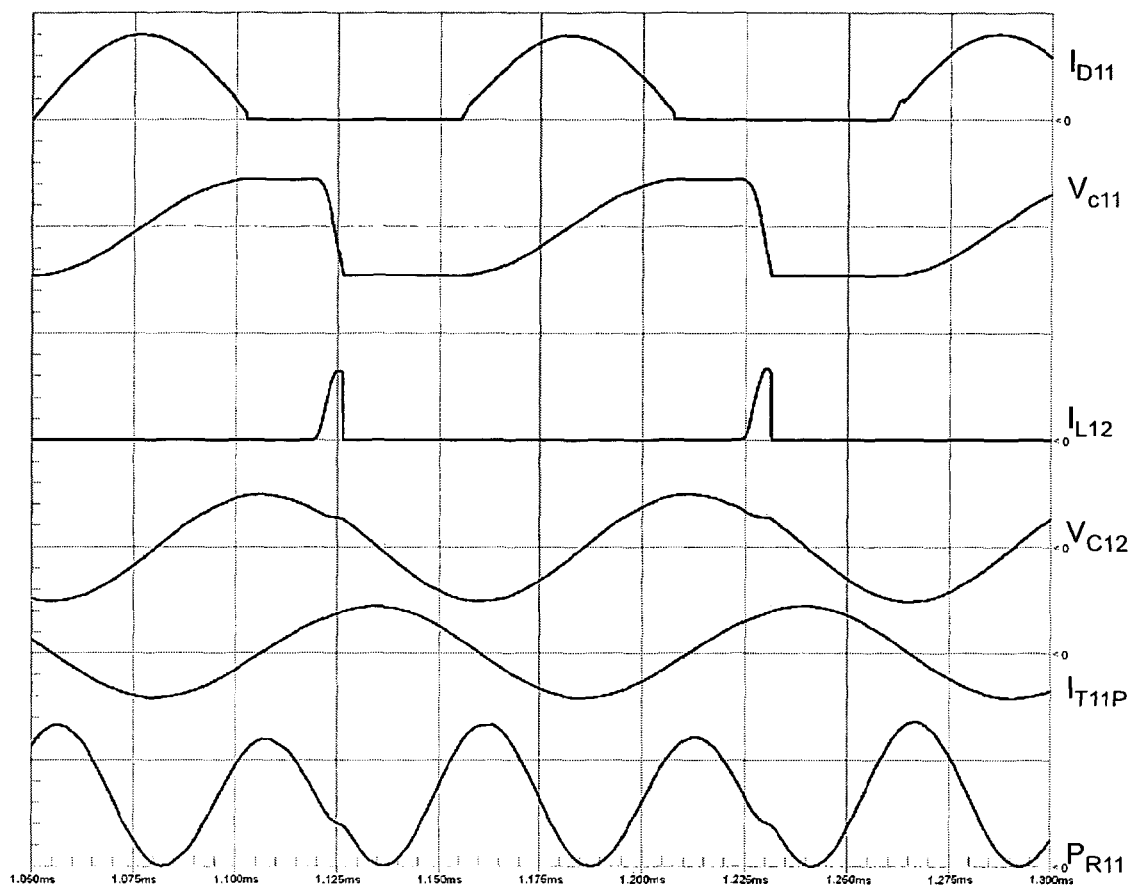
FIG. 1B shows current, voltage and power waveforms for the circuit of FIG. 1A operating below natural resonance.
Figure 1C:
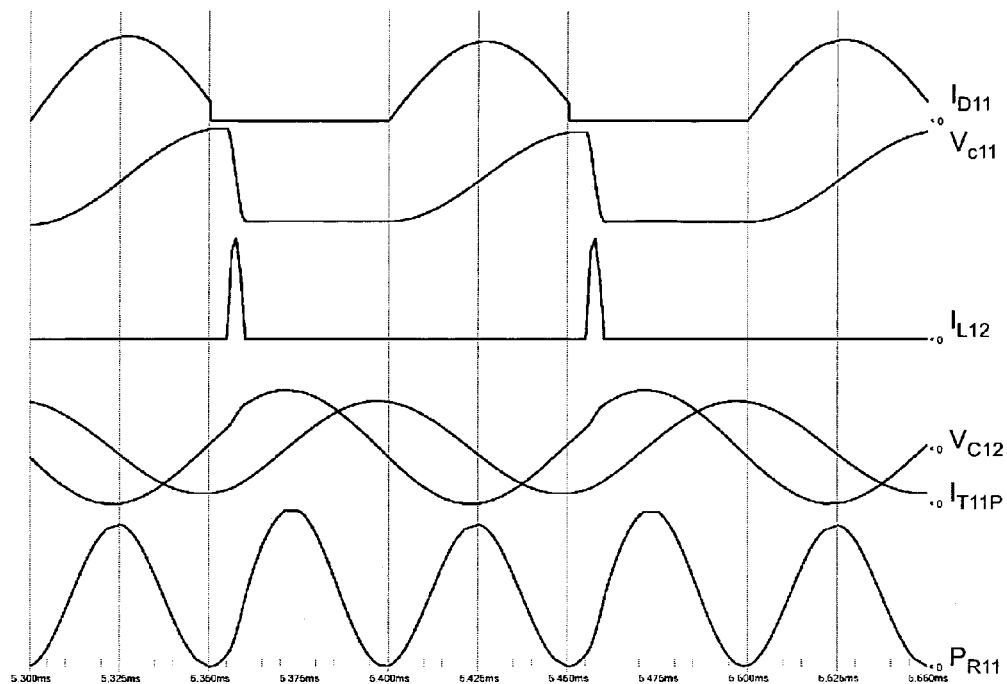
FIG. 1C shows current, voltage and power waveforms for the circuit of FIG. 1A operating above natural resonance.

FIG. 1A shows a circuit and FIGS. 1B and 1C show two sets of waveforms, for two specific versions of a first embodiment of the invention. This circuit injects unidirectional current pulses into a parallel resonated load circuit formed by a resonating capacitor C12 connected to an inductive load device. The inductive load device is a work coil of an induction heating system and is represented in FIG. 1A by the primary winding of a loosely coupled transformer T11. The resonating capacitor C12 is continuously connected in parallel with the transformer primary winding. A low resistance load resistor R11 is connected across the transformer secondary winding to represent the work piece of the induction heating system. A DC supply of electrical energy V11 is coupled to the resonated load circuit by a switched coupling circuit.

As shown in FIG. 1A, the switched coupling circuit includes a charging control transistor Q11, series blocking diode D11, a free-wheel diode D12, a series inductor L11, an energy transfer capacitor C11, an energy injection control transistor Q12, a series blocking diode D13 and a series injection control inductor L12.

The switched coupling circuit is repeatedly arranged in the following sequence of configurations to transfer energy from the supply to the resonated load circuit:
1. a capacitor charging configuration,
2. a first optional isolating configuration
3. a capacitor discharging and energy injection configuration, and
4. a second optional isolating configuration.

In the capacitor charging configuration, charging control transistor Q11 is 'on', i.e. made substantially conductive, and energy injection control transistor Q12 is 'off', i.e. made substantially non-conductive. In this charging configuration the supply of electrical energy V11 is connected, through a series circuit of charging control transistor Q11, diode D11 and inductor L11 to the energy transfer capacitor C11. Simultaneously, injection control transistor Q12, being in the turned 'off' state, ensures the energy transfer capacitor C11 is disconnected from the resonated load circuit. The energy transfer capacitor C11 is charged from the supply of electrical energy V11 through transistor Q11, diode D11 and series inductor L11.

The inductor L11 controls the rate of rise of current drawn from the supply V11 at initial turn-on of the charging control transistor Q11. The amount of charge on the energy transfer capacitor is controlled by selection of the voltage of the supply V11, the capacitance of the energy transfer capacitor C11, the inductance of the inductor L11 and the duration of the time period that transistor Q11 is held 'on'.

At the end of the charging configuration charge control transistor Q11 is turned 'off'. The coupling circuit may then be configured in an optional isolating configuration with both charging control transistor Q11 and injection control transistor Q12 remaining switched 'off' for a short period.

At this time, the inductor L11 may have some residual magnetic field. In this case, the energy transfer capacitor C11 will continue to charge from current induced in the inductor L11 by collapse of its residual magnetic field. The free-wheel diode D12 (also known as a fly-wheel diode) then conducts to allow this charge current to flow around the series circuit provided by inductor L11, energy transfer capacitor C11 and diode D12, until the magnetic field has collapsed completely, adding further charge into the transfer capacitor C11.

In some embodiments, the energy transfer capacitor C11 may be charged to a voltage greater than that of the supply by transient resonance of the capacitor C11 with the series inductor L11 or by inductive-capacitive overshoot known as the "Moorcroft effect".

The blocking diode D11 is included when charge control transistor Q11 is a MOSFET or similar device with an inherent body diode providing a reverse conductive path from source to drain, even when the transistor is turned 'off'. The blocking diode D11 prevents discharge current from the energy transfer capacitor C11 flowing back into the supply V11 through this inherent MOSFET body diode. Without the blocking diode D11, this discharge current could flow even when the transistor Q11 was turned 'off'.

Once the transfer capacitor charge cycle is complete, the coupling circuit is then configured in the injection configuration, with charging control transistor Q11 switched 'off', disconnecting the energy transfer capacitor C11 from the supply of electrical energy V11, and with energy injection control transistor Q12 is switched 'on', connecting the energy transfer capacitor C11, through blocking diode D13 and series pulse control inductor L12, across the resonated load circuit. The energy transfer capacitor C11 is effectively connected across the parallel combination of the resonating capacitor and the inductive load device represented in FIG. 1A by the transformer T11 and load resistor R11.

In the injection configuration, the energy transfer capacitor C11 discharges through transistor Q12, forward biased blocking diode D13 and injection control inductor L12 to inject energy into the parallel resonated load circuit. This injection occurs when transistor Q12 is 'on' and the voltage on the energy transfer capacitor C11 is greater than the instantaneous voltage across the resonated load circuit, i.e. across resonating capacitor C12. The injection will continue until either the transistor Q12 is turned 'off' at the cessation of the injection configuration, or the blocking diode D13 becomes reverse biased. Diode D13 becomes reversed biased when the voltage on the discharging energy transfer capacitor C11 falls below the instantaneous voltage across the resonated load circuit, i.e. across resonating capacitor C12.

The blocking diode D13 is included when energy injection control transistor Q12 is a MOSFET or similar device with an inherent body diode providing a reverse conductive path from source to drain, even when the transistor is turned 'off'. The blocking diode D13 prevents reverse current flow from the resonated load circuit back into the energy transfer capacitor C11 through the inherent MOSFET body diode. Without the blocking diode D13, this reverse current could flow even when the transistor Q12 was turned 'off'.

The discharge current from energy, transfer capacitor C11 in this embodiment is always injected into the resonated load circuit with the same polarity. That is, the discharge current is injected into the resonated load circuit as a sequence of pulses all having the same polarity. In the circuit shown in FIG. 1A, current pulses are injected into the resonated load circuit to flow clockwise around the loop formed by capacitor C11, transistor Q12, blocking diode D13, inductor L12 and the parallel connection of the resonating capacitor C12 and the primary winding of the transformer T11.

After the injection configuration, the coupling circuit is configured in the isolating configuration. In the isolating configuration, both transistors Q11 and Q12 are 'off' (i.e. made substantially non-conductive), thereby disconnecting and isolating the energy transfer capacitor C11 from the supply of electrical energy Vii and from the resonated load circuit formed from resonating capacitor C12 and the inductive load device represented by the transformer T11 and load resistor R11.

When energy injection control transistor Q12 is turned 'off' at the beginning of the isolating configuration, circulating current flowing in the resonated load circuit will continue to circulate substantially at or near the natural resonant frequency of the resonated load circuit until the next injection of energy.

The switching circuit is repetitively configured in the sequence of the charging configuration, optionally the isolating configuration, the injection configuration and the isolating configuration to transfer energy from the supply of electrical energy V11 to the inductive load device via the energy transfer capacitor C11.

The charging and injection configurations may overlap by omitting one or both of the isolating configuration stages. For example, the injection control transistor Q12 may be turned 'on' to configure the circuit in the injection configuration before the charging control transistor Q11 is turned 'off' at the cessation of a charging configuration. But the discharge of energy transfer capacitor C11, and the concomitant injection of energy into the resonated load circuit, does not necessarily commence immediately upon the turn-on of injection control transistor Q12.

FIG. 1B shows current, voltage and power waveforms of a first specific version of the first embodiment circuit shown in FIG. 1A having the following details.

| | | |
|---|---|---|
| Supply V11 | | 300 volts |
| Transistor Q11 | MOSFET | IRFK4HC50 |
| Transistor Q12 | MOSFET | IRFK4HE50 or IRFK4JE50 |
| Switching frequency of transistors Q11 and Q12 | | 9.52 kHz |
| Switching period of transistors Q11 and Q12 | | 105 µS |
| Inductor L11 | | 195 µH |
| Energy transfer capacitor C11 | | 1.50 µF |
| Inductor L12 | | 4 µH |
| Resonating capacitor C12 | | 1.36 µF |
| Resonated load circuit inductance (transformer T11 primary winding) | | 195 µH |
| Natural resonant frequency of load circuit | | 9.77 kHz |
| Energy injection (i.e. switching) frequency | | 9.52 kHz |

During each repetition of the 105 µS switching period of the MOSFET transistors Q11 and Q12, the charging control transistor Q11 is 'on', i.e. conductive, from 0-52 µS and is then 'off' from 52-105 µS, and the injection control transistor Q12 is 'off', i.e. non-conductive, from 0-50 µS, is 'on', i.e. conductive, from 50-76 µS, and is 'off' from 76-105 µS.

FIG. 1B shows the following waveforms from 1.05-1.3 mS from start-up of the first specific version of the circuit of FIG. 1A.

$I_{D11}$, current in diode D11, shown at 5 A/division
$V_{C11}$ voltage across energy transfer capacitor C11, shown at 100 V/division
$I_{L12}$ current in inductor L12, shown at 50 A/division
$V_{C12}$ voltage across resonating capacitor C12, shown at 1000 V/division
$I_{T11P}$ current in transformer T11 primary winding, shown at 100 A/division
$P_{R11}$ power in the load resistor R11, shown at 500 W/division During switch-on of charging control transistor Q11 (e.g. from 1.050-1.102 mS in FIG. 1B), energy transfer capacitor C11 is charged by current $I_{D11}$ flowing through diode D11. This current rises from zero to a peak value of approximately 3.75 A before falling back toward zero, with an approximately half-sinusoidal shape governed by the pulse shaping effect of the series resonant combination of inductor L11 and energy transfer capacitor C11. During this charging, the voltage $V_{C11}$, across the energy transfer capacitor rises from approximately 255 V to approximately 345 V.

The injection control transistor Q12 is switched 'on' (e.g. at 1.100 mS in FIG. 1B) but injection of current and energy from the energy transfer capacitor C11 into the resonated load circuit does not occur until the voltage across the resonated load circuit, shown by the voltage $V_{C12}$ across the resonating capacitor C12, falls below the 345 V across the energy transfer capacitor, thereby forward biasing the blocking diode D13. For example, FIG. 1B shows this injection commencing at approximately 1.120 mS and continuing until 1.126 mS when the injection control transistor Q12 is switched off.

The injection current, which is shown in FIG. 1B as $I_{L12}$, is a pulse which peaks at approximately 34 A. The injection current flows from the energy transfer capacitor C11, through injection control transistor Q12, blocking diode D13, inductor L12 and into the parallel connection of resonating capacitor C12 and the inductive load device represented in FIG. 1A by the primary winding of transformer T11. The flow of injection current from the energy transfer capacitor C11 discharges the energy transfer capacitor; the voltage on the energy transfer capacitor falling from approximately 345 V to approximately 255 V.

The repetition frequency of the periodic injection of current pulses into the resonated load circuit is governed by the switching frequency of the injection control transistor Q12. In this first specific version of the FIG. 1A embodiment, the transistor switching frequency is 9.52 kHz which is approximately 2.6% below the natural resonant frequency, 9.77 kHz, of the resonated load circuit.

The periodic injection of current pulses into the resonated load circuit establishes an oscillating voltage of approximately 1000 V peak-peak, shown as $V_{C12}$ in FIG. 1B, across the resonating capacitor C12, an oscillating current of approximately 82 A peak-peak, shown as $I_{T11P}$ in FIG. 1B, in the primary winding of transformer T11.

With the injection frequency of 9.52 kHz being down-shifted approximately 2.6% below the natural resonant frequency of 9.77 kHz of the load circuit, the energy injection occurs during the falling, but still positive, second quadrant of the sinusoidal voltage waveform across the resonated load circuit. This voltage is shown as waveform $V_{C12}$ in FIG. 1B. The effect of the injection current pulses, shown as waveform $I_{L12}$ in FIG. 1B, may be seen as a simultaneous small disturbance or lift on the falling slope of this otherwise almost-sinusoidal waveform FIG. 1C shows current, voltage and power waveforms for a second specific version of the first embodiment circuit shown in FIG. 1A having the following details.

| | | |
|---|---|---|
| Supply V11 | | 300 volts |
| Transistor Q11 | MOSFET | IRFK4HE50 or IRFK4JE50 |
| Transistor Q12 | MOSFET | IRFK4HE50 or IRFK4JE50 |
| Transistors Q11 and Q12 switching frequency | | 10 kHz |
| Transistors Q11 and Q12 switching period | | 100 µS |
| Inductor L11 | | 195 µH |
| Energy Transfer Capacitor C11 | | 1.50 µF |
| Inductor L12 | | 5 µH |
| Resonating Capacitor C12 | | 1.36 µF |
| Resonated load circuit inductance (Transformer T11 primary winding) | | 195 µH |
| Natural resonant frequency of load circuit | | 9.77 kHz |
| Energy injection (ie switching) frequency | | 10 kHz |

During each repetition of the 100 µS switching cycle of MOSFET transistors Q11 and Q12, the charging control transistor Q11 is 'on', i.e. conductive, from 0-50 µS and is then 'off' from 50-100 µS, and the injection control transistor Q12 is 'off', i.e. non-conductive, from 0-55 µS, is 'on', i.e. conductive, from 55-81 µS, and is 'off' from 81-100 µS.

FIG. 1C shows the following waveforms from 5.300-5.550 mS from start-up of the second specific version of the circuit of FIG. 1A.

$I_{D11}$ current in diode D11, shown at 5 A/division $V_{C11}$ voltage across energy transfer capacitor C11, shown at 100 V/division $I_{L12}$ current in inductor L12, shown at 50 A/division $V_{C12}$ voltage across resonating capacitor C12, shown at 1000 V/division $I_{T11P}$ current in transformer T11 primary winding, shown at 100 A/division $P_{R11}$ power in the load resistor R11, shown at 500 W/division During switch-on of charging control transistor Q11 (e.g. from 5.300-5.350 mS in FIG. 1C), energy transfer capacitor C11 is charged by current $I_{D11}$ flowing through diode D11. This current rises from zero to a peak value of approximately 3.7 A before falling back toward zero, with an approximately half-sinusoidal shape governed by the pulse shaping effect of the series resonant combination of inductor L11 and energy transfer capacitor C11. During this charging, the voltage $V_{C11}$ across the energy transfer capacitor rises from approximately 258 V to approximately 340 V.

The injection control transistor Q12 is switched 'on' (e.g. at 5.355 mS in FIG. 1C) and therefore energy is injected from the energy transfer capacitor C11 into the resonated load circuit. In contrast to the first specific version described above, injection occurs in this second specific version immediately on switch-on of injection control transistor Q12. At this time, the voltage on the energy transfer capacitor is 340 V which is greater than the voltage of 200 V across the resonated load circuit, shown by the voltage $V_{C12}$ across the resonating capacitor C12. This voltage difference forward biases blocking diode D13 which conducts to pass the injection current $I_{L12}$.

Inductor L12 controls the rate of rise of the injection current pulse which is seen in FIG. 1C commencing at approximately 5.355 mS and continuing until 3.560 mS. The injection current, which is shown in FIG. 1C as $I_{L12}$, is a pulse which peaks at approximately 43 A. The injection current flows from the energy transfer capacitor C11, through injection control transistor Q12, blocking diode D13, inductor L12 and into the parallel connection of resonating capacitor C12 and the inductive load device represented in FIG. 1A by the primary winding of transformer T11. The flow of injection current from the energy transfer capacitor C11 discharges the energy transfer capacitor; the voltage on the energy transfer capacitor falling during injection from approximately 340 V to approximately 257 V.

The repetition frequency of the periodic injection of current pulses into the resonated load circuit is governed by the switching frequency of the injection control transistor Q12. In this second specific version of the FIG. 1A embodiment, the transistor switching frequency is 10 kHz which is approximately 2.4% above the natural resonant frequency, 9.77 kHz, of the resonated load circuit.

The periodic injection of current pulses into the resonated load circuit establishes an oscillating voltage of approximately 1037 V peak-peak, shown as $V_{C12}$ in FIG. 1C, across the resonating capacitor C12, an oscillating current of approximately 85 A peak-peak, shown as $L_{T11P}$ in FIG. 1C, in the primary winding of transformer T11.

With the injection frequency of 10 kHz being up-shifted about 2.4% above the natural resonant frequency of 9.77 kHz of the load circuit, the energy injection occurs during the rising, but positive, first quadrant of the cycle of the sinusoidal voltage waveform across the resonated load circuit. This voltage is shown as waveform $V_{C12}$ in FIG. 1C. The effect of the injection pulses, shown as waveform $I_{L12}$ in FIG. 1C, may be seen as a simultaneous small disturbance or lift on the rising slope of this first quadrant of the otherwise almost sinusoidal voltage waveform $V_{C12}$.

As demonstrated by the two versions shown in FIGS. 1B and 1C and described above, the load circuit necessarily oscillates at an average frequency corresponding to the frequency of energy injection, i.e. the switching frequency of the injection control transistor Q12. The injection and oscillation frequencies can be offset above or below the natural resonant frequency of the resonated load circuit.

In the circuit shown in FIG. 1A, the current pulses injected into the load circuit are unidirectional, i.e. of only one polarity, and occur only once per cycle of the voltage and current oscillation in the load circuit. The resonated load circuit self-resonates between injection pulses to maintain the oscillations in the load circuit between injection pulses. However, the current oscillations diminish due to the resistive loading reflected back to the transformer primary of the inductive load circuit and consequently the circuit suffers an energy decrement. Every second half cycle of the oscillatory voltage and current are therefore of slightly lower amplitude than those immediately following injection. The effect of this may be seen in FIGS. 1B and 1C which show the power waveforms $P_{R11}$ with alternating higher and lower peak power amplitudes.

Second Embodiment

Figure 2B:
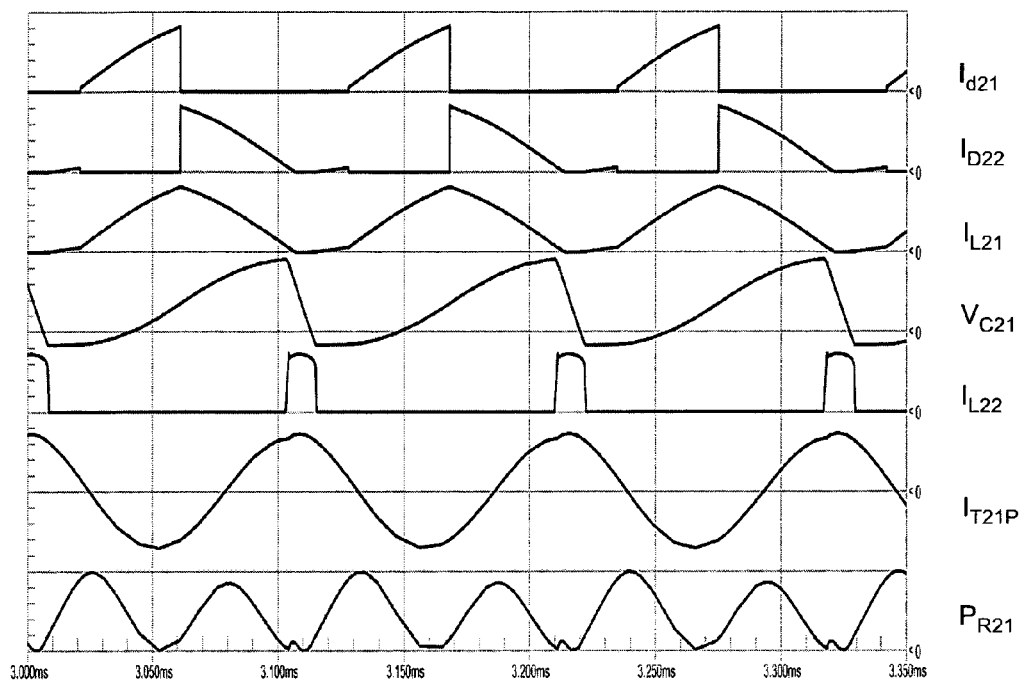
FIG. 2B shows current, voltage and power waveforms for the circuit of FIG. 2A operating below natural resonance.

FIGS. 2A and 2B show a circuit and waveforms for a second embodiment of the invention. This circuit injects unidirectional current pulses into a series resonated load circuit formed by a resonating capacitor C22 connected in series with an inductive load device. The inductive load device is a work coil of an induction heating system and is represented in FIG. 2A by the primary winding of a loosely coupled transformer T21. The resonating capacitor C22 is continuously connected in series with the transformer primary winding. A low resistance load resistor R21 is connected across the transformer secondary winding to represent the work piece of the induction heating system. A DC supply of electrical energy V21 is coupled to the resonated load circuit by a switched coupling circuit.

A load circuit control transistor Q23 controls the opening and closing of the series resonated load circuit. Oscillating load circuit currents can circulate in one direction (anti-clockwise in FIG. 2A) through load circuit control transistor Q23 when that transistor is turned 'on', and can circulate in the opposite direction (clockwise in FIG. 2A) through a diode D24 connected in parallel across the transistor Q23, even when transistor Q23 is turned 'off'.

The parallel diode D24 provides a path for the clockwise currents circulating in the load circuit. If transistor Q23 has an inherent diode, e.g. if transistor Q23 is a MOSFET, the discrete parallel diode D24 is optional but can be included to provide additional current carrying capacity.

As shown in FIG. 2A, the switched coupling circuit includes a charging control transistor Q21, series blocking diode D21, a free-wheel diode D22, a series inductor L21, an energy transfer capacitor C21, an energy injection control transistor Q22, two series blocking diodes D23A and D23B, and a series injection control inductor L22.

The switched coupling circuit is repeatedly arranged in the following sequence of configurations to transfer energy from the supply to the resonated load circuit:
 1. a capacitor charging configuration,
 2. a first optional isolating configuration,
 3. a capacitor discharging and energy injection configuration, and
 4. a second optional isolating configuration.

In the capacitor charging configuration, the charging control transistor Q21, series blocking diode D21, free-wheel diode D22, series inductor L21 operate similarly to the corresponding components in the circuit of FIG. 1A, as described above, to charge the energy transfer capacitor C21 from the supply of electrical energy V21.

Load circuit control transistor Q23 is switched 'on', i.e. made conductive, during the charging configuration and then held 'on' throughout most of the first isolating configuration, permitting resonated load circuit current to circulate in one direction (anti-clockwise in FIG. 2A). Parallel diode D24 permits resonated load circuit current to circulate in the opposite direction (clockwise in, FIG. 2A).

When the switched coupling circuit is configured in the isolating configurations, both charging control transistor Q21 and energy injection control transistor Q22 are 'off' (i.e. made substantially non-conductive), thereby effectively disconnecting and isolating the energy transfer capacitor C21 from the supply of electrical energy V21 and from the resonated load circuit formed from resonating capacitor C22 and the inductive load device represented by the transformer T21 and load resistor R21.

Current circulating in the resonated load circuit when the switched coupling circuit is configured in the isolating configurations continues to circulate substantially at or near the natural resonant frequency of the resonated load circuit through load circuit control transistor Q23 in one direction and through parallel diode D24 in the opposite direction.

In the injection configuration, charging control transistor Q21 is 'off', disconnecting the energy transfer capacitor C21 from the supply of electrical energy V21, and energy injection control transistor Q22 is 'on', connecting the energy transfer capacitor C21, through blocking diodes D23A and D23B, and series injection control inductor L22, across the series connected resonated load circuit.

During the injection configuration stages, a current pulse is injected from the energy transfer capacitor C21 to flow (in a clockwise direction in FIG. 2A) through forward biased blocking diode D23A, injection control transistor Q22, inductor L22, forward biased blocking diode D23B, and into the resonated load circuit formed by the series connection of the resonating capacitor C22 and the inductive load device (represented in FIG. 2A by the primary winding of transformer T21 with load resistor R21 connected across the loosely coupled secondary winding). The injection current pulse injected into the resonated load circuit is smoothed by the series injection control inductor L22 which limits the initial transient discharge current from energy transfer capacitor C21. This injection of current substantially discharges the energy transfer capacitor C21, dropping the voltage on this capacitor to zero.

If the injection current pulse into the resonated load circuit is extended, or the capacitance of the energy transfer capacitor is not of sufficient size, the voltage on the energy transfer capacitor C21 may fall below zero and can become momentarily negative because of current drawn from the capacitor C21 by the resonated load circuit. This condition only occurs momentarily until the next recharge cycle and, while it may detract from best efficiency, it does not otherwise interfere with normal operation of the circuit.

After the cessation of the injection current pulse, current continues to circulate in the resonated load circuit at or near its natural resonant frequency, initially as a clockwise resonated load circuit current through parallel diode D24. While the resonated load circuit current flows clockwise, load circuit control transistor Q23 is turned 'on', i.e. made conductive. On reversal of polarity, the resonated load circuit current flows as an anti-clockwise current through load circuit control transistor Q23. In this way, current continues to oscillate in the resonated load circuit without interruption.

The repetition rate of the energy injection by current pulses is controlled by the switching frequency of the switched coupling circuit. This switching frequency is selected to be close to the natural resonant frequency of the resonated load circuit so that each injection of current from the energy transfer capacitor C21 into the resonated load circuit occurs during the half cycle of resonated load circuit current flowing clockwise through parallel diode D24.

In this way, diodes D23A, D23B and D24 permit a smooth changeover from a naturally resonant mode when clockwise current in the resonated load circuit circulates back through diode D24, to an injection mode when the clockwise current flows from discharge of energy transfer capacitor C21 through diode D23A, injection control inductor L22 and diode D23B to inject energy into the resonated load circuit.

The blocking diodes D23A and D23B are included when energy injection control transistor Q22 is a MOSFET or similar device with an inherent body diode providing a reverse conductive path from source to drain, even when the transistor is turned 'off'. The blocking diodes D23A and D23B prevent reverse current flowing from the resonated load circuit back into the energy transfer capacitor C21 through the inherent MOSFET body diode. Without the blocking diodes D23A and D23B, this reverse current could flow even when the transistor Q22 was turned 'off'.

Although ostensibly either one of the two blocking diodes D23A and D23B would provide this blocking action, the use of respective blocking diodes at each end of the energy injection path between the energy transfer capacitor and the resonated load circuit improves the blocking action by isolating the potentially adverse influence of parasitic inductances or parasitic capacitances between the injection control transistor Q22 or the series inductor L22 and ground or earth or other components. When the blocking diodes are non-conducting, these parasitic capacitances and inductances are isolated from the rest of the coupling circuit by the smaller junction capacitance of the reversed biased diodes. If not isolated, these parasitics can cause unwanted transient oscillations in the circuits.

The discharge current from energy transfer capacitor C21 is always injected into the resonated load circuit with the same polarity. That is, the discharge current is injected into the resonated load circuit as a sequence of pulses all having the same polarity. In the circuit shown in FIG. 2A, current pulses are injected into the resonated load circuit to flow clockwise around the loop formed by energy transfer capacitor C21, first blocking diode D23A, transistor Q22, injection control inductor L22, second blocking diode D23B, and the series connection of the resonating capacitor C22 and the primary winding of the transformer T21.

The switching circuit is repetitively configured in the sequence of the charging configuration, the first isolating configuration, the injection configuration, and the second isolating configuration, to transfer energy from the supply of electrical energy V21 to the inductive load device via the energy transfer capacitor C21.

The amount of energy transferred to the resonated load circuit can be increased if the charging and injection configurations overlap. This overlap can be achieved by omitting one or both of the isolating configuration stages. However, it is preferable that the isolating configuration stages do not overlap. For example, the charging control transistor Q21 is preferably turned 'on' at the start of a charging configuration after the injection control transistor Q22 is turned 'off' at the cessation of the injection configuration.

It is noted that the discharge of energy transfer capacitor C21, and the concomitant injection of energy into the resonated load circuit, does not necessarily commence immediately upon the turn-on of injection control transistor Q22. For example, although energy control transistor Q22 may be turned 'on', i.e. made conductive, the injection path from energy transfer capacitor C21, through diode D23A, through energy control transistor Q22, through injection control inductor L22 and through diode D23B, to the resonated load circuit, will not become conductive until the voltage across the resonated load circuit falls below the voltage on the charged energy transfer capacitor. This effectively synchronises the injection of energy at the point on the waveform of the oscillating voltage across the resonated load circuit that matches the voltage on the charged energy injection capacitor. This automatic synchronisation, and the close matching of the dropping voltage on the then-discharging energy transfer capacitor with the falling voltage across the resonated load, that provides a 'soft' and energy-efficient injection of energy.

FIG. 2B shows current, voltage and power waveforms of a specific version of the second embodiment circuit shown in FIG. 2A having the following details.

| | | |
|---|---|---|
| Supply V21 | | 200 volts |
| Transistor Q21 | MOSFET | IRFK6J350 |
| Transistor Q22 | MOSFET | IRFK4H350 |
| Transistor Q23 IGBT | | ECG3322 |
| Switching frequency of transistors Q21, Q22 and Q23 | | 9.34 kHz |
| Switching period of transistors Q21, Q22 and Q23 | | 107 µS |
| Inductor L21 | | 1 mH |
| Inductor L22 | | 8 µH |
| Energy transfer capacitor C21 | | 1.50 µF |
| Resonating capacitor C22 | | 1.36 µF |
| Resonated load circuit inductance (Transformer T21 primary winding) | | 205 µH |
| Natural resonant frequency of load circuit | | 9.53 kHz |
| Energy injection (ie switching) frequency | | 9.34 kHz |

Transistor Q23 may be an IGBT as in the specific version detailed above and as associated with the waveforms shown in FIG. 2B. Alternatively, Q23 may be a MOSFET.

During each repetition of the 107 µS switching period, the charging control transistor Q21 is 'on', i.e. conductive, from 0-40 µS and is then 'off' from 40-107 µS; the injection control transistor Q22 is 'off', i.e. non-conductive, from 0-82 µS, is 'on', i.e. conductive, from 82-94 µS, and is 'off' from 94-107 µS, and the load circuit control transistor Q23 is 'off' from 0-3 µS, is 'on' from 3-78 µS, and is 'off' from 78-107 µS.

FIG. 2B shows the following waveforms from 3.0-3.35 mS from start-up of the specific version of the circuit of FIG. 2A.
  $I_{D21}$ current in diode D21, shown at 10 A/division
  $I_{D22}$ current in diode D22, shown at 10 A/division
  $I_{L21}$ current in inductor L21, shown at 10 A/division
  $V_{C21}$ voltage across energy transfer capacitor C21, shown at 250 V/division current in inductor L22, shown at 50 A/division
  $I_{T21P}$ current in transformer T21 primary winding, shown at 50 A/division
  $P_{R21}$ power in the load resistor R21, shown at 500 W/division Energy transfer capacitor C21 is charged by current $I_{L21}$ flowing through inductor L21. This current rises smoothly from zero to a peak value of approximately 8.2 A before falling smoothly to zero, with shape governed by the series resonant combination of inductor L21 and energy transfer capacitor C21. During this charging, the voltage $V_{C21}$ across the energy transfer capacitor C21 rises by approximately 270 volts from approximately 40 V negative to approximately 230 V positive.

The charging current $I_{L21}$ is the summation of current $I_{D21}$ drawn from the supply V21 through diode D21, while charging control transistor Q21 is turned 'on', and the current $I_{D22}$ drawn through flywheel diode D22 after transistor Q21 is turned 'off'.

The injection control transistor Q22 is switched 'on' (e.g. at 3.103 mS in FIG. 2B) to inject current and energy from the energy transfer capacitor C21 into the resonated load circuit. The injection current pulse, shown for example commencing at approximately 3.103 mS, in the waveform in FIG. 2B, peaks at approximately 36 A. The flow of injection current from the energy transfer capacitor C21 discharges the energy transfer capacitor; the voltage on the energy transfer capacitor falling by approximately 270 volts from approximately 230 volts positive to approximately 40 volts negative.

When the voltage on energy transfer capacitor C21 falls below zero, current flows through diode D22, as seen in waveform $I_{D22}$ of FIG. 2B. This current continues until charging control transistor Q21 turns on and current flows from supply V21, through transistor Q21, diode D21 and inductor L21, as seen in waveform $I_{L21}$, and into capacitor C21. When charging control transistor Q21 is turned 'off', current induced in inductor L21 by the collapse of its associated magnetic field flows through diode D22 to continue charging capacitor C21 until current $I_{L21}$ falls to zero.

The current waveform $I_{T21P}$, shows a small lift occurring on the positive peak of the almost-sinusoidal waveform at the time of the injection from the energy transfer capacitor.

The repetition frequency of the periodic injection of current pulses into the resonated load circuit is governed by the switching frequency of the charging control transistor Q21, the injection control transistor Q22, and the load circuit control transistor Q23. In this specific version of the FIG. 2A embodiment, the transistor switching frequency is 9.34 kHz which is approximately 2% below the natural resonant frequency, 9.53 kHz, of the resonated load circuit.

The periodic injection of current pulses into the resonated load circuit establishes an oscillating current of approximately 71 A peak-peak, shown as $I_{T21P}$ in FIG. 2B, in the resonating capacitor C22 and primary winding of transformer T21.

In the circuit shown in FIG. 2A, the current pulses injected into the load circuit are unidirectional. For the same reasons as described above for the first embodiment, the power waveform $P_{R21}$ seen in FIG. 2B shows alternating higher and lower peak power amplitudes.

The resonating capacitance may be provided by a single capacitor C22 as shown in FIG. 2A, or may be provided by multiple capacitors combined in parallel and/or in series to achieve desired current and voltage ratings. The capacitance values of the individual capacitors are selected to maintain the capacitance value of the overall combination of capacitors so that the resonant frequency of the resonated load circuit is unchanged. In one arrangement (not shown in the figures), the 1.36 µF resonating capacitor C22 in FIG. 2A is substituted by two capacitors, each of 2.72 µF, which are connected in series with, but at respective opposite ends of the primary winding of the transformer T21.

Third Embodiment

Figure 3B:
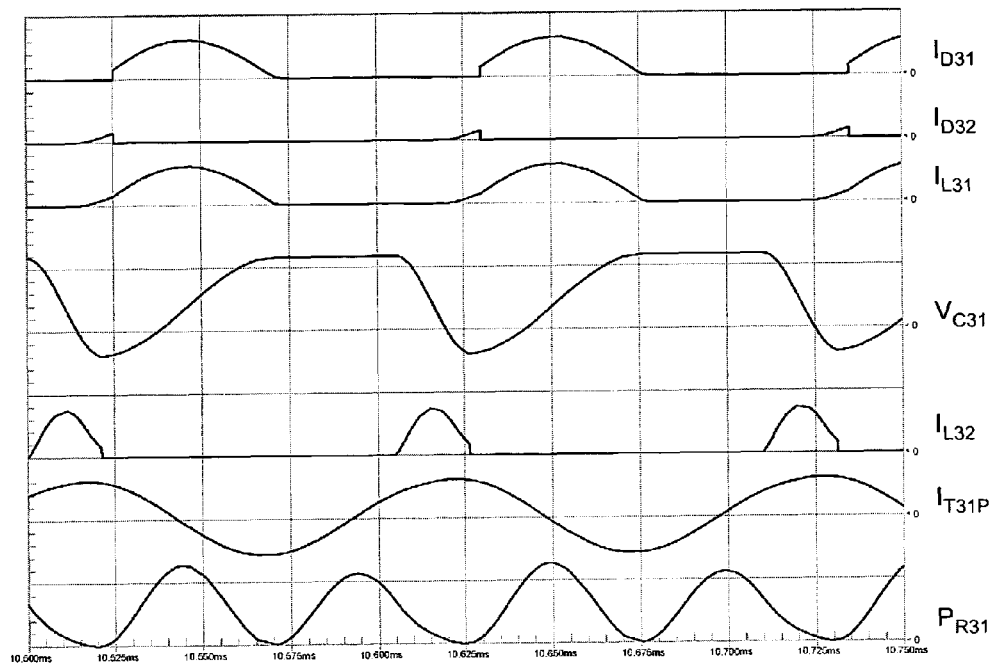
FIG. 3B shows current, voltage and power waveforms for the circuit of FIG. 3A operating below natural resonance.

FIGS. 3A and 3B show a circuit and waveforms for a third embodiment of the invention. This circuit injects unidirectional current pulses into the inductive leg of a resonated load circuit formed by a resonating capacitor C32 connected to an inductive load device. The inductive load device is a work coil of an induction heating system and is represented in FIG. 3A by the primary winding of a loosely coupled transformer T31. One end of the resonating capacitor C32 is continuously connected to one end of the primary winding of the transformer T31. A low resistance load resistor R11 is connected across the transformer secondary winding to represent the work piece of the induction heating system. A DC supply of electrical energy V31 is coupled to the resonated load circuit by a switched coupling circuit.

This third embodiment circuit of FIG. 3A operates similarly to the second embodiment circuit of FIG. 2A as described above, with the exception of the injection of current and energy into the resonated load circuit and the substitution of the two blocking diodes D23A and D23B by a single blocking diode D33.

In the circuit of FIG. 3A, injection is into the inductive load device represented in FIG. 3A by the transformer T31 and load resistor R31. The load circuit control transistor Q33, in series with the resonating capacitor C32, controls closure of the resonated load circuit. A bypass diode D34 provides a parallel path around the transistor Q33. Furthermore, in this embodiment only a single diode D33 blocks reverse current that could otherwise flow back from the resonated load circuit to the energy storage capacitor through the inherent MOSFET body diode. In other respects, the circuit and the circuit elements shown in FIG. 3A operate similarly to the circuit and corresponding elements shown in FIG. 2A.

In the FIG. 3A circuit, load circuit control transistor Q33 is switched 'on', i.e. made conductive during the charging configuration and then held 'on' through most of the first isolating configuration, permitting resonated load circuit current to circulate in one direction (anti-clockwise in FIG. 3A). Parallel bypass diode D34 permits resonated load circuit current to bypass transistor Q33 and circulate in the opposite direction (clockwise in FIG. 3A).

If load circuit control transistor Q33 includes an inherent body diode, e.g. if the transistor Q33 is a MOSFET, the inherent body diode provides a conductive path from source to drain for clockwise currents in the resonated load circuit. The parallel bypass diode D34 is included in the circuit to provide additional current carrying capacity for the clockwise currents circulating in the load circuit.

Current circulating in the resonated load circuit when the switched coupling circuit is configured in the isolating configuration continues to circulate substantially at or near the natural resonant frequency of the resonated load circuit through load circuit control transistor Q33 in one direction and through parallel bypass diode D34 in the opposite direction.

During the injection configuration stage, a current pulse is injected from the energy transfer capacitor C31 to flow (in a clockwise direction in FIG. 3A) through injection control transistor Q32, forward biased blocking diode D33, injection control inductor L32, and into the inductive load device (represented in FIG. 3A by transformer T31 and load resistor R31). The injection current pulse is smoothed by the series injection control inductor L32. This injection substantially discharges energy transfer capacitor C31.

Similarly to the circuit of FIG. 2A, if the injection current pulse into the resonated load circuit is extended, or the capacitance of the energy transfer capacitor is not of sufficient size, the voltage on the energy transfer capacitor C31 may fall below zero. Current is then drawn through diode D32 and inductor L31 before charging control transistor Q31 is turned 'on' to deliver current from the supply V31, through transistor Q31, diode D31 and inductor L31, to charge energy transfer capacitor C31. While this condition (i.e. a negative voltage on the energy transfer capacitor) may detract from best operating efficiency it does not interfere with normal operation of the circuit and only occurs momentarily until the voltage on the energy transfer capacitor C31 is made positive at the next recharge cycle.

The capacitance value of the energy transfer capacitance C31 is normally increased to avoid, or at least reduce, negative voltages on the energy transfer capacitor. For example, in the circuit using the component values detailed below, the voltage on the energy transfer capacitor C31 does not swing negative if the value of the energy transfer capacitor C31 is increased from 0.5 µF to 0.75 µF. The value of the capacitance is preferably chosen to optimise the circuit efficiency by reducing the likelihood of negative voltage swings.

A clamping diode, not shown in FIG. 3A but similar to the diode D45 described below and seen across the energy transfer capacitor C41 in FIG. 4A, may be placed in parallel across the energy transfer capacitor C31 to substantially prevent the voltage on the capacitor from going negative, without creating any conflicts with other circuit operations.

After the cessation of the injection current pulse, current continues to circulate in the resonated load circuit at or near its natural resonant frequency, initially as a clockwise resonated load circuit current through the circuit loop comprising parallel bypass diode D34, resonating capacitor C32 and the primary winding of transformer T31 (which is loosely coupled to, and loaded by, load resistor R31). While the resonated load current flows in the resonant circuit loop in a clockwise direction, through bypass diode D34, resonant circuit control transistor Q33 is turned 'on', i.e. made conductive. On reversal of polarity, the resonated load current flows as an anti-clockwise current through resonating capacitor C32 and resonant circuit control transistor Q33. In this way, current continues to oscillate in the resonated load circuit without interruption.

Similarly to the circuit of FIG. 2A, the repetition rate of the energy injection by current pulses is controlled in the circuit of FIG. 3A by the switching frequency of the switched coupling circuit. This switching frequency is selected to be close to the natural resonant frequency of the resonated load circuit so that each injection of current from the energy transfer capacitor C31 into the resonated load circuit occurs during the half cycle of resonated load circuit current flowing clockwise through parallel diode D34 and resonating capacitor C32.

In other respects, not specifically discussed with reference to the circuit of FIG. 3A, the circuit and corresponding components of FIG. 3A operate substantially similarly to the circuit of FIG. 2A, repetitively configuring the switching circuit in the sequence of the charging configuration, the isolating configuration, and the injection configuration, to transfer energy from the supply of electrical energy V31 to the inductive load device via the energy transfer capacitor C31.

FIG. 3B shows current, voltage and power waveforms of a specific version of the third embodiment circuit shown in FIG. 3A having the following details.

| | | |
|---|---|---|
| Supply V31 | | 100 volts |
| Transistor Q31 | MOSFET | IRFPG50 |
| Transistor Q32 | MOSFET | IRFK4J450 |
| Transistor Q33 | MOSFET | IRFK4HE50 or IRFK4JE50 |
| Switching frequency of transistors Q31, Q32 and Q33 | | 9.52 kHz |
| Switching period of transistors Q31, Q32 and Q33 | | 105 µS |

| | |
|---|---|
| -continued | |
| Inductor L31 | 500 μH |
| Inductor L32 | 45 μH |
| Energy transfer capacitor C31 | 0.5 μF |
| Resonating capacitor C32 | 1.36 μF |
| Resonated load circuit inductance (Transformer T31 primary winding) | 180 μH |
| Natural resonant frequency of load circuit | 10.17 kHz |
| Energy injection (ie switching) frequency | 9.52 kHz |

During each repetition of the 105 μS switching period, the charging control transistor Q31 is 'on', i.e. conductive, from 0-48 μS and is then 'off' from 48-105 μS; the injection control transistor Q32 is 'off', i.e. non-conductive, from 0-80 μS, is 'on', i.e. conductive, from 80-101 μS, and is 'off' from 101-105 μS; and the resonant circuit control transistor Q33 is 'off' from 0-3 μS, is 'on' from 3-76 μS, and is 'off' from 76-105 μS.

FIG. 3B shows the following waveforms from 10.5 mS from start-up of the specific version of the circuit of FIG. 3A.

$I_{D31}$ current in diode D31, shown at 10 A/division
$I_{D32}$ current in diode D32, shown at 10 A/division
$I_{L31}$ current in inductor L31, shown at 10 A/division
$V_{C31}$ voltage across energy transfer capacitor C31, shown at 250 V/division
$I_{L32}$ current in inductor L32, shown at 20 A/division
$I_{T31P}$ current in transformer T31 primary winding, shown at 50 A/division
$P_{R31}$ power in the load resistor R31, shown at 250 W/division Energy transfer capacitor C31 is charged by current $I_{L31}$ flowing through inductor L31. This current rises smoothly from zero to a peak value of approximately 6.1 A before falling smoothly to zero, with shape governed by the series resonant combination of inductor L31 and energy transfer capacitor C31. During this charging phase, the voltage $V_{C31}$ across the energy transfer capacitor C31 rises from approximately 100 V negative to approximately 290 V positive.

The charging current $I_{L31}$ is the summation of current $I_{D31}$ drawn from the supply V31 through diode D31, while charging control transistor Q31 is turned 'on', and the current $I_{D32}$ drawn through flywheel diode D32 after transistor Q31 is turned 'off'.

The injection control transistor Q32 is switched 'on' (e.g. at 10.605 mS in FIG. 3B) to inject current and energy from the energy transfer capacitor C31 into the resonated load circuit. The injection current pulse, shown in the waveform $I_{L32}$ of FIG. 3B, for example commencing at approximately 10.605 mS and continuing until approximately 10.626 mS, peaks at approximately 14.5 A. The flow of injection current from the energy transfer capacitor C31 discharges the energy transfer capacitor; the voltage on the energy transfer capacitor falling by approximately 390 volts from approximately 290 V positive to approximately 100 V negative.

The repetition frequency of the periodic injection of current pulses into the resonated load circuit is governed by the switching frequency of the charging control transistor Q31, the injection control transistor Q32, and the resonated load circuit control transistor Q33. In this specific version of the FIG. 3A embodiment, the transistor switching frequency is 9.52 kHz which is approximately 6.8% below the natural resonant frequency, 10.17 kHz, of the resonated load circuit.

The periodic injection of current pulses into the resonated load circuit establishes an oscillating current of approximately 69 A peak-peak, shown as $I_{T31P}$ in FIG. 3B, in the primary winding of transformer T31.

In the circuit shown in FIG. 3A, the current pulses injected into the load circuit are unidirectional. For the same reasons as described above for the first embodiment, the power waveform $P_{R31}$ seen in FIG. 3B shows alternating higher and lower peak power amplitudes.

Fourth Embodiment

Figure 4B:
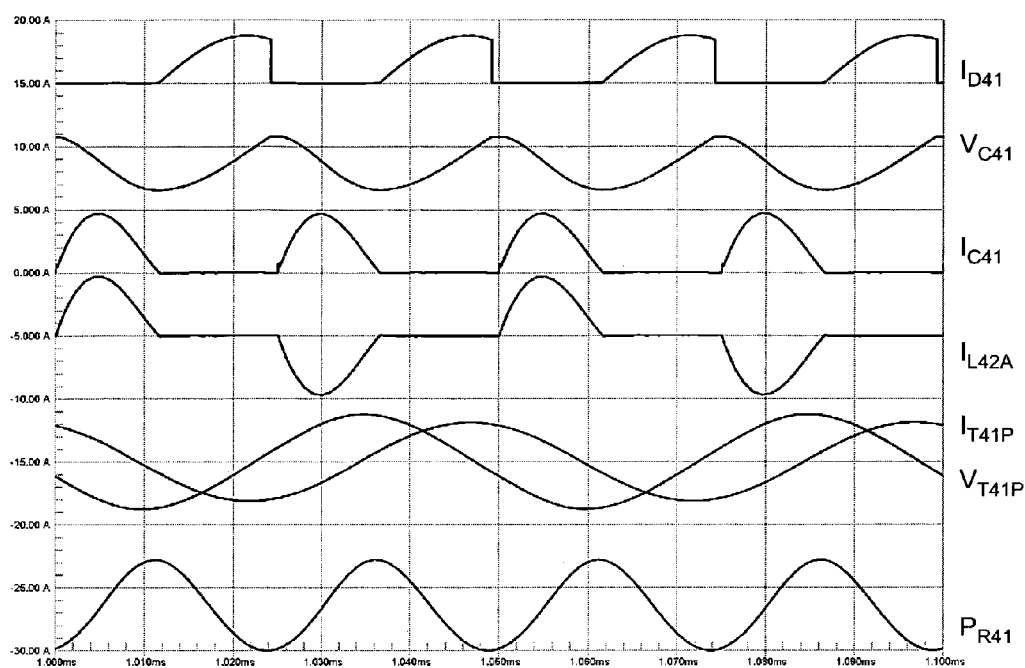
FIG. 4B shows current, voltage and power waveforms for the circuit of FIG. 4A operating above natural resonance.

FIGS. 4A and 4B show a circuit and waveforms for a fourth embodiment of the invention. This circuit injects bidirectional current pulses into a parallel resonated load circuit formed by a resonating capacitor C42 connected to an inductive load device. The inductive load device is a work coil of an induction heating system and is represented in FIG. 4A by a loosely coupled transformer T41. The resonating capacitor C42 is continuously connected in parallel with the primary winding of the transformer T41. A low resistance load resistor R41 is connected across the transformer secondary winding to represent the work piece of the induction heating system A DC supply of electrical energy V41 is coupled to the resonated load circuit by a switched coupling circuit.

The switched coupling circuit is repeatedly arranged in the following sequence of configurations to transfer energy from the supply to the resonated load circuit:

1. a first capacitor charging configuration,
2. a first optional isolating configuration,
3. a first capacitor discharging and energy injection configuration,
4. a second capacitor charging configuration,
5. a second optional isolating configuration, and
6. a second capacitor discharging and energy injection configuration.

During each of the two capacitor charging configuration stages a charging control transistor Q41 is turned 'on', i.e. made conductive, to charge energy transfer capacitor C41 from the electrical supply V41. The charging control transistor Q41 and a series blocking diode D41, a free-wheel diode D42 and a series inductor L41 operate similarly to the corresponding components in the circuit of FIG. 1A, as described above, to charge the energy transfer capacitor C41 from the supply of electrical energy V41.

A clamping diode D45 is connected in parallel across energy transfer capacitor C42. This diode normally remains reverse biased but is included to prevent reverse polarity charging of the energy transfer capacitor C41 by allowing injection currents to bypass that capacitor, if injection periods are excessive for the size of the capacitor and the capacitor becomes fully discharged.

The switched coupling circuit also includes four transistors Q44, Q45, Q46 and Q47. Diagonal pairs of transistors in the H-bridge are alternately made conductive to inject current pulses of alternating polarity into the parallel resonated load circuit. One diagonal pair of H-bridge transistors, Q44 and Q47, is made conductive when the coupling circuit is configured in the third stage of the operating sequence, viz the first capacitor discharging and energy injection configuration. The other diagonal pair of H-bridge transistors, Q45 and Q46, is made conductive when the coupling circuit is configured in the sixth stage of the operating sequence, viz the second capacitor discharging and energy injection configuration.

During the capacitor discharging and energy injection configurations of the third and sixth stages of each operating sequence, the energy transfer capacitor C41 is effectively connected, by the respective diagonal pairs of the H-bridge transistors, the respective blocking diode D44A or D44B, and series injection pulse control inductors L42A and L42B, to discharge across the parallel combination of the resonating capacitor C42 and the inductive load device represented in FIG. 4A by the transformer T41 and load resistor R41, while the charging control transistor Q41 is 'off', disconnecting and effectively isolating the energy transfer capacitor C41 from the supply of electrical energy V41.

The discharge current from energy transfer capacitor C41 is injected into the resonated load circuit as pulses of alternating polarity. During the third stage, the pulses flow clockwise around the loop formed by capacitor C41, H-bridge transistor Q44, conductive forward biased blocking diode D44A, inductor L42A, the parallel connection of the resonating capacitor C42 and the primary winding of the transformer T41, inductor L42B and H-bridge transistor Q47. During the sixth stage, the pulses flow anti-clockwise around the loop formed by capacitor C41, H-bridge transistor Q45, conductive forward biased blocking diode D44B, inductor L42B, the parallel connection of the resonating capacitor C42 and the primary winding of the transformer T41, inductor L42A and H-bridge transistor Q46.

In a variant (not shown in the figures) of the FIG. 4A circuit, the inductors L42A and L42B are omitted and are instead substituted by a single series injection pulse control inductor that is connected between the energy transfer capacitor C41 and the common junction between the drains of the switching transistors Q44 and Q45. In this arrangement, during the capacitor discharging and energy injection configurations of the third and sixth stages of each operating sequence, the energy transfer capacitor C41 is effectively connected, by the single injection pulse control inductor, to the respective diagonal pairs of the H-bridge transistors, the respective blocking diode D44A or D44B, to discharge across the parallel combination of the resonating capacitor C42 and the inductive load device.

In this variant, the discharge current from energy transfer capacitor C41 is injected into the resonated load circuit as pulses of alternating polarity. During the third stage, the pulses flow clockwise around the loop formed by capacitor C41, the single injection pulse control inductor, H-bridge transistor Q44, conductive forward biased blocking diode D44A, the parallel connection of the resonating capacitor C42 and the inductive load device, and H-bridge transistor Q47. During the sixth stage, the pulses flow anti-clockwise around the loop formed by capacitor C41, the single injection pulse control inductor, H-bridge transistor Q45, conductive forward biased blocking diode D44B, the parallel connection of the resonating capacitor C42 and the inductive load device, and H-bridge transistor Q46.

In the isolating configurations, all transistors Q41, Q44, Q45, Q46 and Q47 are 'off' (i.e. made substantially non-conductive), thereby effectively disconnecting and isolating the energy transfer capacitor C41 from the supply of electrical energy V41 and from the resonated load circuit formed from resonating capacitor C42 and the inductive load device represented by the transformer T41 and load resistor R41.

When the H-bridge transistors, Q44 and Q47, or Q45 and Q46, are turned 'off' at the beginning of the isolating configurations, circulating current flowing in the resonated load circuit will continue to circulate substantially at or near the natural resonant frequency of the resonated load circuit.

The switching circuit is repetitively configured in the six stage sequence to transfer energy from the supply of electrical energy V41 to the inductive load device via the energy transfer capacitor C41.

The charging and injection configurations may overlap. For example, when the charging control transistor Q41 is turned 'on' at the start of the first or fourth stage charging configuration, the respective pair of H-bridge transistors may remain 'on' for a short overlap period.

FIG. 4B shows current, voltage and power waveforms of a specific version of the fourth embodiment circuit shown in FIG. 4A having the following details.

| Supply V41 | | 300 volts |
|---|---|---|
| Transistor Q41 | MOSFET | IRFK4HE50 or IRFK4JE50 |
| Transistor Q44 | MOSFET | IRFK4J450 |
| Transistor Q45 | MOSFET | IRFK4J450 |
| Transistor Q46 | IGBT | IRGPC50U |
| Transistor Q47 | IGBT | IRGPC50U |
| Switching frequency of transistor Q41 | | 40 kHz |
| Switching frequency of transistors Q44-Q47 | | 20 kHz |
| Switching period of transistors Q44-Q47 | | 50 μS |
| Inductor L41 | | 10 μH |
| Inductor L42A | | 40 μH |
| Inductor L42B | | 40 μH |
| Energy transfer capacitor C41 | | 4.0 μF |
| Resonating capacitor C42 | | 0.7 μF |
| Resonated load circuit inductance (Transformer T41 primary winding) | | 95 μH |
| Natural resonant frequency of load circuit | | 19.5 kHz |
| Energy injection (ie switching) frequency | | 20 kHz |

During each repetition of the 50 μS switching period of H-bridge transistors Q44, Q45, Q46 and Q47, the charging control transistor Q41 is 'on', i.e. conductive, from 0-12.5 μS, 'off', i.e. non-conductive, from 12.5-25 μS, 'on' from 25-37.5 μS, and 'off' from 37.5-50 μS; the H-bridge injection control transistors Q44 and Q47 are 'off' from 0-12.5 'on' from 12.5-25 μS, and 'off' from 25-50 μS; and the H-bridge injection control transistors Q45 and Q46 are 'off' from 0-37.5 μS, and 'on' from 37.5-50 μS.

FIG. 4B shows the following waveforms from 1.0-1.1 mS from start-up of the specific version of the circuit of FIG. 4A.

$I_{D41}$ current in diode D41, shown at 5 A/division $V_{C41}$ voltage across energy transfer capacitor C41, shown at 10 V/division $I_{C41}$ discharge current from capacitor C41, shown at 5 A/division $I_{L42A}$ current in inductor L42A, shown at 5 A/division $I_{T41P}$ current in transformer T41 primary winding, shown at 50 A/division $V_{T41P}$ voltage across transformer T41 primary winding, shown at 500 V/division $P_{R41}$ power in the load resistor R41, shown at 500 W/division Charging control transistor Q41 is switched 'on' twice in each 50 μS cycle (e.g. from 1.0125-1.025 mS and from 1.0375-1.050 mS in FIG. 4B) to charge energy transfer capacitor C41 by current $I_{D41}$ flowing through transistor Q41 and diode D41. This charging current rises from zero to a peak value of approximately 3.75 A, with a sinusoidal shape governed by the series resonant combination of inductor L41 and energy transfer capacitor C41. The trailing edge of the sinusoidal shape of the charging pulse is cut off when charging control transistor Q41 is turned off. The switching of charging control transistor Q41 serves to control the amount of charge delivered into the energy transfer capacitor C41. After switch off of the charging control transistor Q41, a falling charging current will continue to flow from inductor L41, into energy transfer capacitor C41 and return through free-wheel diode D42. During each charging period, the voltage $V_{C41}$ across the energy transfer capacitor C41 rises from approximately 293 V to approximately 302 V.

The transistors Q44 and Q47 of the first diagonal pair of H-bridge injection control transistors, are switched 'on' for 12.5 μS once in each 50 μS cycle (e.g. from 1.024-1.0375 mS in FIG. 4B) to inject current and energy from the energy transfer capacitor C41 into the resonated load circuit. In the circuit of FIG. 4A, this current flows clockwise from the H-bridge through the parallel resonated load circuit, predominantly through resonating capacitor C42.

The transistors Q45 and Q46 of the second diagonal pair of H-bridge injection control transistors, are switched 'on' for 12.5 μS once in each 50 μS cycle (e.g. from 1.050-1.0625 mS in FIG. 4B) to inject current and energy from the energy transfer capacitor. C41 into the resonated load circuit. In the circuit of FIG. 4A, this current flows anti-clockwise from the H-bridge through the parallel resonated load circuit.

The discharge current pulses from energy transfer capacitor C41 are injected by the H-bridge switching transistors into the resonated load circuit and are shown in waveform $I_{C41}$ in FIG. 4B. The current waveform $I_{L42A}$ shows the same pulses, but as injected through inductor L42A into the parallel resonated load circuit. As can be seen in FIG. 4B, the $I_{L42A}$ current pulses, as injected into the resonated load circuit, alternate in polarity.

During each injection current pulse, the energy transfer capacitor discharges, dropping the voltage across the energy transfer capacitor C41 from approximately 302 V to approximately 293 V.

The repetition frequency of the periodic injection of current pulses into the resonated load circuit is governed by the switching frequency of the four H-bridge injection control transistors Q44, Q45, Q46 and Q47. In the specific version of the FIG. 4A embodiment, the switching frequency of these four transistors is 20 kHz which is approximately 2.5% above the natural resonant frequency, 19.5 kHz, of the resonated load circuit.

The periodic injection of current pulses into the resonated load circuit establishes an oscillating voltage of approximately 750 V peak-peak, shown as $V_{T41P}$ in FIG. 4B, across the primary winding of the transformer T41, an oscillating current of approximately 62 A peak-peak, shown as $I_{T41P}$ in FIG. 4B, in the primary winding of transformer T41.

In the circuit shown in FIG. 4A, the current pulses injected into the load circuit are bidirectional, i.e. of alternating polarity, and occur twice per cycle of the voltage and current oscillation in the load circuit. The resonated load circuit self-resonates between injection pulses maintaining the oscillations in the load circuit between injection pulses. Because injection is twice per cycle, every half cycle of the oscillatory voltage and current are of similar amplitudes. The effect of this may be seen in FIG. 4B which shows the power waveform $P_{R41}$ with consistent peak power amplitudes.

Fifth Embodiment

Figure 5B:
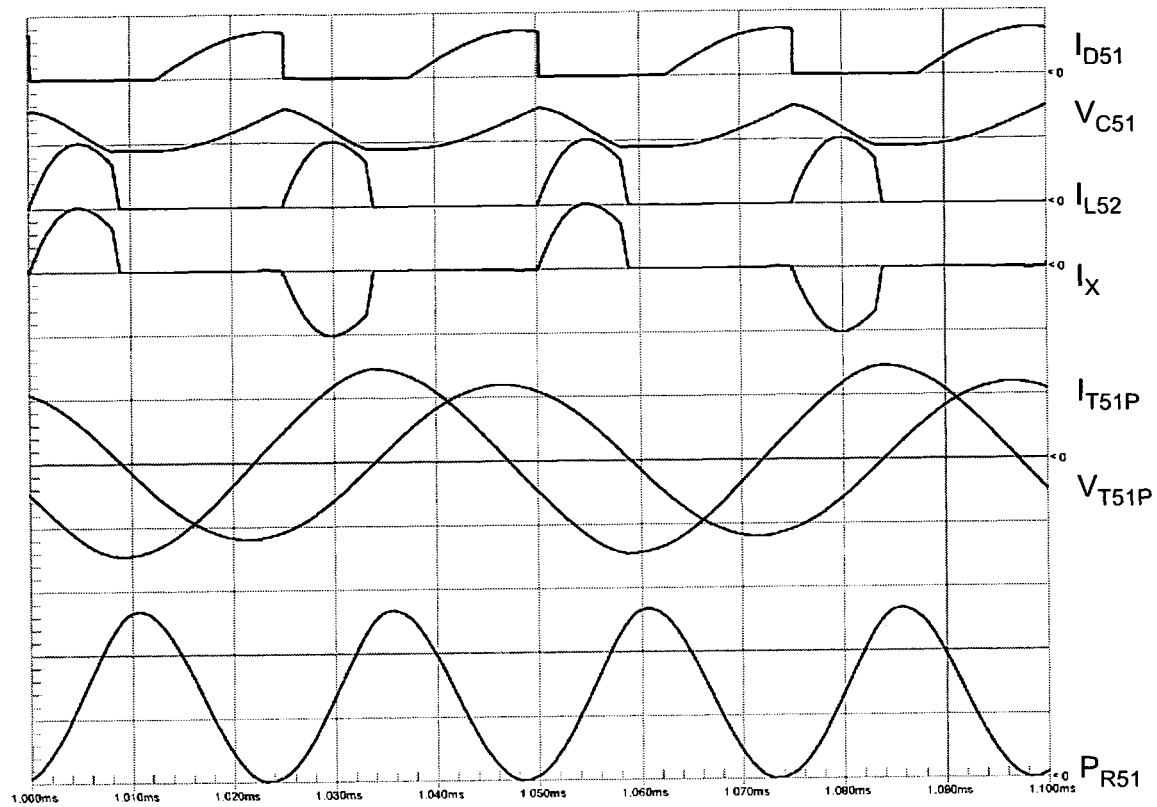
FIG. 5B shows current, voltage and power waveforms for the circuit of FIG. 5A operating above natural resonance.
Figure 5C:
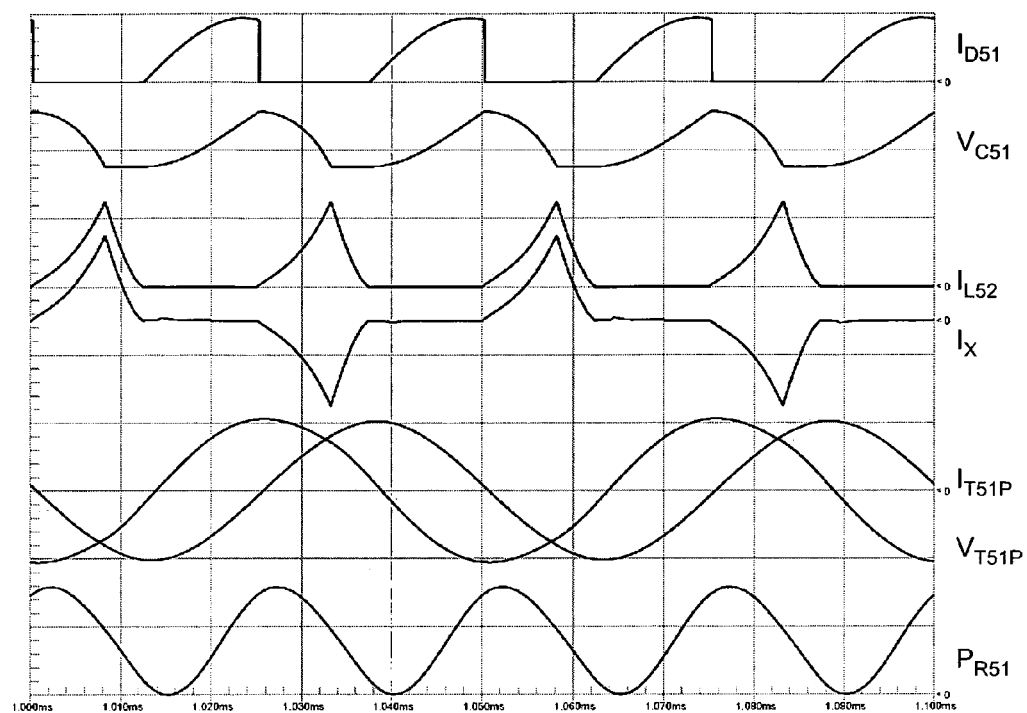
FIG. 5C shows current, voltage and power waveforms for the circuit of FIG. 5A operating below natural resonance.

FIGS. 5A, 5B and 5C show a circuit and waveforms for a fifth embodiment of the invention. This circuit injects bidirectional current pulses into a parallel resonated load circuit formed by a resonating capacitor C52 connected to an inductive load device. The inductive load device is a work coil of an induction heating system and is represented in FIG. 5A by a the primary winding of a loosely coupled transformer T51. The resonating capacitor C52 is continuously connected in parallel with the transformer primary winding A low resistance load resistor R51 is connected across the transformer secondary winding to represent the work piece of the induction heating system. A DC supply of electrical energy V51 is coupled to the resonated load circuit by a switched coupling circuit.

In one operating mode the switched coupling circuit is repeatedly arranged in the following sequence of configurations to transfer energy from the supply to the resonated load circuit:

1. a first capacitor charging configuration,
2. a first capacitor discharging and energy injection configuration,
3. a first optional isolating configuration,
4. a second capacitor charging configuration,
5. a second capacitor discharging and energy injection configuration, and
6. a second optional isolating configuration.

During each stage of the capacitor charging configuration a charging control transistor Q51 is turned 'on', i.e. made conductive, to charge energy transfer capacitor C51 from the electrical supply V51. The charging control transistor Q51 and a series blocking diode D51, a free-wheel diode D52 and a series inductor L51 operate similarly to the corresponding components in the circuit of FIG. 1A, as described above, to charge the energy transfer capacitor C51 from the supply of electrical energy V51.

The switched coupling circuit also includes an H-bridge switching circuit comprising four transistors Q54, Q55, Q56 and Q57. Diagonal pairs of transistors in the H-bridge are alternately made conductive to inject current pulses of alternating polarity into the parallel resonated load circuit.

The transistors Q54 and Q57, being one diagonal pair of the four H-bridge transistors, are made conductive when the coupling circuit is configured in the first capacitor discharging and energy injection configuration. In this configuration, the injection current pulses flow clockwise around the loop formed by capacitor C51, energy injection control transistor Q52, series blocking diode D53, series inductor L52, H-bridge transistor Q54, the parallel connection of the resonating capacitor C52 and the primary winding of the transformer T51, and H-bridge transistor Q57.

The transistors Q55 and Q56, being the other diagonal pair of the four H-bridge transistors, are made conductive when the coupling circuit is configured in the second capacitor discharging and energy injection configuration. In this configuration, the injection current pulses flow anti-clockwise around the loop formed by capacitor C51, energy injection control transistor Q52, series blocking diode D53, series inductor L52, H-bridge transistor Q55, the parallel connection of the resonating capacitor C52 and the primary winding of the transformer T51, and H-bridge transistor Q56.

An energy injection control transistor Q52 controls discharge of the energy transfer capacitor C51 through the H-bridge and into the parallel resonated load circuit. Discharge current pulses from capacitor C51 flow through transistor Q52, series blocking diode D53 and series inductor L52, and alternately through respective diagonal pairs of the four H-bridge transistors to the resonated load circuit. Injection occurs while the charging control transistor Q51 is 'off', effectively disconnecting the energy transfer capacitor C51 from the supply of electrical energy V51.

Current flowing through the series inductor L52 at the time that energy injection control transistor Q52 is turned 'off' is maintained by a current flow through free wheel diode D56 until the magnetic field associated with inductor L52 has collapsed. This current is injected into the resonated load circuit through respective diagonal pairs of transistors of the H-bridge which are maintained in the conductive 'on' state for a period after energy injection control transistor Q52 is turned 'off'.

In the first and second isolating configurations, the charging control transistor Q51 and the energy injection control transistor Q52, are 'off' (i.e. made substantially non-conductive), thereby effectively disconnecting and isolating the energy transfer capacitor C51 from the supply of electrical energy V51 and from the resonated load circuit formed from resonating capacitor C52 and the inductive load device represented by the transformer T51 and load resistor R51.

When the circuit is configured in the isolating configuration, circulating current flowing in the parallel resonated load circuit will continue to circulate substantially at or near the natural resonant frequency of the resonated load circuit.

The switching circuit is repetitively configured in the sequence described above to transfer energy from the supply of electrical energy V51 to the inductive load device via the energy transfer capacitor C51.

FIG. 5B shows current, voltage and power waveforms of a first version of the fifth embodiment circuit shown in FIG. 5A having the following details.

| | | |
|---|---|---|
| Supply V51 | | 300 volts |
| Transistor Q51 | MOSFET | IRFK4J450 |
| Transistor Q52 | MOSFET | IRFK4HE50 or IRFK4JE50 |
| Transistor Q54 | MOSFET | IRFK4HE50 or IRFK4JE50 |
| Transistor Q55 | MOSFET | IRFK4HE50 or IRFK4JE50 |
| Transistor Q56 | IGBT | IRGPC50U |
| Transistor Q57 | IGBT | IRGPC50U |
| Switching frequency of transistors Q51 and Q52 | | 40 kHz |
| Switching frequency of transistors Q54-Q57 | | 20 kHz |
| Switching period of transistors Q54-Q57 | | 50 µS |
| Inductor L51 | | 10 µH |
| Inductor L52 | | 80 µH |
| Energy transfer capacitor C51 | | 5.0 µF |
| Resonating capacitor C52 | | 0.7 µF |
| Resonated load circuit inductance (Transformer T51 primary winding) | | 95 µH |
| Natural resonant frequency of load circuit | | 19.5 kHz |
| Energy injection (ie switching) frequency | | 20 kHz |

During each repetition of the 50 µS switching period of H-bridge transistors Q54, Q55, Q56 and Q57, the charging control transistor Q51 is 'on', i.e. conductive, from 0-12.5 µS, 'off', i.e. non-conductive, from 12.5-25 µS, 'on' from 25-37.5 µS, and 'off' from 37.5-50 µS; the energy injection control transistor Q52 is 'off' from 0-12.5 µS, 'on' from 12.5-20.5 µS, 'off' from 20.5-37.5 µS, 'on' from 37.5-45.5 µS, and 'off' from 45.5-50 µS; the H-bridge transistors Q54 and Q57 are 'off' from 0-12.5 µS, 'on' from 12.5-25 and 'off' from 25-50 µS; and the H-bridge transistors Q55 and Q56 are 'off' from 0-37.5 µS, and 'on' from 37.5-50 µS.

FIG. 5B shows the following waveforms from 1.0-1.1 mS from start-up of the first version of the circuit of FIG. 5A.

$I_{D51}$ current in diode D51, shown at 5 A/division
$V_{C51}$ voltage across energy transfer capacitor C51, shown at 10 V/division
$I_{L52}$ current through inductor L52, shown at 5 A/division
$I_X$ bi-polar current injected into resonated load circuit, shown at 5 A/division
$I_{T51P}$ current in transformer T51 primary winding, shown at 25 A/division
$V_{T51P}$ voltage across transformer T51 primary winding, shown at 250 V/division
$P_{R51}$ power in the load resistor R51, shown at 250 W/division Charging control transistor Q51 is switched 'on' twice in each 50 µS cycle (e.g. from 1.0375-1.050 mS and from 1.0625-1.075 mS in FIG. 5B) to charge energy transfer capacitor C51 by current $I_{D51}$ flowing through transistor Q51 and diode D51. This charging current rises smoothly from zero to a peak value of approximately 3.6 A, with a sinusoidal shape governed by the series resonant combination of inductor L51 and energy transfer capacitor C51. The trailing edge of the sinusoidal shape of the charging pulse is cut off when charging control transistor Q51 is turned off. The switching of charging control transistor Q51 serves to control the amount of charge delivered into the energy transfer capacitor C51. After switch off of charging control transistor Q51, a falling charging current will continue to flow from inductor L51, into energy transfer capacitor C51 and return through free-wheel diode D52. During each charging period, the voltage $V_{C51}$ across the energy transfer capacitor C51 rises from approximately 294 V to approximately 300 V.

Energy injection control transistor Q52 is switched 'on' twice in each 50 µS cycle (e.g. from 1.025-1.033 mS and from 1.050-1.058 mS in FIG. 5B) to discharge energy transfer capacitor C51 by current pulses, seen in waveform $I_{L52}$ in FIG. 5B, and which flow through transistor Q52, diode D53 and inductor L52, and respective diagonal transistor pairs of the H-bridge, into the parallel resonated load circuit.

The transistors Q54 and Q57 of the first diagonal pair of H-bridge injection control transistors, are switched 'on' for 12.5 µS once in each 50 µS cycle (e.g. from 1.050-1.0625 mS in FIG. 5B) to direct injection current and energy from the energy transfer capacitor C51 into the resonated load circuit. In the circuit of FIG. 5A, this current flows clockwise from the H-bridge through the parallel resonated load circuit, predominantly through resonating capacitor C52.

The transistors Q55 and Q56 of the second diagonal pair of H-bridge injection control transistors, are switched 'on' for 12.5 µS once in each 50 µS cycle (e.g. from 1.025-1.0375 mS in FIG. 5B) to direct injection current and energy from the energy transfer capacitor C51 into the resonated load circuit. In the circuit of FIG. 5A, this current flows anti-clockwise from the H-bridge through the parallel resonated load circuit.

The discharge current pulses from energy transfer capacitor C51 are directed by the H-bridge switching transistors into the resonated load circuit in alternating directions and are shown in waveform $I_X$ in FIG. 5B. The current $I_X$ flows between the H-bridge switching transistors and the parallel connected resonated load circuit, as indicated in FIG. 5A.

The flow of injection current from the energy transfer capacitor C51 discharges the energy transfer capacitor; the voltage on the energy transfer capacitor falling from approximately 300 V to approximately 294 V.

The repetition frequency of the periodic injection of current pulses into the resonated load circuit is governed by the switching frequency of the four H-bridge injection control transistors Q54, Q55, Q56 and Q57. In the first specific version of the FIG. 5A embodiment, the switching frequency of these four transistors is 20 kHz which is approximately 2.5% above the natural resonant frequency, 19.5 kHz, of the resonated load circuit.

The periodic injection of current pulses into the resonated load circuit establishes an oscillating voltage of approximately 720 V peak-peak, shown as $V_{T51P}$ in FIG. 5B, across the primary winding of the transformer T51, an oscillating current of approximately 60 A peak-peak, shown as $I_{T51P}$ in FIG. 5B, in the primary winding of transformer T51.

FIG. 5C shows current, voltage and power waveforms of a second version of the fifth embodiment circuit shown in FIG. 5A. In this version of the FIG. 5A circuit, the inductance of the transformer T51 is 85 µH, instead of 95 µH as in the first version described above, giving the second specific version a natural resonant frequency of the resonated load circuit of 20.6 kHz. In all other respects the components, the component values and the switching times of the transistors, are as described above for the first version of FIG. 5A.

FIG. 5C shows the following waveforms from 1.0-1.1 mS from start-up of the second version of the circuit of FIG. 5A.

$I_{D51}$ current in diode D51, shown at 2.5 A/division
$V_{C51}$ voltage across energy transfer capacitor C51, shown at 5 V/division
$I_{L52}$ current through inductor L52, shown at 5 A/division
$I_X$ bi-polar injection current into resonated load circuit, shown at 5 A/division
$I_{T51P}$ current in transformer T51 primary winding, shown at 25 A/division
$V_{T51P}$ voltage across transformer T51 primary winding, shown at 250 V/division
$P_{R51}$ power in the load resistor R51, shown at 250 W/division The charging current delivered to energy transfer capacitor C51 through diode D51 rises smoothly from zero to a peak value of approximately 2.3 A, with a shape governed by the series resonant combination of inductor L51 and energy transfer capacitor C51. During each charging period, the voltage $V_{C51}$ across the energy transfer capacitor C51 rises from approximately 296 V to approximately 300 V.

The flow of injection current from the energy transfer capacitor C51 discharges the energy transfer capacitor; the voltage on the energy transfer capacitor falling from approximately 300 V back to approximately 296 V.

The repetition frequency of the periodic injection of current pulses into the resonated load circuit is governed by the switching frequency of the four H-bridge injection control transistors Q54, Q55, Q56 and Q57. In the second specific version of the FIG. 5A embodiment, the switching frequency of these four transistors is 20 kHz which is approximately 3% below the natural resonant frequency, 20.6 kHz, of the resonated load circuit.

The periodic injection of current pulses into the resonated load circuit establishes an oscillating voltage of approximately 520 V peak-peak, shown as $V_{T51P}$ in FIG. 5C, across the primary winding of the transformer T51, an oscillating current of approximately 51 A peak-peak, shown as $I_{T51P}$ in FIG. 5C, in the primary winding of transformer T51.

In the circuit shown in FIG. 5A, the current pulses injected into the load circuit are bidirectional. For the same reasons as described above for the fourth embodiment, the power waveforms $P_{R51}$ seen in FIGS. 5B and 5C have consistent peak power amplitudes.

Sixth Embodiment

Figure 6B:
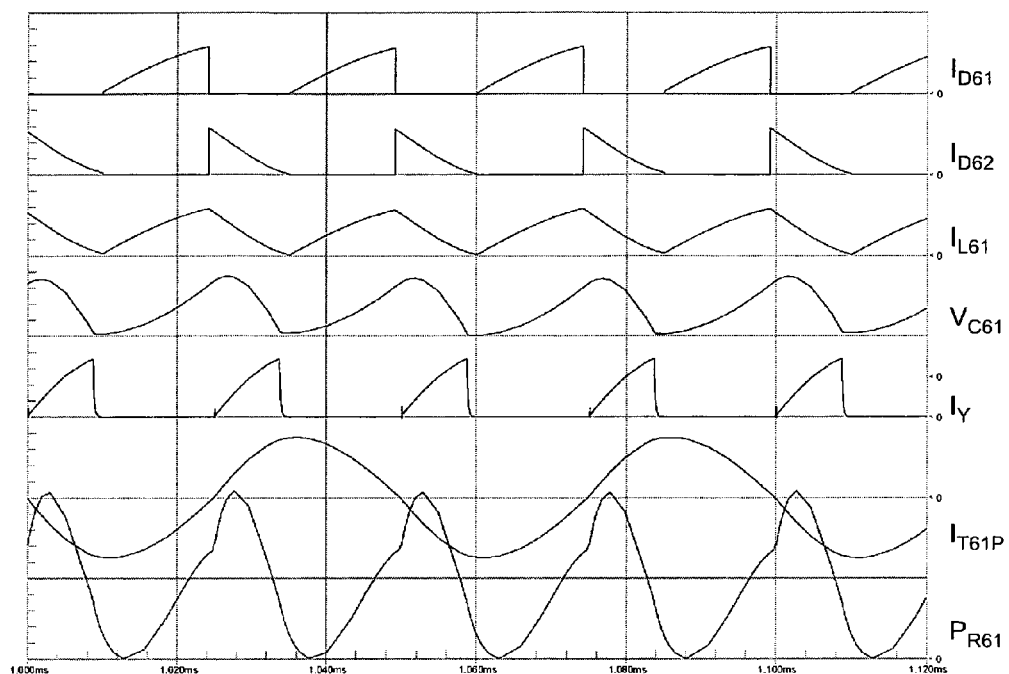
FIG. 6B shows current, voltage and power waveforms for the circuit of FIG. 6A operating above natural resonance.

FIGS. 6A and 6B show a circuit and waveforms for a sixth embodiment of the invention. This circuit injects bidirectional current pulses into a series resonated load circuit formed by a resonating capacitor C62 connected to an inductive load device. The inductive load device is a work coild of an induction heating system and is represented in FIG. 6A by the primary winding of a loosely coupled transformer T61. The resonating capacitor C62 is continuously connected in series with the primary winding of the transformer T61. A low resistance load resistor R61 is connected across the transformer secondary winding to represent the work piece of the induction heating system. A DC supply of electrical energy V61 is coupled to the resonated load circuit by a switched coupling circuit.

The switched coupling circuit is repeatedly arranged in the following sequence of configurations to transfer energy from the supply to the resonated load circuit:
1. a first capacitor charging configuration,
2. a first isolating configuration,
3. a first capacitor discharging and energy injection configuration,
4. a second isolating configuration,
5. a second capacitor charging configuration,
6. a third isolating configuration,
7. a second capacitor discharging and energy injection configuration, and
8. a fourth isolating configuration.

During each of the two capacitor charging configuration stages a charging control transistor Q61 is turned 'on', i.e. made conductive, to charge energy transfer capacitor C61 from the electrical supply V61. The charging control transistor Q61 and a series blocking diode D61, a free-wheel diode D62 and a series inductor L61 operate similarly to the corresponding components in the circuit of FIG. 1A, as described above, to charge the energy transfer capacitor C61 from the supply of electrical energy V61.

A diode D65 is connected in parallel across energy transfer capacitor C61. This diode normally remains reverse biased and non-conductive but is included to allow the circuit to continue functioning if the energy transfer capacitor C61 becomes fully discharged when injection periods are excessive relative to the size of that capacitor. In this situation, the diode D65 is forward biased and conductive.

The switched coupling circuit also includes four transistors Q64, Q65, Q66 and Q67. Diagonal pairs of transistors in the H-bridge are alternately made conductive to inject current pulses of alternating polarity into the series resonated load circuit. Two transistors Q64 and Q67, being one diagonal pair of H-bridge transistors, are made conductive when the coupling circuit is configured in the third stage of the operating sequence, viz the first capacitor discharging and energy injection configuration. Two transistors Q65 and Q66, being the other diagonal pair of H-bridge transistors, are made conductive when the coupling circuit is configured in the seventh stage of the operating sequence, viz the second capacitor discharging and energy injection configuration.

During the capacitor discharging and energy injection configurations of the third and seventh stages of each operating sequence, the energy transfer capacitor C61 is effectively connected, by the respective diagonal pairs of the H-bridge transistors, to discharge across the series combination of the resonating capacitor C62 and the inductive load device represented in FIG. 6A by the transformer T61 and load resistor R61, while the charging control transistor Q61 is 'off', disconnecting the energy transfer capacitor C61 from the supply of electrical energy V61.

The discharge current from energy transfer capacitor C61 is injected into the resonated load circuit as pulses of alternating polarity. During the third stage, the pulses flow clockwise around the loop formed by capacitor C61, H-bridge transistor Q64, resonating capacitor C62, primary winding of the transformer T61, and H-bridge transistor Q67. During the seventh stage, the pulses flow anti-clockwise around the loop formed by capacitor C61, H-bridge transistor Q65, primary winding of the transformer T61, resonating capacitor C62 and H-bridge transistor Q66.

In the isolating configurations of the second, fourth, sixth and eighth stages of the operating sequence, transistor Q61 is 'off' (i.e. made substantially non-conductive) thereby disconnecting and isolating the energy transfer capacitor C61 from the supply of electrical energy V61.

In the isolating configurations of the second and fourth stages of the operating sequence, transistors Q66 and Q67 are 'off' (i.e. made substantially non-conductive), and in the isolating configurations of the sixth and eighth stages of the operating sequence, transistors Q66 and Q67 are 'off' (i.e. made substantially non-conductive), thereby effectively disconnecting and isolating the energy transfer capacitor from C61 from the series resonated load circuit.

When the circuit is not in either of the two capacitor discharging and energy injection configuration stages, transistor Q64 or transistor Q65 is switched 'on'. Each of these two transistors, in conjunction with the inherent diode of the other of these two transistors, closes the series resonated load circuit loop for currents flowing therein, in respective directions. For example, when transistor Q64 is 'on', this transistor acts in series with the inherent body diode of transistor Q65 to allow clockwise current to circulate in the resonated load circuit of FIG. 6A. And alternatively, when transistor Q65 is 'on', this transistor acts in series with the inherent body diode of transistor Q64 allowing anti-clockwise current to circulate in the resonated load circuit of FIG. 6A.

The switching circuit is repetitively configured in the eight stage sequence to transfer energy from the supply of electrical energy V61 to the inductive load device via the energy transfer capacitor C61.

FIG. 6B shows current, voltage and power waveforms of a specific version of the sixth embodiment circuit shown in FIG. 6A having the following details.

| Supply V61 | | 300 volts |
|---|---|---|
| Transistor Q61 | MOSFET | IRFK6H350 |
| Transistor Q64 | MOSFET | IRFK6H350 |
| Transistor Q65 | MOSFET | IRFK6H350 |
| Transistor Q66 | IGBT | IRGPC50F |
| Transistor Q67 | IGBT | IRGPC50F |
| Switching frequency of transistor Q61 | | 40 kHz |
| Switching frequency of transistors Q64-Q67 | | 20 kHz |
| Switching period of transistors Q64-Q67 | | 50 µS |
| Inductor L61 | | 75 µH |
| Energy transfer capacitor C61 | | 2.0 µF |
| Resonating capacitor C62 | | 0.68 µF |
| Resonated load circuit inductance (Transformer T61 primary winding) | | 104 µH |
| Natural resonant frequency of load circuit | | 18.9 kHz |
| Energy injection (ie switching) frequency | | 20 kHz |

During each repetition of the 50 µS switching period of H-bridge transistors Q64, Q65, Q66 and Q67, the charging control transistor Q61 is 'off', i.e. non-conductive, from 0-1 µS, 'on', i.e. conductive, from 1-15 µS, 'off', i.e. non-conductive, from 15-26 µS, 'on' from 26-40 µS, and 'off' from 40-50 µS; the H-bridge transistor Q64 is 'on' from 0-40.5 µS and 'off' from 40.5-50 µS; the H-bridge transistor Q65 is 'on' from 0-15.5 µS, and 'off' from 15.5-25 µS, and 'on' from 25-50 µS; the H-bridge transistor Q66 is 'off' from 0-41 µS, and 'on' from 41-49.5 µS, and 'off' from 49.5-50 µS; and the H-bridge transistor Q67 is 'off' from 0-16 µS, 'on' from 16-24.5 µS, and 'off' from 24.5-50 µS.

FIG. 6B shows the following waveforms from 1.0-1.12 mS from start-up of the specific version of the circuit of FIG. 6A.
$I_{D61}$ current in diode D61, shown at 50 A/division
$I_{D62}$ current in diode D62, shown at 50 A/division
$I_{L61}$ current in inductor L61, shown at 50 A/division
$V_{C61}$ voltage across energy transfer capacitor C61, shown at 200 V/division
$I_Y$ discharge current from capacitor C61, shown at 100 A/division
$I_{T61P}$ current in transformer T61 primary winding, shown at 100 A/division
$P_{R61}$ power in the load resistor R61, shown at 2.5 kW/division Charging control transistor Q61 is switched 'on' twice in each 50 µS cycle (e.g. from 1.01-1.024 mS and from 1.035-1.049 mS in FIG. 6B) to charge energy transfer capacitor C61 by current $I_{D61}$ flowing through transistor Q61, diode D61 and inductor L61. This charging current rises from zero to a peak value of approximately 28.5 A, with a shape governed by the series combination of inductor L61 and energy transfer capacitor C61. When transistor Q61 is switched off, the current established in inductor L61 continues to flow while the associated magnetic field collapses. This current, which flows through flywheel diode D62 and inductor L61, is shown as waveform $I_{D62}$ in FIG. 6B. The current $I_{L61}$ in the inductor L61 is thus the combination of the two currents $I_{D61}$ and $I_{D62}$. This operation, in which the transfer capacitor is charged to a voltage lower than the supply, is typical of a buck inductor supply. During each charging period, the voltage $V_{C6}$, across the energy transfer capacitor C61 rises from approximately 110 V to approximately 243V.

The transistors Q64 and Q67 of the first diagonal pair of H-bridge injection control transistors, are switched 'on' for 8.5 µS once in each 50 µS cycle (e.g. from 1.025-1.0335 mS in FIG. 6B) to inject current and energy from the energy transfer capacitor C61 into the resonated load circuit. In the circuit of FIG. 6A, this current flows clockwise from the H-bridge through the parallel resonated load circuit.

The transistors Q65 and Q66 of the second diagonal pair of H-bridge injection control transistors, are switched 'on' for 8.5 µS once in each 50 µS cycle (e.g. from 1.050-1.0585 mS in FIG. 6B) to inject current and energy from the energy transfer capacitor C61 into the resonated load circuit. In the circuit of FIG. 6A, this current flows anti-clockwise from the H-bridge through the parallel resonated load circuit.

The discharge current pulses from energy transfer capacitor C61 have a peak current of 72 A and are shown in current waveform $I_Y$ in FIG. 6B. This discharge current $I_Y$ flows from the energy transfer capacitor C61 to the H-bridge switching transistors, as indicated in FIG. 6A. These discharge pulses are alternately inverted by the H-bridge switching transistors Q64, Q65, Q66 and Q67 before being injected as pulses of alternating polarity into the resonated load circuit formed by the parallel connection of resonating capacitor C62 and the inductive load device represented in FIG. 6A by transformer T61 and resistor R61.

The flow of injection current from the energy transfer capacitor C61 discharges the energy transfer capacitor; the voltage on the energy transfer capacitor falling from approximately 243 V to approximately 110 V.

The repetition frequency of the periodic injection of current pulses into the resonated load circuit is governed by the switching frequency of the four H-bridge injection control transistors Q64, Q65, Q66 and Q67. In the specific version of the FIG. 6A embodiment, the switching frequency of these four transistors is 20 kHz which is approximately 5.8% above the natural resonant frequency, 18.9 kHz, of the resonated load circuit.

The periodic injection of current pulses into the resonated load circuit establishes an oscillating current of approximately 148 A peak-peak, shown as $I_{T61P}$ in FIG. 6B, in the primary winding of transformer T61, and an average power of approximately 2.4 kW in the load resistor R61 representing eddy current heating in a work piece.

In the circuit shown in FIG. 6A, the current pulses injected into the load circuit are bidirectional. For the same reasons as described above for the fourth embodiment, the power waveform $P_{R61}$ seen in FIG. 6B has consistent peak power amplitudes.

The resonating capacitance may be provided by a single capacitor C62 as shown in FIG. 6A, or may be provided by multiple capacitors combined in parallel and/or in series to achieve desired current and voltage ratings. The capacitance values of the individual capacitors are selected to maintain the capacitance value of the overall combination of capacitors so that the resonant frequency of the resonated load circuit is unchanged. The value of resonating capacitance can be controlled, for example by switching multiple parallel capacitors in and out of circuit under control of a microprocessor or other programmable logic control device, to maintain the resonating load circuit in the appropriate state of 'tune', i.e. at or near resonance.

In one variant (not shown) of the circuit shown in FIG. 6A, the 0.68 µF resonating capacitor C62 of FIG. 6A is substituted by two capacitors each of 1.36 which are connected in series with, but at respective opposite ends of, the primary winding of the transformer T61.

Seventh Embodiment

Figure 7B:
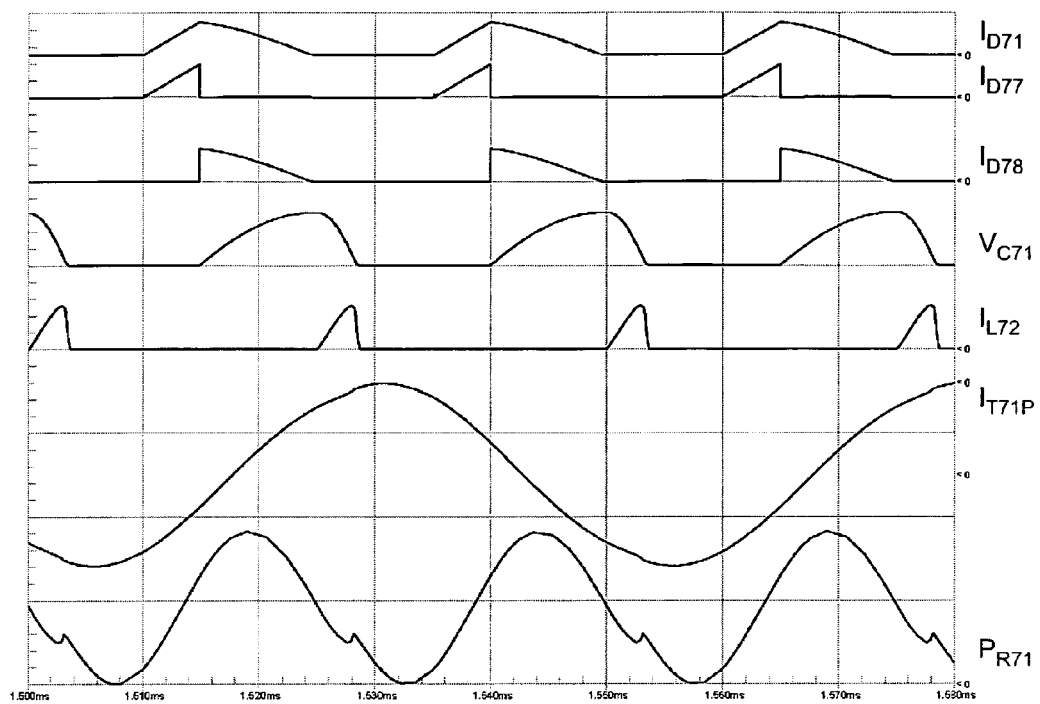
FIG. 7B shows current, voltage and power waveforms for the circuit of FIG. 7A operating below natural resonance.

FIGS. 7A and 7B show a circuit and waveforms for a seventh embodiment of the invention. This circuit injects bidirectional current pulses into the inductive leg of a resonated load circuit formed by a resonating capacitor C72 connected to an inductive load device. The inductive load device is a work coil of an induction heating system and is represented in FIG. 7A by the primary winding of a loosely coupled transformer T71.

The resonating capacitor C72 is connected across the primary winding of the transformer T71 by resonating capacitor switching transistors Q73A and Q73B. A low resistance load resistor R71 is connected across the transformer secondary winding to represent the work piece of the induction heating system. A DC supply of electrical energy V71 is coupled to the resonated load circuit by a switched coupling circuit.

The switched coupling circuit is repeatedly arranged in the following sequence of configurations to transfer energy from the supply to the resonated load circuit:
1. a first pre-charging configuration,
2. a first capacitor charging configuration,
3. a first capacitor discharging and energy injection configuration,
4. a first isolating configuration,
5. a second pre-charging configuration,
6. a second capacitor charging configuration,
7. a second capacitor discharging and energy injection configuration, and
8. a second isolating configuration.

During each of the pre-charging configuration stages a charging control transistor Q78 in a step-up boost converter circuit arrangement is switched 'on', i.e. made conductive, to draw current from the supply V71 through series blocking diode D71, inductor L71 and blocking diode D77. This current builds up a magnetic field in association with inductor L71. A blocking diode D78 is reverse biased to prevent an energy transfer capacitor C71 from discharging through diode D77 and transistor Q78.

At the beginning of each of the capacitor charging configuration stages, the charging control transistor Q78 is switched 'off' but current continues to flow from the supply through the inductor L71 while the associated magnetic field collapses. With transistor Q78 non-conductive, the current flows instead through the blocking diode D78, now forward biased, to continue charging of energy transfer capacitor C71.

The switched coupling circuit also includes four transistors Q74, Q75, Q76 and Q77. Diagonal pairs of transistors in the H-bridge are alternately made conductive to inject current pulses of alternating polarity into the series resonated load circuit. Two transistors Q74 and Q77, being one diagonal pair of H-bridge transistors, are made conductive when the coupling circuit is configured in the third stage of the operating sequence, viz the first capacitor discharging and energy injection configuration. Two transistors Q75 and Q76, being the other diagonal pair of H-bridge transistors, are made conductive when the coupling circuit is configured in the seventh stage of the operating sequence, viz the second capacitor discharging and energy injection configuration.

During the capacitor discharging and energy injection configurations of the third and seventh stages of each operating sequence, the energy transfer capacitor C71 is effectively connected, by the respective diagonal pairs of the H-bridge transistors, to discharge across the inductive load device represented in FIG. 7A by the transformer T71 and load resistor R71.

The discharge current from energy transfer capacitor C71 is injected into the resonated load circuit as pulses of alternating polarity.

During the third stage, the injection pulses flow clockwise around the loop formed by capacitor C71, inductor L72, H-bridge transistor Q74, diode D74A, primary winding of the transformer T71, and H-bridge transistor Q77. During this third stage, resonating capacitor switching transistor Q73B is switched 'off', breaking the parallel connection of resonating capacitor C72 across the primary winding of transformer T71, and preventing current flowing through resonating capacitor C72, from left to right as seen in FIG. 7A.

It is to be appreciated that while resonating capacitor switching transistor Q73B is switched 'off', current can flow in the reverse direction if transistor Q73A is switched 'on'. This allows clockwise currents circulating in the parallel resonant circuit formed by the primary winding of transformer T71 and resonating capacitor C72 to flow, from right to left as seen in FIG. 7A, through the inherent body diode of transistor Q73B, resonating capacitor C72, and 'on' transistor Q73A.

During the seventh stage, the injection pulses flow anticlockwise around the loop formed by capacitor C71, inductor L72, H-bridge transistor Q75, diode D74B, primary winding of the transformer T71, and H-bridge transistor Q76. During this seventh stage, resonating capacitor switching transistor Q73A is switched 'off', breaking the parallel connection of resonating capacitor C72 across the primary winding of transformer T71, and preventing current flowing through resonating capacitor C72, from right to left as seen in FIG. 7A. It is to be appreciated that while resonating capacitor switching transistor Q73A is switched 'off', current can flow in the reverse direction if transistor Q73B is switched 'on'. This allows clockwise currents circulating in the parallel resonant circuit formed by the primary winding of transformer T71 and resonating capacitor C72 to flow, from left to right as seen in FIG. 7A, through the inherent body diode of transistor Q73A, resonating capacitor C72, and 'on' transistor Q73B.

Resonating capacitor switching transistors Q73A and Q73B are switched 'off' to disconnect the resonating capacitor C72, while respective pairs of H-bridge transistors Q75 and Q76, and Q74 and Q77, are switched 'on' to inject current from energy transfer capacitor C71 into the inductive leg, i.e. the primary winding of transformer T71, of the resonated load circuit.

Blocking diodes D74A and D74B prevent current from flowing through respective H-bridge transistors Q74 and Q75, and particularly through the body diodes inherent in these transistors, when these transistors are switched 'off'.

In the isolating configurations of the fourth and eighth stages of the operating sequence transistor Q78 is switched 'on' (i.e. made substantially conductive), shunting current drawn from the supply V71 to ground and effectively disconnecting the energy transfer capacitor C71 from the supply of electrical energy V71.

In the isolating configurations of the fourth and eighth stages of the operating sequence, the four H-bridge transistors Q74, Q75, Q76 and Q77 are 'off' (i.e. made substantially non-conductive), thereby effectively disconnecting the energy transfer capacitor C71 from the series resonated load circuit.

When the circuit is not in either of the two capacitor discharging and energy injection configuration stages, transistor Q73A and transistor Q73B are switched 'on'. Each of these two transistors, in conjunction with the inherent diode of the other of these two transistors, connects the resonating capacitor C72 across the inductive leg of the resonated load circuit loop for currents flowing therein in a respective direction. For example, when transistor Q73A is 'on', this transistor acts in series with the inherent body diode of transistor Q73B to allow clockwise current to circulate in the resonated load circuit of FIG. 7A. And alternatively, when transistor Q73B is 'on', this transistor acts in series with the inherent body diode of transistor Q73A allowing anti-clockwise current to circulate in the resonated load circuit of FIG. 7A.

The switching circuit is repetitively configured in the eight stage sequence to transfer energy from the supply of electrical energy V71 to the inductive load device via the energy transfer capacitor C71.

FIG. 7B shows current, voltage and power waveforms of a specific version of the seventh embodiment circuit shown in FIG. 7A having the following details.

| | | |
|---|---|---|
| Supply V71 | | 300 volts |
| Transistor Q73A | MOSFET | IRFK4HE50 or IRFK4JE50 |
| Transistor Q73B | MOSFET | IRFK4HE50 or IRFK4JE50 |
| Transistor Q74 | MOSFET | IRFK4HE50 or IRFK4JE50 |
| Transistor Q75 | MOSFET | IRFK4HE50 or IRFK4JE50 |
| Transistor Q76 | IGBT | IRGBH50F |
| Transistor Q77 | IGBT | IRGBH50F |
| Transistor Q78 | MOSFET | IRFK4JE50 |
| Switching frequency of transistor Q78 | | 40 kHz |
| Switching frequency of transistors Q73A-Q77 | | 20 kHz |
| Switching period of transistors Q73A-Q77 | | 50 µS |
| Inductor L71 | | 75 µH |
| Inductor L72 | | 10 µH |
| Energy transfer capacitor C71 | | 0.68 µF |
| Resonating capacitor C72 | | 0.68 µF |
| Resonated load circuit inductance (Transformer T71 primary winding) | | 82 µH |
| Natural resonant frequency of load circuit | | 21.3 kHz |
| Energy injection frequency | | 20 kHz |

During each repetition of the 50 µS switching period of transistors Q73A, Q73B, Q74, Q75, Q76 and Q77, the charging control transistor Q78 is 'on', i.e. conductive, from 0-4.72 µS, 'off', i.e. non-conductive, from 4.72-25 µS, 'on', i.e. conductive, from 25-29.72 µS, and 'off' from 29.72-50 µS; the H-bridge injection control transistors Q74 and Q77 are 'off' from 0-15 µS, 'on' from 15-18 µS, and 'off' from 18-50 µS; the H-bridge injection control transistors Q75 and Q76 are 'off' from 0-40 µS, 'on' from 40-43 µS, and 'off' from 43-50 µS; the resonating capacitor switching transistor Q73A is 'on' from 0-39.5 µS, 'off' from 39.5-43.5 and 'on' from 43.5-50 µS; and the resonating capacitor switching transistor Q73B is 'on' from 0-14.5 µS, 'off' from 14.5-18.5 µS, and 'on' from 18.5-50 µS.

FIG. 7B shows the following waveforms from 1.50-1.58 mS from start-up of the specific version of the circuit of FIG. 7A.

$I_{D71}$ current in diode D71, shown at 50 A/division
$I_{D77}$ current in diode D77, shown at 50 A/division
$I_{D78}$ current in diode D78, shown at 50 A/division
$V_{C71}$ voltage across energy transfer capacitor C71, shown at 250 V/division
$I_{L72}$ current in inductor L72, shown at 100 A/division
$I_{T71P}$ current in transformer T71 primary winding, shown at 50 A/division
$P_{R71}$ power in the load resistor R71, shown at 1 kW/division Charging control transistor Q78 is switched 'on' for 4.72 µS twice in each 50 µS cycle (e.g. from approximately 1.51-1.515 mS and from 1.535-1.54 mS in FIG. 7B) to draw current from the supply V71 and store energy in the magnetic field associated with inductor L71. In the circuit of FIG. 7A, current flow through transistor Q78 also flows through diode D77 and is shown as waveform $I_{D71}$ in FIG. 7B. This current rises to a peak value of approximately 19 A and ceases abruptly when transistor Q78 switches off. At that time, the current flowing from the supply through diode D71 and inductor L71 is diverted to flow through diode D78 and into energy transfer capacitor C71. This current through diode D78 is shown as waveform $I_{D78}$ in FIG. 7B. The current flowing from the supply through diode D71 and inductor L71 is shown as waveform $I_{D71}$ in FIG. 7B and is the addition of currents $I_{D77}$ and $I_{D78}$.

The energy transfer capacitor C71 is thus charged twice during each 50 µS cycle, the voltage $V_{C71}$ across the energy transfer capacitor C71 rising each time from approximately 350 V to approximately 507 V.

The transistors Q74 and Q77 of the first diagonal pair of H-bridge injection control transistors, are switched 'on' for 3 µS once in each 50 µS cycle (e.g. from 1.525-1.528 mS in FIG. 7B) to inject current and energy from the energy transfer capacitor C71 into the resonated load circuit. In the circuit of FIG. 7A, this current flows clockwise from the H-bridge through the parallel resonated load circuit.

The transistors Q75 and Q76 of the second diagonal pair of H-bridge injection control transistors, are switched 'on' for 3 µS once in each 50 µS cycle (e.g. from 1.550-1.553 mS in FIG. 7B) to inject current and energy from the energy transfer capacitor C71 into the resonated load circuit. In the circuit of FIG. 7A, this current flows anti-clockwise from the H-bridge through the parallel resonated load circuit.

The discharge current pulses from energy transfer capacitor C71 have a peak current of 52 A. These pulses are delivered through inductor L72 and are shown in waveform $I_{L72}$ in FIG. 7B. These pulses are alternately inverted by the H-bridge switching transistors Q74, Q75, Q76 and Q77 before being injected as pulses of alternating polarity into the inductive leg of the resonated load circuit.

The flow of injection current from the energy transfer capacitor C71 discharges the energy transfer capacitor; the voltage on the energy transfer capacitor falling from approximately 507 V to approximately 350 V.

The repetition frequency of the periodic injection of current pulses into the resonated load circuit is governed by the switching frequency of the four H-bridge injection control transistors Q74, Q75, Q76 and Q77. In the specific version of the FIG. 7A embodiment, the switching frequency of these four transistors is 20 kHz which is approximately 6.5% below the natural resonant frequency, 21.3 kHz, of the resonated load circuit.

The periodic injection of current pulses into the resonated load circuit establishes an oscillating current of approximately 108 A peak-peak, shown as $I_{T71P}$ in FIG. 7B, in the primary winding of transformer T71, and an average power of approximately 900 W in the load resistor R71 representing eddy current heating in a work piece.

In the circuit shown in FIG. 7A, the current pulses injected into the load circuit are bidirectional. For the same reasons as described above for the fourth embodiment, the power waveform $P_{R71}$ seen in FIG. 7B has consistent peak power amplitudes.

Eighth Embodiment

Figure 8B:
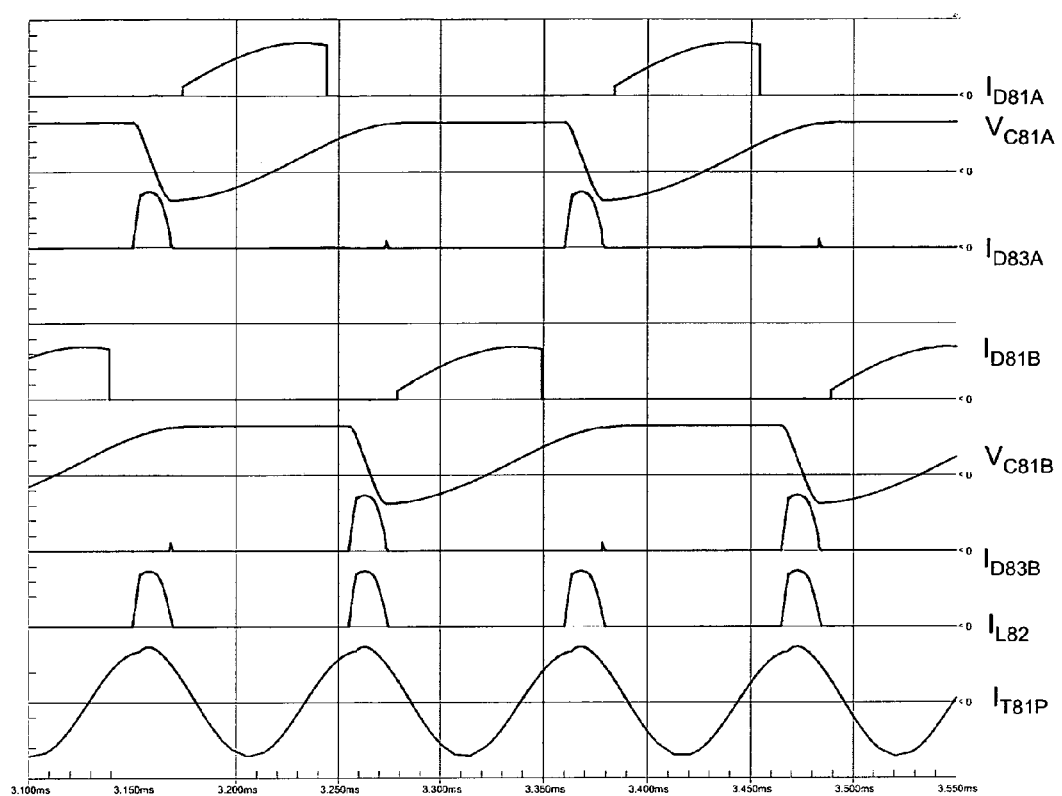
FIG. 8B shows current and voltage waveforms for the circuit of FIG. 8A with two energy transfer capacitors operating alternately without the recharging of either capacitor overlapping the injection of current pulses into the resonant load.
Figure 8C:
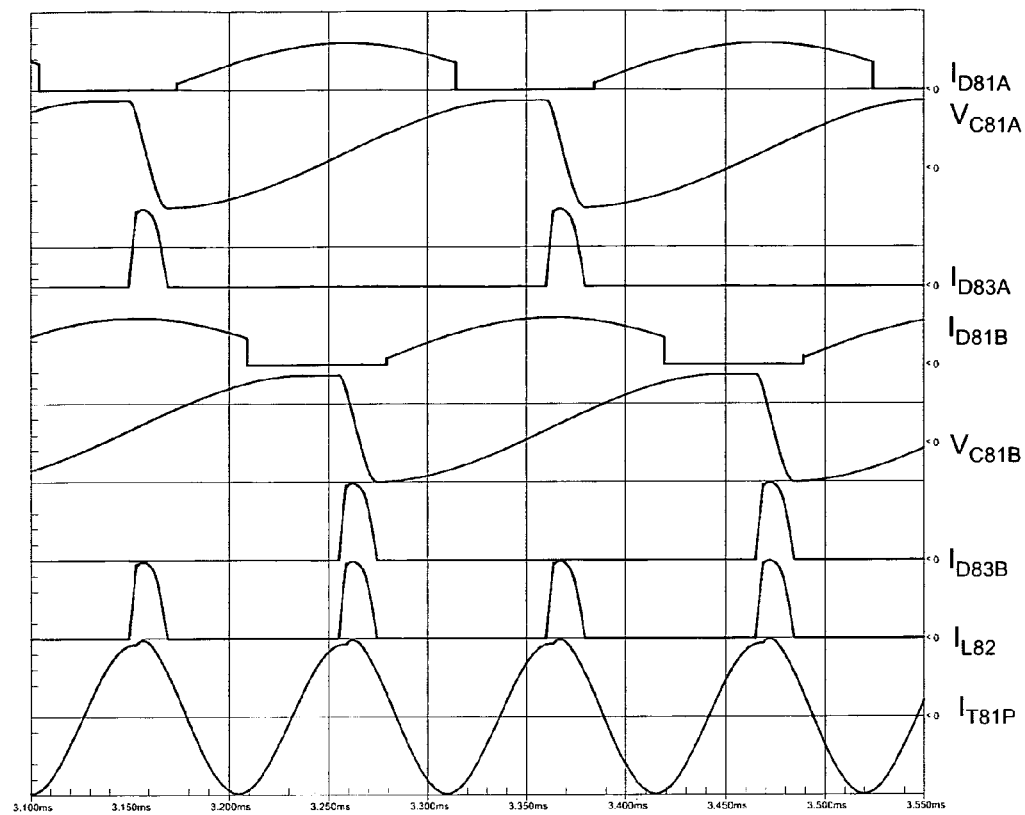
FIG. 8C shows current and voltage waveforms for the circuit of FIG. 8A with two energy transfer capacitors operating alternately with the recharging of each capacitor overlapping the discharge of the other capacitor to inject a current pulse into the resonant load.

FIGS. 8A, 8B and 8C show a circuit and waveforms for an eighth embodiment of the invention. This circuit injects unidirectional current pulses into a series resonated load circuit formed by a resonating capacitor C82 connected in series with an inductive load device. The inductive load device is a work coil of an induction heating system and is represented in FIG. 8A by the primary winding of a loosely coupled transformer T81. The resonating capacitor C82 is continuously connected in series with the transformer primary winding. A low resistance load resistor R81 is connected across the transformer secondary winding to represent the work piece of the induction heating system. A DC supply of electrical energy V81 is coupled to the resonated load circuit by two switched coupling circuits.

A load circuit control transistor Q83 controls the opening and closing of the series resonated load circuit. Oscillating load circuit currents can circulate in one direction (anti-clockwise in FIG. 8A) through load circuit control transistor Q83 when that transistor is turned 'on', and can circulate in the opposite direction (clockwise in FIG. 8A) through a diode D84 connected in parallel across the transistor Q83, even when transistor Q83 is turned 'off'.

The parallel diode D84 provides a path for the clockwise currents circulating in the load circuit. If transistor Q83 has an inherent diode, e.g. if transistor Q93 is a MOSFET, the discrete parallel diode D84 is optional but can be included to provide additional current carrying capacity.

As shown in FIG. 8A, the switched coupling circuit includes two switched coupling circuits. Each coupling circuit comprises a series blocking diode D81A, D81B; a charging control transistor Q81A, Q81B; a free-wheel diode D82A, D82B; a series inductor L81A, L81B; an energy transfer capacitor C81A, C81B; an energy injection control transistor Q82A, Q82B; and a series blocking diode D83A, D83B.

The two coupling circuits inject current pulses into the load circuit via a common series injection control inductor L82.

Each switched coupling circuit is repeatedly arranged in the following sequence of configurations to transfer energy from the supply V81 to the resonated load circuit:
1. a capacitor charging configuration,
2. a first optional isolating configuration,
3. a capacitor discharging and energy injection configuration, and
4. a second optional isolating configuration.

In the capacitor charging configuration of each respective switched coupling circuit, the charging control transistor Q81A, Q81B, series blocking diode D81A, D81B, free-wheel diode D82A, D82B, and series inductor L81A, L81B, operate similarly to the corresponding components in the circuit of FIG. 1A, as described above, to charge the respective energy transfer capacitor C81A, C81B, from the common supply of electrical energy V81.

In the capacitor discharging and energy injection configuration of each respective switched coupling circuit, the charging control transistor Q81A, Q81B is 'off', disconnecting the energy transfer capacitor C81A, C81B from the supply of electrical energy V81, and energy injection control transistor Q82A, Q82B is 'on', connecting the energy transfer capacitor C81A, C81B, through blocking diodes D83A, D83B, and common series injection control inductor L82, across the series connected resonated load circuit.

One embodiment of the circuit of FIG. 8A is described below with reference to the waveforms of FIG. 8B. In this embodiment, the two charging and injecting circuits operate alternately without the recharging of either energy transfer capacitor C81A, C81B overlapping the injection of current pulses into the resonant load. In this embodiment, the following sequence of actions is repeated to efficiently transfer energy from the supply to the resonant load circuit. Firstly, a first injection control transistor Q82A is made conductive to discharge first energy transfer capacitor C81A and thereby inject a current pulse into the resonant load circuit. Secondly, a first charging control transistor Q81A is made conductive to recharge the first energy transfer capacitor C81A from the supply V81. Thirdly, a second injection control transistor Q82B is made conductive to discharge a second energy transfer capacitor C81B and thereby inject a current pulse into the resonant load circuit. Fourthly, a second charging control transistor Q81B is made conductive to recharge the second energy transfer capacitor C81B from the supply V81.

Another embodiment of the circuit of FIG. 8A is described below with reference to the waveforms of FIG. 8C. In this embodiment, the two charging and injecting circuits operate alternately with the recharging of each energy transfer capacitor C81A, C81B overlapping the discharge of the other energy transfer capacitor to inject a current pulse into the resonant load. In this embodiment, the following sequence of actions is repeated to efficiently transfer energy from the supply to the resonant load circuit. Firstly, a first energy transfer capacitor C81A is charged from the supply V81. During at least part of the period that this first energy transfer capacitor is being charged, a second energy transfer capacitor C81B is discharged to inject a current pulse into the resonant load circuit. Secondly, the second energy transfer capacitor C81B is charged from the supply V81. During at least part of the period that this second energy transfer capacitor is being charged, the first energy transfer capacitor C81A is discharged to inject a current pulse into the resonant load circuit. The charging of the two energy transfer capacitors may overlap one another.

In each of these two embodiments, the load circuit control transistor Q83 is switched 'off', i.e. made non-conductive, during injection of current pulses into the resonant load circuit. The load circuit control transistor Q83 is switched 'on', i.e. made conductive, to permit resonated load circuit current to circulate in one direction (anti-clockwise in FIG. 8A). Diode D84, connected in parallel across the load circuit control transistor Q83, permits load circuit current to circulate in the opposite direction (clockwise in FIG. 8A).

When each switched coupling circuit is configured in the optional isolating configurations, the respective charging control transistor Q81A, Q81B and the respective energy injection control transistor Q82A, Q82B are 'off' (i.e. made substantially non-conductive), thereby effectively disconnecting and isolating the respective energy transfer capacitor C81A, C81B from the common supply of electrical energy V81 and from the resonated load circuit provided by resonating capacitor C82 and the inductive load device represented in FIG. 8A by the transformer T81 and load resistor R81.

Current circulating in the resonated load circuit when neither of the energy injection control transistors Q82A, Q82B are switched 'on' continues to circulate substantially at or near the natural resonant frequency of the resonated load circuit through load circuit control transistor Q83 in one direction and through parallel diode D84 in the opposite direction.

When each coupling circuit is configured in an injection configuration, a current pulse is injected from the respective energy transfer capacitor C81A, C81B to flow through respective forward biased blocking diode D83A, D83B; a respective injection control transistor Q82A, Q82B; common series injection control inductor L82; and into the upper leg of the resonated load circuit formed by the series connection of the resonating capacitor C82 and the inductive load device (represented in FIG. 8A by the primary winding of transformer T81 with load resistor R81 connected across the loosely coupled secondary winding). The injection current pulse injected into the resonated load circuit is smoothed by the series injection control inductor L82 which limits the initial transient discharge current from the respective energy transfer capacitor C81A, C81B. The injection current is drawn from the respective energy transfer capacitor C81A, C81B, discharging the capacitor and optionally dropping the voltage across the capacitor below zero.

If the injection current pulse into the resonated load circuit is extended, or the capacitance of the energy transfer capacitor is not of sufficient size, the voltage on the energy transfer capacitor C81A, C81B may fall below zero and can become momentarily negative because of current drawn from the capacitor by the resonated load circuit. This condition only occurs momentarily until the next recharge cycle and, while it may detract from best efficiency, it does not otherwise interfere with normal operation of the circuit.

After the cessation of each injection current pulse, current continues to circulate in the resonated load circuit at or near its natural resonant frequency, initially as a clockwise resonated load circuit current through parallel diode D84. While the resonated load circuit current flows clockwise, load circuit control transistor Q83 is turned 'on', i.e. made conductive. On reversal of polarity, the resonated load circuit current flows as an anti-clockwise current through load circuit control transistor Q83. In this way, current continues to oscillate in the resonated load circuit without interruption.

The repetition rate of the energy injection by current pulses is controlled by the switching frequency of the switched coupling circuits. This switching frequency, or an integral multiple of this switching frequency, is selected to be close to the natural resonant frequency of the resonated load circuit so that each injection of current from an energy transfer capacitor C81A, C81B into the resonated load circuit occurs during the half cycle of resonated load circuit current flowing clockwise through parallel diode D84.

In this way, diodes D83A, D83B and D84 permit a smooth changeover from a naturally resonant mode when clockwise current in the resonated load circuit circulates back through diode D84, to an injection mode when the current flows from discharge of an energy transfer capacitor C81A, C81B, through a respective diode D83A, D83B and injection control inductor L82, and from left to right in the upper leg of the resonant load circuit, to inject energy into the resonated load circuit.

The blocking diodes D83A, D83B are included when energy injection control transistors Q82A, Q82B are MOSFETs or similar device with an inherent body diode providing a reverse conductive path from source to drain, even when the transistor is turned 'off'. The blocking diodes D83A, D83B prevent reverse current flowing from the resonated load circuit back into the respective energy transfer capacitor C81A, C81B through the inherent MOSFET body diodes. Without the blocking diodes D83A, D83B, this reverse current could flow even when the respective transistor Q82A, Q82B was turned 'off'.

The discharge current pulses from the energy transfer capacitors C81A, C81B are always injected into the resonated load circuit with the same polarity. That is, the discharge current is injected into the resonated load circuit as a sequence of pulses all having the same polarity. In the circuit shown in FIG. 8A, current pulses are injected into the resonated load circuit to flow clockwise around the respective loop formed by energy transfer capacitor C81A, C81B, blocking diode D83A, D83B, transistor Q82A, Q82B, common injection control inductor L82, and the series connection of the resonating capacitor C82 and the primary winding of the transformer T81.

The switching circuit of FIG. 8A is repetitively configured in the sequences described above to transfer energy from the supply of electrical energy V81 to the inductive load device by alternating routes via the two energy transfer capacitors C81A, C81B.

The amount of energy that can be transferred to the resonated load circuit is increased in the circuit of FIG. 8A, by the alternating use of two energy transfer capacitors. In another arrangement, not shown in the figures, more than two energy transfer capacitors with associated charge and inject switching circuits, respectively inject successive current pulses into the resonated load to further increase the amount of energy delivered to the load.

It is noted that the discharge of the energy transfer capacitors C81A, C81B, and the concomitant injection of energy into the resonated load circuit, does not necessarily commence immediately upon the turn-on of the respective injection control transistor Q82A, Q82B. For example, although energy control transistor Q82A, may be turned 'on', i.e. made conductive, the injection path from energy transfer capacitor C81A to the resonated load circuit, will not be completed until diodes D83A come conductive when the voltage across the resonated load circuit falls below the voltage on the charged energy transfer capacitor. This effectively synchronises the injection of energy at the point on the waveform of the oscillating voltage across the resonated load circuit that matches the voltage on the charged energy injection capacitor. This automatic synchronisation, and the close matching of the dropping voltage on the then-discharging energy transfer capacitor with the falling voltage across the resonated load, provides a 'soft' and energy-efficient injection of energy.

FIG. 8B shows current and voltage waveforms of a first specific version of the eighth embodiment circuit shown in FIG. 8A having the following details.

| | | |
|---|---|---|
| Supply V81 | | 100 volts |
| Transistors Q81A&B | MOSFET | IRFK6J350 |
| Transistors Q82A&B | MOSFET | IRFK4J450 |
| Transistor Q83 | IGBT | MGY40N60 |
| Switching frequency of transistors Q81A&B, Q82A&B | | 4.76 kHz |
| Switching period of transistors Q81A&B, Q82A&B | | 210 µS |
| Switching frequency of transistor Q83 | | 9.52 kHz |
| Switching period of transistor Q83 | | 105 µS |
| Inductors L81A&B | | 1.7 mH |
| Inductor L82 | | 30 µH |
| Inductor L83 | | 1 µH |
| Energy transfer capacitors C81A&B | | 1.0 µF |
| Resonating capacitor C82 | | 1.36 µF |
| Resonated load circuit inductance (Transformer T21 primary winding) | | 205 µH |
| Natural resonant frequency of load circuit | | 9.65 kHz |
| Energy injection frequency | | 9.52 kHz |

During the 210 µS switching period of each pair of alternate injection cycles, the first injection control transistor Q82A is turned 'on', i.e. conductive, for 22 μS from 0-22 μS, and is turned 'off', i.e. non-conductive, from 22-210 μS; the first charging control transistor Q81A is turned 'off', i.e. non-conductive, from 0-24 μS, is 'on' for 70 μS from 24-94 μS, and then is turned 'off' from 94-210 μS; the second injection control transistor Q82B is turned 'off', i.e. non-conductive, from 0-105 is turned 'on', i.e. conductive, for 22 μS from 105-127 μS, and is then turned 'off' from 127-210 μS; the second charging control transistor Q81B is turned 'off', i.e. non-conductive, from 0-129 μS, is turned 'on' for 70 μS from 129-199 μS, and is then turned 'off' from 199-210 μS; and the load circuit control transistor Q83 is turned 'off' from 0-28 μS, is turned 'on' for 73 μS from 28-101 μS, is turned 'off' from 101-133 μS, and is turned 'on' for 73 μS from 133-206 μS.

FIG. 8B shows the following waveforms from 3.1-3.55 mS from start-up of the version of the circuit of FIG. 8A using the component values and switch timings as described in the two immediately preceding paragraphs.

$I_{D81A}$ current in diode D81A, shown at 10 A/division
$V_{C81A}$ voltage on 1$^{st}$ energy transfer capacitor C81A, shown at 500 V/division
$I_{D83A}$ current in diode D83A, shown at 50 A/division
$I_{D81B}$ current in diode D81B, shown at 10 A/division
$V_{C81B}$ voltage on 2nd energy transfer capacitor C81B, shown at 500 V/division
$I_{D83B}$ current in diode D83B, shown at 50 A/division
$I_{L82}$ current in inductor L82, shown at 50 A/division
$I_{T81P}$ current in transformer T81 primary winding, shown at 50 A/division In this embodiment, the periodic injection of current pulses into the resonated load circuit establishes an oscillating current of approximately 72 A peak-peak, shown as $I_{T81P}$ in FIG. 8B, in the resonating capacitor C82 and primary winding of transformer T81.

FIG. 8C shows current and voltage waveforms of a second specific version of the eighth embodiment circuit shown in FIG. 8A having the following details. This circuit has an identical topology to that described with reference to the waveforms of FIG. 8B, but differs in the doubling of the inductance value of inductors L81A, L81B from 1.7 mH to 3.4 mH, and in the doubling of the duration of the charging times of energy transfer capacitors C81A, C81B from 70 μS to 140 μS. By this change, the charging of one energy transfer capacitor overlaps with the discharge of other energy transfer capacitor to inject a current pulse into the load circuit, resulting in increased current in the load circuit.

| | | |
|---|---|---|
| Supply V81 | | 100 volts |
| Transistors Q81A&B | MOSFET | IRFK6J350 |
| Transistors Q82A&B | MOSFET | IRFK4J450 |
| Transistor Q83 | IGBT | MGY40N60 |
| Switching frequency of transistors Q81A&B, Q82A&B | | 4.76 kHz |
| Switching period of transistors Q81A&B, Q82A&B | | 210 μS |
| Switching frequency of transistor Q83 | | 9.52 kHz |
| Switching period of transistor Q83 | | 105 μS |
| Inductors L81A&B | | 3.4 mH |
| Inductor L82 | | 30 μH |
| Inductor L83 | | 1 μH |
| Energy transfer capacitors C81A&B | | 1.0 μF |
| Resonating capacitor C82 | | 1.36 μF |
| Resonated load circuit inductance (Transformer T21 primary winding) | | 205 μH |
| Natural resonant frequency of load circuit | | 9.65 kHz |
| Energy injection frequency | | 9.52 kHz |

During the 210 μS switching period of each pair of alternate injection cycles, the first injection control transistor Q82A is turned 'on', i.e. conductive, for 22 μS from 0-22 μS, and is turned 'off', i.e. non-conductive, from 22-210 μS; the first charging control transistor Q81A is turned 'off', i.e. non-conductive, from 0-24 μS, is 'on' for 140 μS from 24-164 μS, and then is turned 'off' from 164-210 μS; the second injection control transistor Q82B is turned 'off', i.e. non-conductive, from 0-105 μS, is turned 'on', i.e. conductive, for 22 μS from 105-127 μS, and is then turned 'off' from 127-210 μS; the second charging control transistor Q81B is turned 'on', i.e. conductive, from 0-59 μS; is turned 'off', i.e. non-conductive, from 59-129 μS, and is turned 'on' from 129-210 μS, and the load circuit control transistor Q83 is turned 'off' from 0-28 μS, is turned 'on' for 73 μS from 28-101 μS, is turned 'off' from 101-133 μS, and is turned 'on' for 73 μS from 133-206 μS.

FIG. 8C shows the following waveforms from 3.1-3.55 mS from start-up of the version of the circuit of FIG. 8A using the component values and switch timings as described in the two immediately preceding paragraphs.

$I_{D81A}$ current in diode D81A, shown at 10 A/division
$V_{C81A}$ voltage on 1st energy transfer capacitor C81A, shown at 500 V/division
$I_{D83A}$ current in diode D83A, shown at 50 A/division
$I_{D81B}$ current in diode D81B, shown at 10 A/division
$V_{C81B}$ voltage on 2nd energy transfer capacitor C81B, shown at 500 V/division
$I_{D83B}$ current in diode D83B, shown at 50 A/division
$I_{L82}$ current in inductor L82, shown at 50 A/division
$I_{T81P}$ current in transformer T81 primary winding, shown at 50 A/division In this embodiment, the periodic injection of current pulses into the resonated load circuit establishes an oscillating current of approximately 100 A peak-peak, shown as $I_{T81P}$ in FIG. 8C, in the resonating capacitor C82 and primary winding of transformer T81.

For both embodiments of the circuit of FIG. 8A, the periodic injection of current pulses into the resonated load circuit is the combination of the alternate injections derived from the two energy transfer capacitors C81A, C81B. The repetition frequency of the periodic injection of current pulses into the resonated load circuit is double the switching frequency (4.76 kHz) of the charging control transistors Q81A, Q81B and the injection control transistors Q82A, Q82B, and is equal to the switching frequency (9.52 kHz) of the load circuit control transistor Q83. In this specific version of the FIG. 8A embodiment, the injection frequency of 9.52 kHz is approximately 1.5% below the natural resonant frequency, 9.65 kHz, of the resonated load circuit.

The invention claimed is:

1. A coupling circuit for coupling a supply of electrical energy to an inductive load device, wherein
   the coupling circuit comprises a switching circuit, an energy transfer capacitance and a resonating capacitance;
   the resonating capacitance and the inductive load device together form a resonated load circuit having a natural resonant frequency;
   the switching circuit is configurable in a charging configuration by which the energy transfer capacitance is charged from the supply of electrical energy;
   the switching circuit is configurable in an injecting configuration by which the energy transfer capacitance is at least partly discharged into the resonated load circuit, thereby injecting a discrete pulse of energy into the resonated load circuit;
   the switching circuit is repetitively configurable in the charging configuration followed by the injecting configuration to transfer energy from the supply of electrical energy to the inductive load device, the energy transferred to the inductive load device circulating in the resonated load circuit at an oscillation frequency that is near or equal to the natural resonant frequency; and there is no injection of energy from the energy transfer capacitance into the resonated load circuit while energy for charging the energy transfer capacitance is being delivered from the supply to the switching circuit.

2. A coupling circuit as claimed in claim 1, wherein the oscillation frequency is within ±20% of the natural resonant frequency.

3. A coupling circuit as claimed in claim 1, wherein energy is transferred from the supply of electrical energy to the inductive load device by repetitively configuring the switching circuit at a predetermined switching frequency which is equal to, or an integral sub-multiple of the oscillation frequency.

4. A coupling circuit as claimed in claim 1, wherein the energy transfer capacitance is not discharged into the resonated load circuit when the switching circuit is in the charging configuration.

5. A coupling circuit as claimed in claim 1, wherein the energy transfer capacitance is not charged from the supply when the switching circuit is in the injecting configuration.

6. A coupling circuit as claimed in claim 1, wherein the resonating capacitance and the inductive load device are continuously connected together in parallel, and the energy transfer capacitance is effectively connected in parallel across the resonating capacitance and the inductive load device when the switching circuit is configured in the injecting configuration.

7. A coupling circuit as claimed in claim 1, wherein the resonating capacitance and the inductive load device are effectively connected in a series circuit when the switching circuit is configured in the injecting configuration.

8. A coupling circuit as claimed in claim 1, wherein the energy transfer capacitance and the inductive load device are effectively connected in a series circuit excluding the resonating capacitance when the switching circuit is configured in the injecting configuration.

9. A coupling circuit as claimed in claim 1, wherein the injecting configuration is a first injecting configuration by which the energy transfer capacitance is discharged to inject a current in a first direction into the resonated load circuit;

the switching circuit is configurable in a second injecting configuration by which the energy transfer capacitance is discharged to inject a current in a second direction into the resonated load circuit, the second direction being opposite the first direction; and the switching circuit is repetitively configurable in the charging configuration followed by the first injecting configuration followed by the charging configuration followed by the second injecting configuration to transfer energy from the supply of electrical energy to the inductive load device.

10. A coupling circuit as claimed in claim 1, wherein:

the energy transfer capacitance is a first energy transfer capacitance, and the coupling circuit also comprises a second energy transfer capacitance;

the charging configuration is a first charging configuration, and the switching circuit is configurable in a second charging configuration by which the second energy transfer capacitance is charged from the supply of electrical energy;

the injecting configuration is a first injecting configuration, and the switching circuit is configurable in a second injecting configuration by which the second energy transfer capacitance is at least partly discharged into the resonated load circuit, thereby injecting a discrete pulse of energy into the resonated load circuit;

the switching circuit is repetitively configurable in the first charging configuration, the second injecting configuration, the second charging configuration, and the first injecting configuration, to transfer energy from the supply of electrical energy to the inductive load device; and there is no injection of energy from the second energy transfer capacitance into the resonated load circuit while energy for charging the second energy transfer capacitance is being delivered from the supply to the switching circuit.

11. A coupling circuit as claimed in claim 10, wherein:

the switching circuit is repetitively configured successively in the first charging configuration, the second injecting configuration, the second charging configuration, and the first injecting configuration.

12. A coupling circuit as claimed in claim 10, wherein:

the switching circuit is configured simultaneously in the first charging configuration and the second injecting configuration, and the switching circuit is configured simultaneously in the second charging configuration and the first injecting configuration.

13. A method of operating a coupling circuit to couple a supply of electrical energy to an inductive load device, wherein:

the coupling circuit comprises a switching circuit, an energy transfer capacitance and a resonating capacitance;

the resonating capacitance and the inductive load device together form a resonated load circuit having a natural resonant frequency; and the method comprises the steps of:

1. configuring the switching circuit in a charging configuration in which the energy transfer capacitance is connected to the supply of electrical energy;

2. charging the energy transfer capacitance from the supply of electrical energy;

3. configuring the switching circuit in an injecting configuration in which the energy transfer capacitance is connected to the resonated load circuit;

4. at least partly discharging the energy transfer capacitance into the resonated load circuit, thereby injecting a discrete pulse of energy into the resonated load circuit; and 5. repetitively performing Steps 1, 2, 3 and 4, to transfer energy from the supply of electrical energy to the inductive load device;

and wherein the energy transferred to the inductive load device circulates in the resonated load circuit at an oscillation frequency which is near or equal to the natural resonant frequency; and there is no injection of energy from the energy transfer capacitance into the resonated load circuit while energy for charging the energy transfer capacitance is being delivered from the supply to the switching circuit.

14. The method of operating a coupling circuit as claimed in claim 13, wherein the oscillation frequency is preferably within ±20% of the natural resonant frequency.

15. The method of operating a coupling circuit as claimed in claim 13, wherein in Step 5 the switching circuit is repetitively configured at a predetermined switching frequency which is equal to, or an integral sub-multiple of, the oscillation frequency.

16. The method of operating a coupling circuit as claimed in claim 13, wherein the energy transfer capacitance is not discharged into the resonated load circuit while performing Steps 1 and 2.

17. The method of operating a coupling circuit as claimed in claim 13, wherein the energy transfer capacitance is not charged from the supply while performing Steps 3 and 4.

18. The method of operating a coupling circuit as claimed in claim 13, wherein the energy transfer capacitance, the resonating capacitance and the inductive load device are effectively connected together in parallel while performing Steps 3 and 4.

19. The method of operating a coupling circuit as claimed in claim 13, wherein the energy transfer capacitance, the resonating capacitance and the inductive load device are effectively connected together in a series circuit while performing Steps 3 and 4.

20. The method of operating a coupling circuit as claimed in claim 13, wherein the energy transfer capacitance and the inductive load device are effectively connected together in a series circuit excluding the resonating capacitance while performing Steps 3 and 4.

21. The method of operating a coupling circuit as claimed in claim 13, wherein the injecting configuration of Step 3 is a first injecting configuration, and the discharging of the energy transfer capacitance in Step 4 is performed by injecting a current in a first direction into the resonated load circuit; and the method further comprises the additional steps of:
  6. configuring the switching circuit in a second injecting configuration in which the energy transfer capacitance is connected to the resonated load circuit; and
  7. at least partly discharging the energy transfer capacitance into the resonated load circuit by injecting a current in a second direction into the resonated load circuit, the second direction being opposite the first direction, thereby injecting a discrete pulse of energy into the resonated load circuit; and
  8. performing Steps 1, 2, 6 and 7 following each repetition of Steps 1, 2, 3 and 4 in Step 5, to transfer energy from the supply of electrical energy to the inductive load device.

22. A method of operating a coupling circuit to couple a supply of electrical energy to an inductive load device, wherein:
  the coupling circuit comprises a switching circuit, a first energy transfer capacitance, a second energy transfer capacitance, and a resonating capacitance;
  the resonating capacitance and the inductive load device together form a resonated load circuit having a natural resonant frequency; and
  the method comprises the steps of:
  A. configuring the switching circuit in a first injecting configuration in which the first energy transfer capacitance is connected to the resonated load circuit;
  B. at least partly discharging the first energy transfer capacitance into the resonated load circuit, thereby injecting a discrete pulse of energy into the resonated load circuit;
  C. configuring the switching circuit in a first charging configuration in which the first energy transfer capacitance is connected to the supply of electrical energy;
  D. charging the first transfer capacitance from the supply of electrical energy;
  E. configuring the switching circuit in a second injecting configuration in which the second energy transfer capacitance is connected to the resonated load circuit;
  F. at least partly discharging the second energy transfer capacitance into the resonated load circuit, thereby injecting a discrete pulse of energy into the resonated load circuit;
  G. configuring the switching circuit in a second charging configuration in which the second energy transfer capacitance is connected to the supply of electrical energy;
  H. charging the second energy transfer capacitance from the supply of electrical energy;
  I. repetitively performing Steps A to H inclusive, to transfer energy from the supply of electrical energy to the inductive load device;
  and wherein:
  the energy transferred to the inductive load device circulates in the resonated load circuit at an oscillation frequency which is near or equal to the natural resonant frequency; and
  there is no injection of energy from the first energy transfer capacitance into the resonated load circuit while energy for charging the first energy transfer capacitance is being delivered from the supply to the switching circuit, and no injection of energy from the second energy transfer capacitance into the resonated load circuit while energy for charging the second energy transfer capacitance is being delivered from the supply to the switching circuit.

* * * * *